(12) United States Patent
Kawakami

(10) Patent No.: US 7,771,781 B2
(45) Date of Patent: Aug. 10, 2010

(54) ANTI-GLARE FILM, MANUFACTURING METHOD OF ANTI-GLARE FILM, ANTI GLARING ANTI-REFLECTION FILM, POLARIZING PLATE, AND DISPLAY

(75) Inventor: Sota Kawakami, Shiroyama-machi (JP)

(73) Assignee: Konica Minolta Opto, Inc., Tokyo (JP)

( * ) Notice: Subject to any disclaimer, the term of this patent is extended or adjusted under 35 U.S.C. 154(b) by 1196 days.

(21) Appl. No.: 11/366,709

(22) Filed: Mar. 2, 2006

(65) Prior Publication Data

US 2006/0204718 A1    Sep. 14, 2006

(30) Foreign Application Priority Data

Mar. 9, 2005    (JP)    ............... 2005-065064

(51) Int. Cl.
  *B05D 5/06*    (2006.01)
  *B05D 5/00*    (2006.01)
  *B05D 1/36*    (2006.01)

(52) U.S. Cl. ............ 427/162; 427/164; 427/256; 427/258

(58) Field of Classification Search .......... 427/160–169
See application file for complete search history.

(56) References Cited

U.S. PATENT DOCUMENTS 5,544,582 A * 8/1996 Bocko et al. ............ 101/211

2002/0034008 A1 * 3/2002 Ohishi et al. ............ 359/493

FOREIGN PATENT DOCUMENTS

| GB | 1483371 A | * | 8/1977 |
| JP | 59-058036 A | | 4/1984 |
| JP | 06-234175 A | | 8/1994 |
| JP | 2001-281410 A | | 10/2001 |
| JP | 2003-121620 A | | 4/2003 |
| JP | 2004-004404 A | | 1/2004 |
| JP | 2004-004777 A | | 1/2004 |
| JP | 2004-024967 A | | 1/2004 |
| JP | 2004-125985 A | | 4/2004 |

* cited by examiner

*Primary Examiner*—Michael Cleveland
*Assistant Examiner*—Michael G Miller
(74) *Attorney, Agent, or Firm*—Frishauf, Holtz, Goodman & Chick, P.C.

(57) ABSTRACT

It is an object of the present invention to provide an anti-glare film and a manufacturing method thereof, in which undesired image capturing caused by outside light and lowered contrast are effectively inhibited without lowering sharpness of a high quality image via miniaturization of a pixel size, and a desired micro-roughened structure is stably formed effectively with good productivity, and further to provide an anti-glaring anti-reflection film, a polarizing plate, and a display thereof. Disclosed is a manufacturing method of an anti-glare film possessing the step of forming a roughened structure with ink adhesion portions and unfinished ink adhesion portions, provided on a substrate film surface via flexographic printing, employing a seamless resin plate having a diameter of 50-1000 mm and a rubber hardness degree of 30-80.

9 Claims, 7 Drawing Sheets

US 7,771,781 B2

ANTI-GLARE FILM, MANUFACTURING METHOD OF ANTI-GLARE FILM, ANTI GLARING ANTI-REFLECTION FILM, POLARIZING PLATE, AND DISPLAY

This application claims priority from Japanese Patent Application No. 2005-065064 filed on Mar. 9, 2005, which is incorporated hereinto by reference.

TECHNICAL FIELD

The present invention relates to an anti-glare film, a manufacturing method of the anti-glare film, an anti-glaring anti-reflection film, a polarizing plate and a display, and relates specifically to the anti-glare film, the manufacturing method of the anti-glare film, the anti-glaring anti-reflection film, the polarizing plate, and the display exhibiting reduction of undesired image capturing caused by outside light as well as inhibition of lowered contrast.

BACKGROUND

In recent years, thin and light weight laptop computers have increasingly been developed. Along with such development, a decrease in thickness as well as enhancement in quality of the protective film of polarizing plates, which are employed in the display apparatuses such as a liquid crystal display apparatus, has increasingly been demanded. Further, liquid crystal image display apparatuses (also called liquid crystal displays) of computers as well as word processors have increasingly been employed in which a reflection minimizing layer is provided to enhance visibility, undesired image capturing is minimized, and in order to achieve display performance of minimizing glitter, an anti-glare layer is provided in which the layer surface is roughened.

Various types of anti-reflection layers as well as anti-glare layers have been developed depending on their need, and their performance has been improved. In order to enhance visibility, methods are employed in which reflection minimizing function or anti-glare function is achieved by attaching various front plates exhibiting improved performance to a polarizer and the like in a liquid crystal display.

The aforesaid anti-glare layer functions as follows. By blurring an image contour reflected on the surface, the visibility of reflected images is degraded. By such action, during the use of an image display apparatus such as a liquid crystal display, an organic EL display, or a plasma display, reflection image capturing becomes almost unnoticeable.

The aforementioned properties can be provided by an adequate microscopically roughened structure arranged on the ultimate surface of the front panel of an image display apparatus. This method includes the technique of using particles (refer to Japanese Patent O.P.I. Publication No. 59-58036) and a technique of applying an embossing process to the surface (refer to Japanese Patent O.P.I Publication No. 6-234175). Further, Japanese Patent O.P.I Publication No. 2004-4777 describes the method of forming an anti-glare layer by coating film wherein particles are uniformly dispersed. A great number of coating and printing techniques are mentioned as the coating methods for forming a coating film. Flexographic printing technique is cited as one of such methods. However, in this document, the microscopically roughened structure is formed by particles, and the binder (ink) itself is uniformly coated. The document does not mention the arrangement of a microscopically roughened structure according to the presence or absence of ink itself.

However, according to the method of using the particles, the microscopically roughened structure is formed merely by allowing particles to be contained in the binder layer. This requires the particles to be adequately dispersed. This makes it difficult to achieve effective and stable formation of a desired microscopically roughened structure. This has been a great stumbling block in ensuring sufficient glitter preventing effect as an anti-glare film. In the method of forming a microscopic structure using particles, the aforementioned problems have remained undissolved, independently of the coating method. Further, the method of forming a microscopically roughened structure by embossing process and others has been unproductive. Especially stable formation of a microscopically roughened structure has been accompanied by great difficulties. Sufficient results have not been achieved in the reduction of glitter and anti-glare effect.

In recent years, the image display apparatus is required to provide greater visibility due to the need for displaying color images with higher definition. For example, the aforementioned conventional anti-glare film is insufficient to meet the requirements of the ultimate surface of the liquid crystal display. The clear hard coat anti-reflection film has not yet solved the problem of undesired image capturing of the fluorescent lamp. A great number of technical proposals have been made on the anti-glaring anti-reflection film wherein the anti-reflection layer (low-refractive index layer) due to optical interference is coated on the anti-glare film (refer to Japanese Patent O.P.I Publication No. 2001-281410, Japanese Patent O.P.I Publication No. 2004-4404, Japanese Patent O.P.I Publication No. 2004-125985, Japanese Patent O.P.I Publication No. 2004-24967, Japanese Patent O.P.I. Publication No. 2004-4777, and Japanese Patent O.P.I Publication No. 2003-121620). However, these techniques have so far failed to provide anti-glare and anti-reflection properties sufficient to produce a display apparatus for ensuring excellent visibility.

SUMMARY

The present invention was conducted in view of the above description. It is an object of the present invention to provide an anti-glare film and a manufacturing method thereof, in which undesired image capturing caused by outside light and lowered contrast are effectively inhibited without lowering sharpness of a high quality image via miniaturization of a pixel size, and a desired micro-roughened structure is stably formed effectively with good productivity, and further to provide an anti-glaring anti-reflection film, a polarizing plate, and a display thereof.

DESCRIPTION OF THE PREFERRED EMBODIMENTS

The above object of the present invention is accomplished by the following embodiments.

Embodiment 1

A manufacturing method of an anti-glare film possessing the step of forming a roughened structure with ink adhesion portions and unfinished ink adhesion portions, provided on a substrate film surface via flexographic printing, employing a seamless resin plate having a diameter of 50-1000 mm and a rubber hardness degree of 30-80.

According to foregoing Embodiment 1, the manufacturing method of an anti-glare film, wherein the ink adhesion portion of the roughened structure has a height of 0.1-1.5 μm based on that of the unfinished ink adhesion portion, a long side of 3-50 µm, and an average distance between the adjacent convex portions of 10-150 µm.

According to foregoing Embodiment 1, the manufacturing method of an anti-glare film, wherein the substrate film is at least one kind selected from the group including a cellulose ester based film, a polyester based film, a norbornene based resin film, and a polycarbonate based film.

According to foregoing Embodiment 1, the manufacturing method of an anti-glare film, wherein the substrate film has a hard coat layer having a thickness of 2-20 µm, provided on the side where the roughened structure is formed.

According to foregoing Embodiment 1, the manufacturing method of an anti-glare film, wherein the step of forming the roughened structure is conducted more than once.

According to foregoing Embodiment 1, the manufacturing method of an anti-glare film, wherein a different shape of the ink adhesion portion is formed in at least one step of forming the roughened structure in the step of forming the roughened structure conducted more than once.

According to foregoing Embodiment 1, the manufacturing method of an anti-glare film, wherein a seamless resin plate is used at least once in the step of forming the roughened structure conducted more than once.

According to foregoing Embodiment 1, the manufacturing method of an anti-glare film, wherein an ink viscosity employed for the flexographic printing is 0.1-10 Pa·s.

According to foregoing Embodiment 1, the manufacturing method of an anti-glare film, possessing the steps of forming the foregoing roughened structure, and curing/fixing the roughened structure via actinic irradiation or heating, wherein ink employed for the flexographic printing contains an actinic radiation curable resin or a thermosetting resin.

Embodiment 2

An anti-glare film is formed by the manufacturing method of an anti-glare film of Embodiment 1.

Embodiment 3

The anti-glare film, wherein low refractive index layers are laminated on the surface of the anti-glare film of Embodiment 2.

Embodiment 4

A polarizing plate, wherein an anti-glaring anti-reflection film is provided in the anti-glare film of Embodiment 2 or 3.

Embodiment 5

A display possessing at least one of the anti-glare film of Embodiment 2, the anti-glaring anti-reflection film Embodiment 3 and the polarizing plate of Embodiment 4.

According to foregoing Embodiment 5, the display, wherein a shape of the ink adhesion portion formed on the anti-glare film surface is elliptical, and a long side direction of the elliptical shape is arranged with a longitudinal or transverse direction of the display parallel.

While the preferred embodiments of the present invention have been described using specific terms, such description is for illustrative purposes only, and it is to be understood that changes and variations may be made without departing from the spirit or scope of the appended claims.

PREFERRED EMBODIMENTS OF THE PRESENT INVENTION

Figure 1:
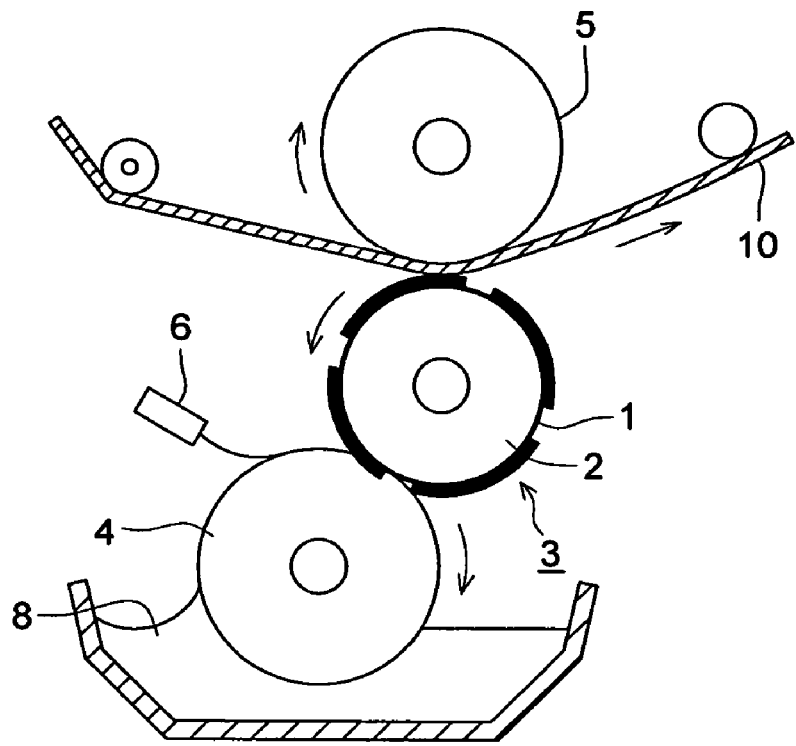
FIG. 1 is a schematic diagram representing an example of flexographic printing in the present invention.

The following describes the best form of the embodiment of the present invention, without the present invention being restricted thereto.

The method of manufacturing an anti-glare film according to the present invention is characterized by containing a step of forming a roughened structure made up of an ink adhesion portion and an unfinished ink adhesion portion, on the surface of the substrate film by flexographic printing; using a seamless resin plate having a diameter of 50-1000 mm and a rubber hardness degree of 30-80. A more preferable structure is further characterized in that the roughened structure is transferred and printed onto the surface of the substrate film by flexographic printing, using the transparent resin ink containing the actinic radiation curable resin or thermosetting resin, and actinic radiation is then applied to this roughened structure or heating it so that it will be cured and fixed in position, whereby anti-glare property is built in the substrate film.

The roughened structure formed by flexographic printing is formed by at least one flexographic printing operation to ensure that the height of the ink adhesion portion with reference to the unfinished ink adhesion portion is 0.1-1.5 µm, the size of the ink adhesion portion is 3-50 µm on the long side, and the average distance of adjacent the convex portions is 10-150 µm. According to this method, an anti-glare film can be manufactured at a print speed of 10 m/min. or more—at 500 m/min. if a high speed is required. Undesired image capturing of external light and reduction in contrast can be prevented, without reducing the sharpness of a high-definition image. This method ensures provides an anti-glare film, anti-glaring anti-reflection film using the same, polarizing plate and display apparatus, wherein effective and stable formation of a desired microscopically roughened structure with high productivity is ensured.

The following describes the present invention for each component:

<<Flexographic Printing>>

In the first place, the following describes flexographic printing for forming a roughened structure on the substrate film surface according to the present invention:

Generally, flexographic printing refers to the method of printing using a letterpress plate made up of a flexible rubber or resin and the solvent based evaporative drying type ink mainly composed of water or alcohol. Flexographic printing has been frequently for printing on paper and absorptive and non-absorptive films including an oriented or oriented resin film such as polyethylene, polyvinyl chloride, polypropylene and polystyrene. In the meantime, the drum printing machine (single dry type and common impression cylinder type) is provided with 4-6 printing units around a big impression cylinder located at the center. With a long band-like object to be printed wound on the impression cylinder, the machine is operated to perform printing operations. This being the case, flexographic printing is also applicable to printing on a thin and flexible film and aluminum foil.

In an attempt to solve the aforementioned problems with the anti-glare film, the present inventors have found out that these problems can be solved, without reducing the high level of productivity, by forming a roughened structure on the substrate film surface using the flexographic printing technique.

Figure 2:
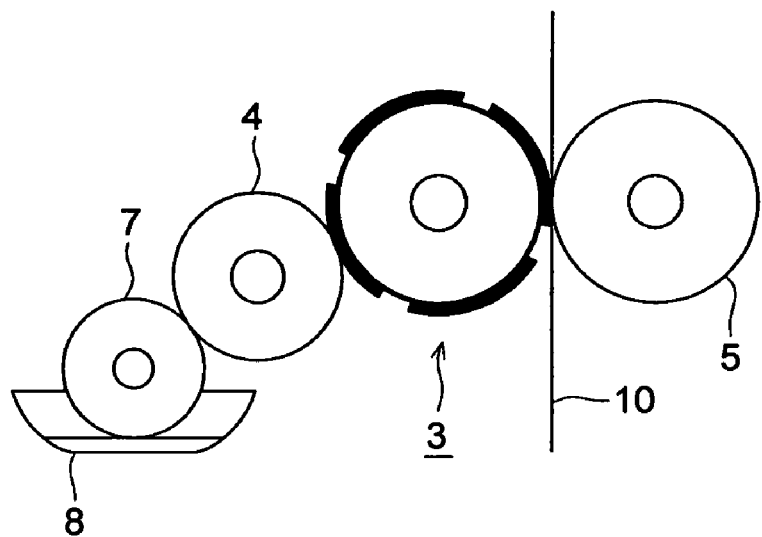
FIG. 2 is a schematic diagram showing flexographic printing employing a two-roll method.

In the first place, the following describes the flexographic printing of the present invention with reference to drawings:

FIGS. 1 and 2 are schematic diagrams representing an example of flexographic printing according to the present invention.

A substrate film 10 running continuously is sandwiched between a plate cylinder 3 and an impression cylinder 5 containing a resin plate roll 2, and a seamless resin plate 1 for forming a roughened structure on the substrate film after transfer printing. The amount of transfer ink is adjusted by a doctor blade 6, and ink 8 is supplied to the plate cylinder 3 by an anilox roll 4, whereby a substrate film is provided with transfer printing.

In flexographic printing, ink supply ink is supplied to the plate cylinder 3 by the anilox roll 4. The amount of ink on the surface of the anilox roll is generally controlled by the doctor blade method shown in FIG. 1 or the two-roll method shown in FIG. 2. In the two-roll method shown in FIG. 2, ink 8 is supplied from the ink pan to the anilox roll 4 by a fountain roll 7. The ink is further supplied to the plate cylinder 3, and is then transfer printed onto the substrate film 10. According to the method given in FIG. 2, the amount of ink 8 is adjusted by the number of engraved lines of the anilox roll 4, and the depth and shape of the cell. Further, the amount of ink supply is controlled by the nozzle pressure (subject to fluctuation) between the fountain roll and anilox roll 4. This makes it difficult to stabilize the amount of ink to be transferred. Accordingly, the method given in FIG. 1 is preferred in the present invention.

Figure 3:
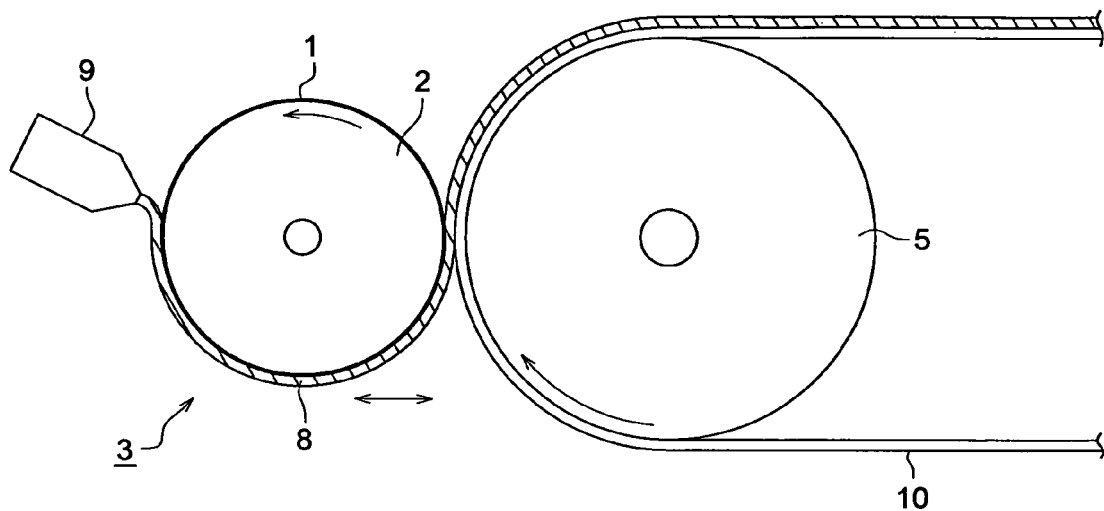
FIG. 3 is a schematic diagram for flexographic printing wherein ink is supplied by an extruding coater.

Another method is illustrated by a schematic diagram representing the flexographic printing technique using an extruding coater to supply ink in FIG. 3.

Ink 8 is directly extruded by the extruding coater 9 onto the seamless resin plate 1 mounted on the resin plate roll 2. The ink is transfer-printed on the substrate film 10 continuously fed in the state sandwiched between the plate cylinder 3 and impression cylinder 5. In this case of this apparatus, the amount of ink to be supplied depends on extruding coater precision, since there is no anilox roll.

In the doctor blade method given in FIG. 1, the amount of ink transferred to the plate cylinder 3 determined by the number of engraved lines of the anilox roll 4 and the shape of the cell. This arrangement ensures a stabile amount of ink to be transferred. Since the excess ink on the anilox roll surface is scraped off by the doctor blade, the ink filled in the cell of the anilox roll is determined by the number of engraved lines and the shape and volume of the cell. The cell of the anilox roll is treated as follows: For example, the iron cylinder surface is provided with copper plate as required, so that cell is formed on the surface thereof. Then the cell of the anilox roll is provided with surface processing to ensure sufficient hardness by nickel or chromium plating. The anilox roll material is made of the iron cylinder surface provided with copper plating, or coated with ceramics. In the present invention, the anilox roll material coated with ceramics is preferably used because of excellent resistance to wear and the ease with which the number of engraved lines is increased.

Figure 4:
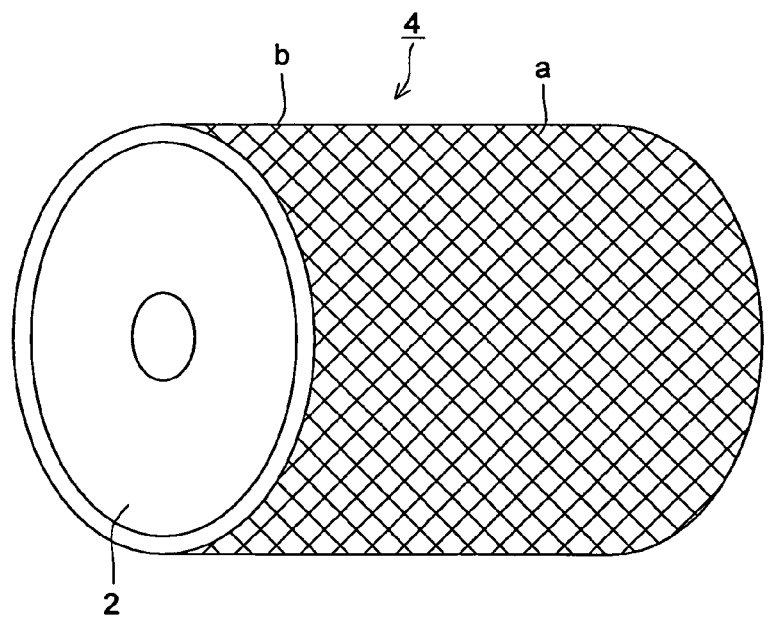
FIG. 4 is a perspective view of an anilox roll.

FIG. 4 is a perspective view representing an anilox roll.

Figure 5:
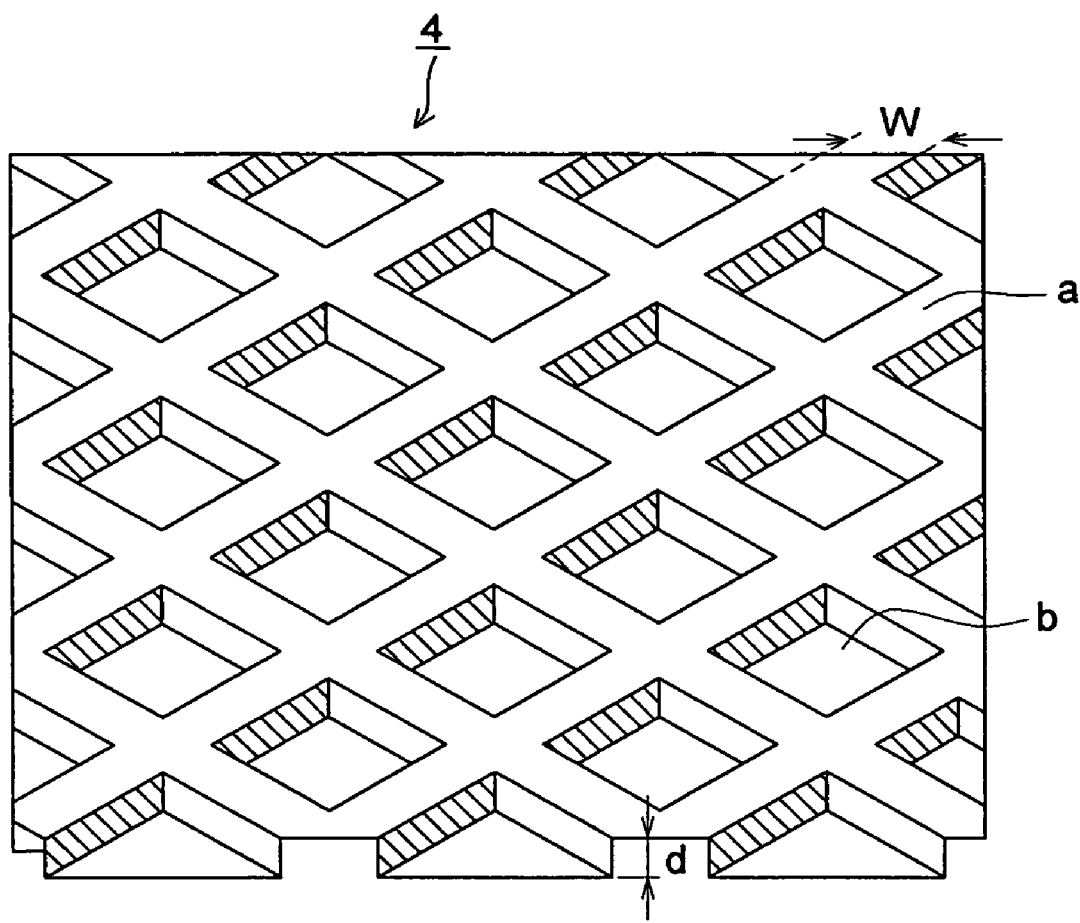
FIG. 5 is a perspective view representing an anilox cell.

FIG. 5 is a perspective view for explaining the anilox roll cell.

As shown in FIG. 4, the ceramic surface of the anilox roll 4 can be formed by chemical etching, similarly to the case of forming a gravure plate on the copper surface. Since this requires processing of etchant and variations are present in depth, the cell b should preferably be provided using a machine or through laser engraving. The surface of the anilox roll is provided with chromium plating subsequent to pressing by a conventional mill. However, from the viewpoint of resistance to wear and corrosion and ink transferability, it is preferably formed by spray coating of inorganic oxide such as chromium oxide and tungsten carbide.

The anilox roll 4 is engraved in many patterns such as helical, pyramidal, slanted and hexagonal honeycomb patterns (not illustrated) in addition to the grid type cell pattern, without the present invention being restricted thereto. The honeycomb pattern is preferred from the viewpoint of reproducibility of ink transfer at the time of high-speed printing. The number of engraved lines and the depth d of the cell b shown in FIG. 4 and FIG. 5 have a serious impact on the amount of ink transfer. To form a roughened structure on the anti-glare film surface according to the present invention, 600 lines/2.54 cm or more and cell depth d of 5-30 μm are preferred. Selection of the shape of engraving and number of lines is considered in connection with the type of the object to be printed and the number of lines on the print screen. A greater number of lines are more preferably used for the plastic film less subjected to absorption. The land a (non-concave portion) of the cell is preferably made so small not to affect the resistance to wear, because this increases the amount of ink charged. To put it more specifically, the land width w is preferably made 0.1-0.5 times the cell width. The anilox roll uses the doctoring method to control the amount of ink to be supplied to the place surface in flexographic printing. This will cause wear and damage to occur in the step of doctoring, with the result that the cell depth is decreased and the amount of ink transfer is reduced. Thus, as compared with the conventional metal (iron or copper provided with engraving and finished by chromium plating), the ceramic anilox roll reduces the amount of wear resulting from doctoring, and makes a substantial contribution to ensuring the repeating stability of the roughened pattern.

In the flexographic printing apparatus shown in FIG. 1 according to the present invention, ink is preferably transfer printed onto the substrate film 10, using the plate cylinder 3, and preferably, a ceramic-coated anilox roll 4, wherein the plate cylinder 3 has a seamless resin plate 1 with a diameter of 50-1000 mm mounted on the resin plate roll 2. Thus, a roughened structure is formed and an anti-glare film is produced.

No restriction is imposed on the material of the aforementioned resin plate roll 2, if the material is capable of maintaining the strength. It is preferred to use a metal such as iron, stainless steel, aluminum or synthetic or natural rubber. The material can be a composite of metal and rubber. In the present invention, the diameter of the resin plate roll 2 is selected in such a way that the roll diameter is within the range of 50-1000 mm when the seamless resin plate 1 is mounted on the resin plate roll 2. If the diameter of the seamless resin plate 1 is less than 50 mm, the rotational speed will be too high to maintain the strength. Further, the cycle of repeating the roughened pattern will be so short that the anti-glare effect is reduced, in some cases. If the diameter is over 1000 mm, the size of the apparatus will be excessive and the operation cost will be increased. Further, uneven rotation tends to occur, with the result that anti-glare effect is reduced.

The resin plate used in the seamless resin plate 1 in the present invention is preferably a photosensitive resin plate based on photo-polymerization between the polymer as a photoreaction product and monomer. This photosensitive resin plate is made up of such compositions as a photopolymer, a monomer subjected to photo-polymerization by exposure to ultraviolet rays, a sensitizer for initiating photo-polymerization between the polymer and monomer, and a plasticizer for adjustment of physical properties of the plate material. The roughened pattern is engraved on the photosensitive resin plate using the conventional mask plate making technique. Alternatively, direct engraving of the roughened pattern also possible by application of laser ray to the photosensitive resin layer provided over the entire surface of the cylinder (shaft center) by coating or other means.

The photosensitive resin composition used in the present invention can be the conventional photosensitive resin for flexographic printing. Generally, a composition mainly made up of a binder polymer, at least one kind of ethylene unsaturated monomer and photo-initiator is utilized. Further, such additives as a sensitizer, thermal polymerization inhibitor, plasticizer and coloring agent can be used in conformance to characteristics required of this photosensitive resin layer.

For example, the thermoplastic elastomer obtained by polymerization of monovinyl-substituted aromatic carbohydrate monomer and conjugate diene monomer is used as a binder polymer. The monovinyl-substituted aromatic carbohydrate monomer is exemplified by styrene, α-methyl styrene, p-methyl styrene and p-methoxy styrene. The conjugate diene monomer is exemplified by butadiene and isoprene. To put it more specifically, styrene-butadiene-styrene block copolymer and styrene-isoprene-styrene block copolymer can be mentioned.

At least one kind of the ethylenic unsaturated monomer includes the one compatible with the binder polymer, exemplified by the ester of alcohol of t-butyl alcohol and lauryl alcohol, acrylic acid, and methacrylic acid; maleimide derivatives such as laurylmaleimide, cyclohexylmaleimide and benzylmaleimide; and the ester of fumaric acid with alcohol such as dioctylfumarate; as well as the ester of polyvalent alcohol such as hexanediol di(meth)acrylate, nonanediol (meth)acrylate and trimethylol propane tri(meth)acrylate, acrylic acid and methacrylic acid.

The photo-initiator is selected from among known photo-polymerization initiators including the aromatic ketones such as benzophenone; and benzoin ether such as benzoinmethyl ether, benzoinethyl ether, benzoin isopropyl ether, α-methylol benzoinmethyl ether, α-methoxybenzoinmethyl ether and 2,2-diethoxy phenylacetophenone. The combination thereof is also selected for use.

The photosensitive resin layer can be prepared in various methods. For example, the materials to be blended are dissolved in the solution of a proper solvent such as chloroform, tetrachloroethylene, methyl ethyl ketone and toluene, and is mixed therewith. The resulting solution is coated on a proper supporting member using a coater. Alternatively, the solution is cast in a frame and the solution is removed by evaporation, whereby a plate is directly produced. Alternatively, without using a solvent, the solution is mixed by a kneader or roll mill. Then an extruder, injection molding machine, press and other devices are utilized to produce a plate having a desired thickness.

When a photosensitive resin sheet is wound on the resin plate roll, the sheet must be cut accurately, in order to form a seamless resin plate, in such a way that a gap will not be produced between the photosensitive resin ends. Normally, the photosensitive resin plate is wound on the resin plate roll. After that, the temperature is raised over the softening point of the photosensitive resin so that the ends of the photosensitive resin are molten and bonded together. The heating time is normally 20 minutes through one hour, and is determined according to the temperature and resin softening point, wherein a general guide for the heating time is provided by whether the ends are bonded or not. Then the photosensitive resin surface is ground by a grinder until no seam is visible. At the same time, adjustment is made to get a higher precision. After that, heating is repeated to raise the temperature over the softening point of the photosensitive resin. This procedure is preferred in achieving a seamless appearance. The time required will be from 10 to 40 minutes although it depends on the temperature. The procedure is taken until glossiness is observed over the entire photosensitive resin surface. If heating is continued for a long time, the precision of the printing plate will be lost. Accordingly, treatment is preferably completed within one hour. Further, the photosensitive resin layer can be provided by coating, to ensure that the runner as a base material, polyester film, aluminum plate, steel plate or aluminum-made resin plate roll mounted on the cylinder will be seamless.

The present invention is characterized in that the rubber hardness degree of the seamless resin plate is within the range of 30-80. In order to ensure stable and high-precision transfer-printing of the microscopically roughened structure, the rubber hardness of the resin plate is required to stay within this range. The rubber hardness of the roll-like seamless resin plate 1 also depends on the thickness of the resin plate. Accordingly, in the resin plate having a thickness of 0.5-10 mm, the rubber hardness degree must be within the range of 30-80, more preferably within the range of 40-80.

If the rubber hardness degree of the resin plate is less that 30, the plate will be too soft to obtain a desired roughened structure. Further, the plate itself tends to wear earlier, and therefore, this must be avoided. If the rubber hardness degree of the resin plate is over 80, the plate cylinder will make a high-speed rotation and will deteriorate flexibility in printing. This will result in poor reproducibility in the amount of the ink to be transferred. The rubber hardness is represented by the value measured by a durometer according to the method specified in the JIS K 6253.

The mask plate making technique is used to engrave a roughened structure on the seamless resin plate. In the mask plate making, the resin plate provided with the layer of photosensitive resin material is covered with the negative film as an original plate mask and light is applied thereto. The photosensitive resin layer is cured or becomes insoluble when exposed to light, particularly to the ultraviolet ray having a wavelength of 350-450 nm. The uncured resin of the unexposed portion is maintained in such a way that it can be dissolved in the organic solution such as water, alkaline solution or alcohol. Accordingly, only the exposed portion remains by washing away the unexposed portion with the corresponding solution (development step), whereby the letterpress plate (flexographic plate) is formed.

In recent years, a complete endless plate can be produced by direct engraving on the already cured resin plate using a laser ray or an engraving machine according to the correction image signal. Alternatively, the laser ray modulated by the corrected image signal is applied to the unexposed photosensitive resin plate in the form of a cylinder, and patterning is performed. After that, development is carried out according to the conventional method. This method is preferred for the formation of an endless plate.

In the present invention, a plate is preferably formed on the aforementioned photosensitive resin plate in such a way that a roughened structure provided with the convex portion can be printed and produced on the substrate film or on the substrate film provided with a hard coat layer having a thickness of 2-20 μm, wherein the aforementioned convex portion is characterized in that the height is 0.1-1.5 μm with respect to the unfinished ink adhesion portion, the size on the long side is 3-50 μm, and the average distance between the adjacent ink adhesion portions (convex portions) is 10-150 μm.

The ink adhesion portion in the present invention refers to the portion where ink is attached by flexographic printing. In the anti-glare film, the ink adhesion portion corresponds to the convex portion. The unfinished ink adhesion portion refers to the portion where no ink is attached by flexographic printing. It corresponds to the concave portion in the anti-glare film. In the present invention, it is preferred that no ink should be attached to the unfinished ink adhesion portion. When the ink in the small amount of 5% or less is attached, such a portion is regarded as an unfinished ink adhesion portion, in contrast to the ink adhesion portion.

Figure 6:
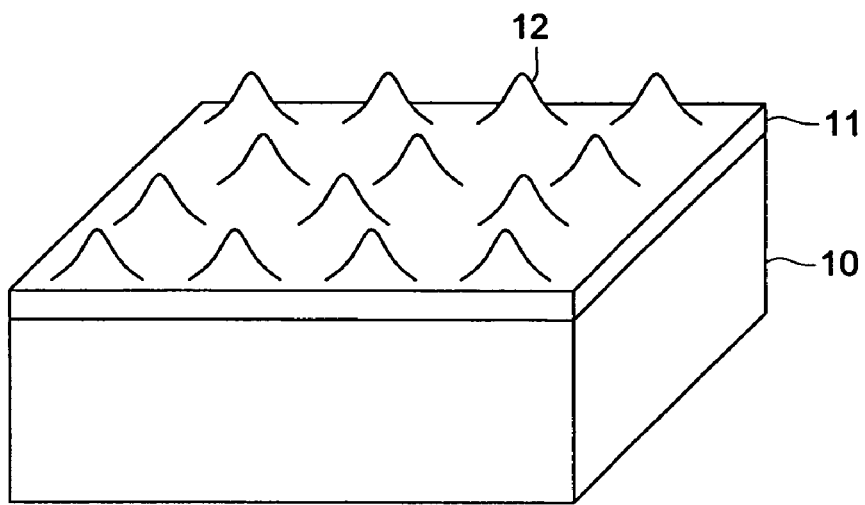
FIG. 6(a) and FIG. 6(b) are schematic diagrams showing a preferable microscopically roughened structure of the present invention.
Figure 6:
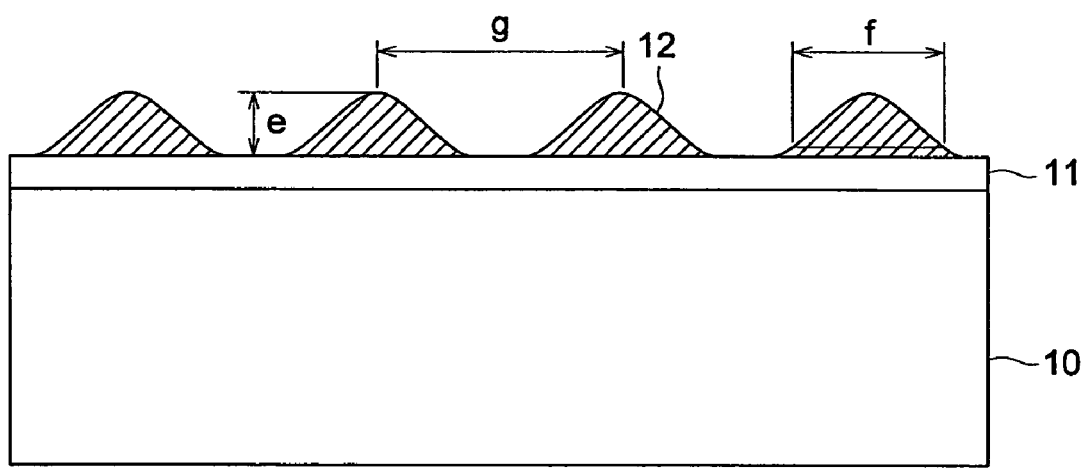

FIG. 6 is a schematic diagram representing the roughened structure preferred in the present invention, formed on the substrate film. FIG. 6 (a) is a perspective view of the roughened structure, and FIG. 6 (b) is a cross sectional view showing the same. The height of the roughened structure is shown by e in the drawing. It refers to the difference in height between the vertex of the ink adhesion portion (convex portion) and the adjacent unfinished ink adhesion portion (concave portion). This height is within the range from 0.1-1.5 μm, preferably within the range from 0.2-1.2 μm. If it is less than 0.1 μm, a satisfactory anti-glare effect cannot be obtained. If it is over 1.5 μm, there will be an increase of a gritty feel in visibility. The height of the convex portion of the roughened structure can be measured a commercially available probe type surface roughness measuring instrument or commercially available optical interference type surface roughness measuring instrument. For example, 2D measurement of the roughened pattern is conducted within a predetermined range by the optical interference type surface roughness measuring instrument. The roughened pattern is displayed in color identification as a contour line, starting from the bottom side. In this case, the bottoms of the adjacent concave portions of each roughened structure are assumed as references, and the height is obtained. The result is assumed as the average value.

The size of the convex portion is indicated by f in the following drawing, and is defined as follows: The roughened pattern is color-identified as in contour lines from the bottom side, using the aforementioned commercially available optical interference type surface roughness measuring instrument. Assuming the bottoms of the concave portion as a bottom, the height of the convex portion is increased by 5%.

In this case, the long side of the convex portion is defined as the size of the convex portion. It is represented in terms of the average value. In this case, the size of the microscopically roughened structure of the convex portion in the present invention is preferably 3-50 μm. If the size is less than 3 μm, the anti-glare effect cannot be obtained. If it is more than 50 μm, there will be an increase of a gritty feel in visibility.

The average distance g between convex portions is preferably 10-150 μm, more preferably 30-120 μm. If it is less than 10 μm or more than 150 μm, the anti-glare effect will be reduced. The average distance between convex portions can be measured by a probe type surface roughness measuring instrument. To put it more specifically, the surface of the microscopically roughened structure is scanned over the length of 3 mm in a predetermined direction using the measuring probe having a diameter of 1 mm wherein the tip portion made of a diamond is assumed as a cone with a vertex angle of 55 degrees. The change in the vertical direction of the measuring probe in this case is measured and is recorded to form a surface roughness curve. Based on this result, the distance between convex portions is measured to obtain the average value. Alternatively, an optical interference type surface roughness measuring instrument can be used for measurement, if there is no difference from the result of measurement by the aforementioned probe type surface roughness measuring instrument.

The height, size and average distance of the convex portion of the aforementioned roughened structure are represented in terms of the average values of the results of measuring those of a hundred roughened structures.

In terms of the centerline average roughness Ra specified in the JIS B 0601, the anti-glare film surface having a roughened structure in the present invention preferably has a centerline average roughness Ra of 0.01-5 μm, more preferably 0.07-1 μm, most preferably 0.1-0.5 μm. For example, Ra can be increased for the portion to have a greater anti-glare effect, and can be decreased for the portion to have a smaller anti-glare effect. For example, Ra can be adjusted by 0.05 μm or more.

The centerline average roughness (arithmetic average roughness) Ra defined in the present invention is the value specified in the JIS B 0601: 2001 and obtained from the following formula, wherein this value is expressed in micrometer (μm) for the present invention.

$$Ra = \frac{1}{L} \int_0^L |f(x)| dx$$

The centerline average roughness (Ra) is measured as follows: The humidity is conditioned for 24 hours at a temperature of 25° C. with a relative humidity of 65% RH, wherein measurement samples do not overlap each other. In this environment, the centerline average roughness (Ra) can be obtained by measurement. In this statement, "measurement samples do not overlap each other" means that the samples are wound with the edges of samples kept raised; the samples are wound with a sheet of paper kept sandwiched between samples; or a frame is formed using a cardboard or the like wherein the four corners of the frame is secured in position. A non-contact 3-D microscopic surface contour measuring system Model RSTPLUS by WYKO Inc., for example, can be used as a measurement apparatus.

The ink used to produce the microscopically roughened structure according to the present invention includes the glitter preventing composition for forming a microscopically roughened structure by flexographic printing. The glitter preventing composition is preferably an actinic radiation curable resin or thermosetting resin.

The refractive index of the ink as a glitter preventing composition is preferably 1.45-1.65. The transmittance of the ink is preferably 80% or more, more preferably 90% or more.

When the measurement temperature is 40° C., the ink viscosity is preferably 0.1-10 Pa·s, more preferably 0.5-8 Pa·s. If the viscosity is less than 0.1 Pa·s, the viscosity is too low to get the microscopically roughened structure of a desired shape. If it is more than 10 Pa·s, ink flowability and ink transferability are reduced. There is no restriction on the ink viscosity measurement procedure if it has passed the test conducted using the viscometer calibration standard liquid specified in the JIS Z 8809: 2000. The rotary, vibration or capillary tube type viscometer can be used. Saybolt viscometer and Redwood viscometers can be used. For example, it is possible to mention a conical flat plate type E model viscometer by Tokimec Inc., E type viscometer by viscometer (rotary viscometer) by Toki Sangyo Co., Ltd., B type viscometer BL by Tokyo Keiki Co., Ltd., FVM-80A by Yamaichi Electronics Co., Ltd., Viscoliner by Nametore Kogyosha Co., Ltd., and VISCO MATE VM-1A by Yamaichi Electronics Co., Ltd.

In all cases, the composition within the aforementioned range can be obtained by adjusting the arrangement of the following glitter preventing composition.

In the first place, the following describes the actinic radiation curable resin preferably used in the present invention:

The actinic radiation curable resin refers to the resin that is cured when exposed to the actinic radiation such as ultraviolet ray and electron beam through crosslinking reaction and others. The actinic radiation curable resin is typically represented by a UV curable resinflectron beam curable resin. It also includes the resin that is cured by actinic radiation other than ultraviolet ray or electron beam.

The UV curable resin is exemplified by an ultraviolet ray curable acryl urethane resin, UV curable polyester acrylate resin, UV curable epoxyacrylate resin, UV curable polyol acrylate resin and UV curable epoxy resin.

Generally, the UV curable acryl urethane resin can be easily obtained when the product obtained by reaction of isocyanate monomer or prepolymer with the polyester polyol is made to react with the acrylate monomer containing such a hydroxyl group as 2-hydroxyethylacrylate, 2-hydroxyethylmethacrylate (hereinafter referred to merely as "acrylate" on the understanding that the acrylate includes methacrylate), and 2-hydroxypropylacrylate. For example, a mixture with 100 parts of Unidic 17-806 (by Dainippon Ink and Chemicals Incorporated.) and 1 part of Coronate L (by Japan Polyurethane Co., Ltd.) disclosed in Japanese Patent O.P.I Publication No. 59-151110 is preferably used.

Generally, the UV curable polyester acrylate resin can be easily obtained when the hydroxyl group or carboxyl group at the polyester terminal is made to react with such a monomer as 2-hydroxyethylacrylate, glycidylacrylate and acrylic acid (e.g. Japanese Patent O.P.I Publication No. 59-151112).

The UV curable epoxyacrylate resin is obtained by reaction of the hydroxyl group at the terminal of epoxy resin with such a monomer as acrylic acid, acrylic acid chloride and glycidylacrylate.

The UV curable polyol acrylate resin is exemplified by ethylene glycol(meth)acrylate, polyethylene glycol di(meth)acrylate, glycerine tri(meth)acrylate, trimethylol propane triacrylate, pentaerithritol triacrylate, pentaerithritol tetraacrylate, dipentaerithritol pentaacrylate, dipentaerithritol hexaacrylate and alkyl-modified dipentaerithritol pentaacrylate.

The UV curable epoxyacrylate resin, UV curable epoxy resin is exemplified by the epoxy actinic radiation reactive compound which is preferably utilized.

(a) Glycidyl ether of bisphenol A (This compound provides a mixture having a different degree of polymerization through reaction with epichlorhydrin and bisphenol A).

(b) A compound, containing the compound including the glycidyl ether group at the terminal, for initiating reaction of epichlorhydrin, ethylene oxide and/or propylene oxide with the compound containing two pieces of phenolic OH such as bisphenol A (c) Glycidyl ether of 4,4'-methylene bisphenol (d) Epoxy compound of phenol formaldehyde resin of the novolak resin or resol resin (e) A compound containing the aliphatic ring epoxide; e.g. bis(3,4-epoxycyclohexylmethyl)oxalate, bis(3,4-epoxycyclohexylmethyl)adipate, bis(3,4-epoxy-6-cyclohexylmethyl) adipate, bis(3,4-epoxycyclohexylmethyl pimelate, 3,4-epoxycyclohexylmethyl-3,4-epoxycyclohexane carboxylate, 3,4-epoxy-1-methylcyclohexylmethyl-3',4'-epoxycyclohexane carboxylate, 3,4-epoxy-1-methyl-cyclohexylmethyl-3', 4'-epoxy-1'-methylcyclohexane carboxylate, 3,4-epoxy-6-methyl-cyclohexylmethyl-3',4'-epoxy-6'-methyl-1'-cyclohexa carboxylate, 2-(3,4-epoxycyclohexyl-5',5'-spiro-3", 4"-epoxy)cyclohexane-metha-dioxane.

(f) Diglycidyl ether of dibasic acid, e.g., diglycidyl oxalate, diglycidyladipate, diglycidyl tetrahydrophthalate, diglycidylhexahydrophthalate, and diglycidyl phthalate (g) Diglycidyl ether of glycol, e.g., ethylene glycol diglycidyl ether, diethylene glycol diglycidyl ether, propylene glycol diglycidyl ether, polyethylene glycol diglycidyl ether, polypropylene glycol diglycidyl ether, copolymer (ethylene glycol-propylene glycol)diglycidyl ether, 1,4-butadiol diglycidyl ether, and 1,6-hexanedioldiglycidyl ether (h) Glycidyl ester of polymeric acid, e.g. polyacrylic acid polyglycidyl ester and polyester diglycidyl ester (i) Polyvalent alcohol glycidyl ether, e.g., glycerine triglycidyl ether, trimethylol propane triglycidyl ether, pentaerithritol diglycidyl ether, pentaerithritol triglycidyl ether, pentaerithritol tetraglycidyl ether, and glucose triglycidyl ether (j) Diglycidyl ether of 2-fluoroalkyl-1,2-diol, e.g. the same compounds as those exemplified as the fluorine-containing epoxy compound of the fluorine-containing resin of the aforementioned low-refractive index substances (k) Fluorine-containing alkane terminal diolglycidyl ether, e.g. fluorine-containing epoxy compound of fluorine-containing resin of the aforementioned low-refractive index substances The molecular weight of the aforementioned epoxy compound is 2,000, or less in terms of the average molecular weight, 1,000 or less.

When the aforementioned epoxy compound is cured by actinic radiation, it is effective to mix the compound containing the multifunctional group given in (h) and (i) in order to increase hardness further.

The photo-polymerization initiator or photosensitizer for cation polymerization of the epoxy actinic radiation reactive compound is capable of discharging a cation polymerization initiating substance by application of actinic radiation. What is particularly preferred is a group of double salts of the onium salt that discharges the Lewis acid capable of initiating the cation polymerization by irradiation.

The actinic radiation reactive compound epoxy resin causes polymerization and forms a crosslinking structure or network structure by cation polymerization—not by radial polymerization. Unlike the radical polymerization, this resin is not affected by oxygen in the reaction system. Thus, this is a preferable actinic radiation reactive resin.

The actinic radiation reactive epoxy resin crucial in the present invention causes polymerization, using the photo-polymerization initiator or photosensitizer capable of discharging the substance for initiating the cation polymerization by application of actinic radiation. A particularly preferred photo-polymerization initiator is a group of double salts of the onium salt that discharges the Lewis acid capable of initiating the cation polymerization by irradiation.

The representative compounds are expressed by following Formula (a):

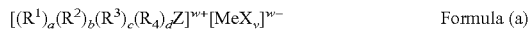

Formula (a)

where the cation is onium, and Z denotes S, Se, Te, P, As, Sb, Bi, O, halogen (e.g. I, Br, Cl) or N=N(diazo). $R^1$, $R^2$, $R^3$ and $R^4$ indicate the organic groups that can be the same or different. a, b, c and d are integers from 0-3, and a+b+c+d is equal to the affinity unit of Z. Me denotes a metal or semimetal (metalloid) as a central atom of the halogenated substance complex, and includes B, P, As, Sb, Fe, Sn, Bi, Al, Ca, In, Ti, Zn, Sc, V, Cr, Mn and Co. X indicates halogen. w denotes the net electrical charge of the halogenated complex ion, and v shows the number of the halogen atoms in the halogenated complex ion.

The negative ion $[MeX_v]^{w-}$ of the aforementioned the Formula (a) is specifically exemplified by tetrafluoroborate ($BF_4^-$), tetrafluorophosphate ($PF_4^-$), tetrafluoro antimonate ($SbF_4^-$), tetrafluoro arsenate ($AsF_4^-$), and tetrachloroantimonate ($SbCl_4^-$).

Other negative ions includes hyperchloride ion ($ClO_4^-$), trifluoromethyl sulfurous acid ion ($CF_3SO_3^-$), fluorosulfonic acid ion ($FSO_3^-$), toluene sulfonic acid ion, trinitrobenzene acid negative ion.

Among such onium salts, the aromatic onium salt in particular can be effectively used as a cation polymerization initiator. Above all, the aromatic halonium salt disclosed in Japanese Patent O.P.I Publication Nos. 50-151996 and 50-158680, the VIA group aromatic onium salt disclosed in Japanese Patent O.P.I Publication Nos. 50-151997, 52-30899, 59-55420 and 55-125105, the oxyosulfoxonium salt disclosed in Japanese Patent O.P.I Publication Nos. 56-8428, 56-149402 and 57-192429, the aromatic diazonium salt disclosed in the Official Gazettes of Japanese Patents Tokkosho 49-17040, and the thiopyrylium salt disclosed in the U.S. Pat. No. 4,139,655 are preferred. Further, the aluminum complex and photodegradable silicon compound based polymerization initiator can be mentioned. They can be used in combination with the photosensitizer such as the aforementioned cation polymerization initiator, benzophenone, benzoin isopropyl ether and thioxanthone.

Further, such a photosensitizer as n-butyl amine, triethylamine, tri-n-butylphosphine can be used in the case of actinic radiation reactive compound containing the epoxyacrylate group. With respect to 100 parts by weight of UV reactive compound, 0.1-15 parts by weight of the photosensitizer and photo-initiator used in this actinic radiation reactive compound is sufficient to initiate photoreaction. Preferably, 1-10 parts by weight is used. This sensitizer preferably has the absorption maximum in near-ultraviolet ray region through the visible ray region.

In the actinic radiation curable resin composition crucial in the present invention, 0.1-15 parts by weight of polymerization initiator is preferably used with respect to 100 parts by weight of the actinic radiation curable epoxy resin (prepolymer) generally. Use of 1-10 parts by weight of polymerization initiator is more preferred.

Epoxy resin can be used in combination with the aforementioned urethane acrylate type resin, polyether acrylate type resin. In this case, a combined use with the actinic radiation radial polymerization initiator and actinic radiation cation polymerization initiator is preferred.

In the present invention, the oxetane compound can be used. The oxetane compound to be used has a three-membered oxetane ring containing oxygen or sulfur. Above all, the compound including the oxygen-containing oxetane ring is preferred. The oxetane ring can be replaced by halogen atom, haloalkyl group, aryl alkyl group, alkoxy group, alyloxy group, and acetoxy group. To put it more specifically, 3,3-bis(chlormethyl)oxetane, 3,3-bis(iodomethyl)oxetane, 3,3-bis(methoxymethyl)oxetane, 3,3-bis(phenoxymethyl)oxetane, 3-methyl-3chlormethyloxetane, 3,3-bis(acetoxymethyl)oxetane, 3,3-bis(fluoromethyl)oxetane, 3,3-bis(bromomethyl)oxetane, and 3,3-dimethyl oxetane can be mentioned. In the present invention, any one of the monomer, oligomer and polymer used.

Selected and employed as UV radiation curable resins usable in the present invention may, for example, be ADEKA OPTOMER KR and BY Series such as KR-400, KR-410, KR-550, KR-566, KR-567, or BY-320B (all produced by Asahi Denka Kogyo Co., Ltd.); EIKOHARD such as A-101-KK, 101-WS, C-302, C-410-N, C-501, M-101, M-102, T-102, D-102, NS-101, FT-102Q8, MAG-1-P20, AG-106, or M-101-C (all produced by Koei Chemical Industry Co., Ltd.); SEKABEAM such as PHC2210(S), PHCX-9 (K-3), PHC2213, DP-10, DP-20, DP-30, P1000, P1100, P1200, P1300, P1400, P1500, P1600, or SCR900 (all produced by Dainichi Seika Industry Co., Ltd.); KRM7033, KRM7039, KRM7130, KRM7131, UVECRYL29201, and UVE-CRYL29202 (all produced by Daicel UCB Co., Ltd.); RC-5015, RC-5016, RC-5020, RC-5031, RC-5100, RC-5102, RC-5120, RC-5122, RC-5152, RC-5171, RC-5180, and RC-5181 (all produced by Dainippon Ink & Chemicals Co., Ltd.); ORLEX No. 340 CLEAR (produced by Chugoku Paint Co., Ltd.); SUNRAD H-601 (produced by Sanyo Chemical Industry Co., Ltd.); SP-1509 and SP-1507 (both produced by Showa Polymer Co., Ltd.); RCC-15C (produced by Grace Japan Co., Ltd.); ARONIX M-6100, M-8030, and M-8060 (all produced by Toa Gosei Co., Ltd.), as well as any other commercially available products.

Such a binder as the known thermoplastic resin or hydrophilic resin such as gelatine is mixed with the aforementioned actinic radiation curable resin, and can be used as the ink of the present invention. Such a resin is preferred to contain a polar group in the molecule. The polar group includes —COOM, —OH, —$NR_2$, —$NR_3X$, —$SO_3M$, —$OSO_3M$, —$PO_3M_2$ and —$OPO_3M$ (where M indicates hydrogen atom, alkali metal or ammonium group; X indicates the acid for forming the amine salt; R shows the hydrogen atom and alkyl group).

When the aforementioned actinic radiation reactive compound used in the present invention is used to initiate the photo-polymerization or photo-crosslinking reaction, only the aforementioned actinic radiation reactive compound is capable of initiating it. However, since a long preparatory time is required for polymerization or initiation of polymerization is delayed, photosensitizer or photo-initiator is preferably used. This arrangement accelerates polymerization.

When the ink of the present invention contains the actinic radiation curable resin, photoreaction initiator and photosensitizer are preferably used during application of actinic radiation.

To put it more specifically, acetophenone, benzophenone, hydroxybenzophenone, Michler's ketone, α-amyloxym ester, thioxanthone and the derivative thereof can be mentioned. Further, when a photoreaction agent is used to synthesize the epoxyacrylate resin, such a sensitizer as n-butyl amine, triethylamine, tri-n-butylphosphine can be used.

When a UV curable resin is used as the actinic radiation curable resin, UV absorbent can be mixed in the UV curable resin composition, without interfering with photo-curing of the aforementioned UV curable resin. From the viewpoint of ensuring superb performances in absorbing the ultraviolet ray having a wavelength 370 nm or less and excellent display on the liquid crystal, the UV absorbent that does not absorb much of the visible light with a wavelength of 400 nm or more is preferably utilized.

The UV absorbent preferably used in the present invention is specifically exemplified by oxybenzophenone compound, benzotriazole compound, salicylic acid ester compound, benzophenone compound, cyanoacrylate compound, triazine compound and nickel complex salt compound, without the present invention being restricted thereto.

To increase the heat resistance of the microscopically roughened structure formed by flexographic printing, it is possible to select the antioxidant that does not interfere with photocuring reaction. For example, the hindered phenol derivative, thiopropionic acid derivative, and phosphite derivative can be mentioned. To put it more specifically, 4,4'-thiobis(6-tert-3-methyl phenol), 4,4'-butylidene bis(6-tert-butyl-3-methyl phenol), 1,3,5-tris(3,5-di-tert-butyl-4-hydroxybenzyl)isocyanurate; 2,4,6-tris(3,5-di-tert-butyl-4-hydroxybenzyl)mesitylene, and di-octadecyl-4-hydroxy-3,5-di-tert-butylbenzylphosphate can be mentioned.

The ink used in the present invention preferably contains an antistatic agent including the conductive particles such as $SnO_2$, ITO and ZnO, and crosslinking cation polymer particle.

In the present invention, particles are preferably mixed in ink in order to adjust the refractive index. For example, inorganic particles or organic particles can be added.

The preferably used inorganic particles includes a silicon-containing compound, silicon dioxide, aluminum oxide, zirconium oxide, calcium carbonate, talc, clay, baked kaolin, baked calcium silicate, hydrated calcium silicate, aluminum silicate, magnesium silicate and calcium phosphate. The preferably used ones includes a silicon-containing inorganic compound and zirconium oxide. Particularly, the silicon dioxide is preferably used. They are globular, tabular amorphous particles.

The silicon dioxide particles commercially available are exemplified by aerosils R972, R972V, R974, R812, 200, 200V, 300, R202, OX50, TT600 by Nippon Aerosil Co., Ltd.

The zirconium oxide particles commercially available are exemplified by aerosils R976 and R811 by Nippon Aerosil Co., Ltd.

The organic particles are exemplified by polymethacrylic acid methylacrylate resin particles, acryl styrene resin particles, polymethylmethacrylate resin-particles, silicon resin particles, polystyrene resin particles, polycarbonate resin particles, benzoguanamine resin particles, melamine resin particles, polyolefin resin particles, polyester resin particles, polyamide resin particles, polyimide resin particles, and polyethylene fluoride resin particles.

The average size of the particles that can be used in the present invention is preferably 0.001-1.5 µm, more preferably 0.005-1.2 µm, especially preferably 0.01-1 µm. Two or more particles having different diameters and refractive indexes can be contained.

Further, about 0.01-5.0% by weight of such a surfactant as a fluorine surfactant, silicon surfactant and nonionic surfactant is preferably added in ink. Addition of silicon surfactant is particularly preferred in adjusting the ink viscosity and achieving high-precision transfer-printing.

In the present invention, when the microscopically roughened structure formed by flexographic printing contains the actinic radiation curable resin, it is preferred that actinic radiation should be applied after transfer-printing of ink onto a transparent substrate. The timing for applying the radiation can be determined by considering the shape of the roughened pattern. When the shape of the roughened pattern is clearly defined and a convex portion is to be formed, immediate irradiation subsequent to transfer-printing is preferred. When the shape of the roughened pattern is less sharp and a low convex portion is formed, irradiation can be started some time after transfer-printing. For example, irradiation can be started 2 seconds through 2 minutes after transfer-printing.

As described above, immediate irradiation subsequent to transfer-printing of ink on a transparent substrate in the present invention is preferred. To put it more specifically, this means that application of radiation is started preferably 0.001-2.0 seconds after transfer-printing, more preferably 0.001-1.0 seconds after transfer-printing.

Application of the actinic radiation immediately after transfer-printing of ink on a transparent substrate will reduce the flowability of the ink having been transfer-printed. Radiation should be applied to the extent that a desired roughened structure can be formed. The structure in a half cured state is also acceptable. In this case, it can be cured completely by using the actinic light source separately installed downstream. In the present invention, the microscopically roughened structure is formed preferably by a plurality of flexographic printing operations. In this case, ink is transfer-printed by the first flexographic printing operation. After that, ink is half-cured by the aforementioned actinic radiation. Curing of ink by actinic radiation is repeated using the next flexographic printing operation, until the actinic light source located at the extreme downstream position is applied to achieve complete curing.

The actinic radiation usable in the present invention includes ultraviolet ray, electron beam, gamma ray and others. There is no restriction to the type of the light source if it can activate the actinic radiation curable resin as a glitter preventive composition. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 1 $mJ/cm^2$ or more. The more preferred amount is 20-10000 $mJ/cm^2$, and still more preferred amount is 50-2000 $mJ/cm^2$.

An electron beam can also be used. It includes the electron beam having an energy of 50-1000 keV, preferably, 100-300 keV discharged from various types of the electron beam accelerators such as the Cockroft-Walton type, van de Graaff type, resonance transformer type, insulation core transformer type, linear type, dynamitron type, and high frequency type.

In the present invention, the concentration in the atmosphere during application of actinic radiation is preferably 10% or less, more preferably 1% or less.

In the present invention, the substrate film can be heated for the purpose of effective curing reaction of the actinic radiation. There is no restriction to the method for heating. The method of blowing hot air to the heat plate, heat roll, thermal head and transfer-printed ink surface is preferably used. A back roll arranged on the opposite side with the substrate film of the flexographic printing section sandwiched in-between can be used as a heat roll to provide continuous heating.

The heating temperature cannot be determined generally, since it depends on the type of the actinic radiation curable resin to be used. This temperature should be within the range where the substrate film is not subjected to thermal deformation or other problem. Namely, the heating temperature is preferably 30-200° C., more preferably 50-120° C. The range from 70-100° C. is particularly preferred.

The following describes the thermosetting resin that can be used for the ink of the present invention:

The thermosetting resin that can be used in the present invention includes the unsaturated polyester resin, epoxy resin, vinyl ester resin, phenol resin, thermosetting polyimide resin and thermosetting polyamide imide.

The unsaturated polyester resin includes an orthophthalic acid resin, isophthalic acid resin, terephthalic acid resin, bisphenol resin, propylene glycol-maleic acid resin; low-styrene volatile resin obtained by introducing dicyclopentadiene or the derivative thereof into an unsaturated polyester composition to reduce the molecular weight or by adding a wax compound capable of forming a film; low-shrinkage resin obtained by adding a thermoplastic resin (polyacetic acid vinyl resin, styrene/butadiene copolymer, polystyrene, saturated polyester, etc.); reactive type obtained by directly brominating the unsaturated polyester using the $Br_2$ or by copolymerizing the HET acid and dibromneopentyl glycol; flame resistant resin of additive type wherein a combination of such a halide as chlorinated paraffin and tetrabromobisphenol, antimony trioxide and phosphorus compound, and aluminum hydroxide are used as additives; and durable resin characterized by high durability (characterized by high strength, modulus of elasticity and elongation) produced by hybridization with polyurethane and silicone or by introduction of IPN.

The epoxy resin is exemplified by a glycidyl ether based epoxy resin such as bisphenol A type, novolak phenol type, bisphenol F type, brominated bisphenol A type; and a special epoxy resin including a glycidyl amine epoxy resin, glycidyl ester epoxy resin, cyclic aliphatic resin and heterocyclic epoxy resin.

The vinyl ester resin is produced by dissolving the oligomer into the monomer of styrene and others
wherein the oligomer is obtained by reaction of ring opening and addition of the unsaturated monatomic acid of the conventional epoxy resin and methacrylic acid. There is also a special type resin having a vinyl group on the terminal and side chain of the molecule and containing a vinyl monomer. The vinyl ester resin of the glycidyl ether epoxy resin includes the bisphenol based, novolak based and brominated bisphenol based epoxy resin. The special vinyl ester resin includes a vinyl ester urethane based, isocyanuric acid vinyl based and side chain vinyl ester resin.

The phenol resin is produced by polycondensation of the phenols and formaldehydes as materials. It is available in two types; resol and novolak.

The polyimide resin is exemplified by maleic acid based polyimide such as polymaleimide amine, polyamino bismaleimide, bismaleimide/O,O'-diallylbisphenol-A resin and bismaleimide/triazine resin. The nadic acid-modified polyimide and acetylene terminal polyimide are also included in this category.

Some of the aforementioned actinic radiation curable resins can also be used as thermosetting resins.

The antioxidant and UV absorbent described in reference to the ink containing the actinic radiation curable resin can be added to the ink made of the thermosetting resin used in the present invention, as appropriate.

In the present invention, when the microscopically roughened structure formed by flexographic printing contains the thermosetting resin, the process of heating is preferably implemented immediately after ink is transfer-printed on the substrate film.

As described above, the process of heating is preferably implemented immediately after ink is transfer-printed on the substrate film. To put it more specifically, this means that heating is started preferably means simultaneously with transfer-printing of ink or within 5 seconds. The temperature of the substrate film can be increased in advance. For example, the substrate film can be wound on the heat roll and ink can be transfer-printed thereon. More preferably, this is accomplished simultaneously with transfer-printing or within 2.0 seconds. Further, if the distance between the nozzle section and heating section is too close, and heat has reached the head, the nozzle will be clogged by curing in the nozzle section. Care must be taken to avoid this. As required, the interval for heating exceeds 5.0 seconds, whereby the flow of the ink having been subjected to transfer-printing can be adjusted so as to get a gentle slope of the microscopically roughened structure.

Although there is no particular restriction on the method of heating, the method of blowing hot air to the heat plate, heat roll, thermal head and transfer-printed ink surface is preferably used. A back roll arranged on the opposite side with the substrate film of the flexographic printing section sandwiched in-between can be used as a heat roll to provide continuous heating. The heating temperature cannot be determined generally, since it depends on the type of the thermoplastic resin to be used. This temperature should be within the range where the transparent film is not subjected to thermal deformation or other problem. Namely, the heating temperature is preferably 30-200° C., more preferably 50-120° C. The range from 70-100° C. is particularly preferred.

In the ink of the present invention, either the aforementioned actinic radiation curable resin or thermosetting resin can be used as a glitter preventing composition. The actinic radiation curable resin is preferably used.

The aforementioned ink of the present invention can contain 0-99.9% by weight of solvent, as required. For example, the aforementioned actinic radiation curable resin monomer component or thermosetting resin monomer component can be dissolved or dispersed in a water-based solvent. Alternatively, an organic solvent can be used. The organic solvent can be selected as appropriate, whether it has a low boiling point or a high boiling point. The amount, type and composition of the solvent to be added are preferably adjusted as required, for the purpose of adjusting the viscosity.

The solvent that can be used in the ink of the present invention is exemplified by alcohols such as methanol, ethanol, 1-propanol, 2-propanol and butanol; ketones such as acetone, methyl ethyl ketone, cyclohexanone; ketone alcohols such as diacetone alcohol; aromatic carbohydrates such as benzene and toluene, xylene; glycols such as ethylene glycol, propylene glycol and hexylene glycol; glycol ether such as ethyl cell solve, butyl cell solve, ethylcarbitol, butylcarbitol, diethyl cell solve, diethylcarbitol, propylene glycol monomethyl ether; esters such as N-methylpyrrolidone, dimethyl formamide, methyllactate, ethyl lactate, methyl acetate, ethyl acetate and amyl acetate; ethers such as dimethyl ether, diethyl ether; and water. They can be used individually, or two or more of them can be used in combination. The substance having an ether bond in the molecule is preferred in particular. Glycol ethers are also used preferably.

The following solvents can be specifically mentioned as glycol ethers, without the present invention being restricted thereto. They are propylene glycol monomethyl ether, propylene glycol monoethyl ether, propylene glycol monobutyl ether, diethylene glycol dimethyl ether, ethylene glycol monomethyl ether, ethylene glycol monomethyl ether Ac, ethylene glycol monobutyl ether, ethylene glycol monoethyl ether, ethylene glycol monoethyl ether Ac, and ethylene glycol diethyl ether, wherein Ac denotes acetate. Of the aforementioned solvents, the ones having a boiling point of less than 100° C. are used preferably in the ink of the present invention. Such solvents are desired to be quickly volatilized and dried upon transfer-printing, without a desired convex portion being damaged. Alternatively, solvents having different volatilities are blended and the blending ratio is changed, whereby the shape of the convex portion can be adjusted.

The following describes the preferable embodiment for the formation of a microscopically roughened structure by flexographic printing in the present invention:

The following describes the preferred method of forming an anti-glare layer having a microscopically roughened structure in the present invention: The aforementioned microscopically roughened structure is preferably formed by a plurality of flexographic printing operations; in the aforementioned a plurality of flexographic printing operations, the resin plate is preferably changed so that the shape of the convex portion will be different at least once; or in the aforementioned a plurality of flexographic printing operations, the resin plate is preferably changed so that the diameter of the resin plate roll will be different at least once.

Figure 7:
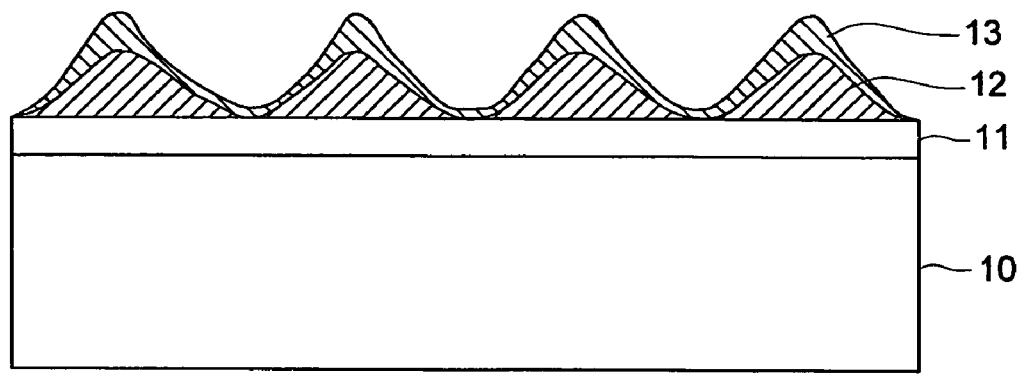
FIG. 7(a), FIG. 7(b) and FIG. 7(C) are schematic diagrams representing examples of the microscopically roughened structure formed by a plurality of flexographic printing operations.
Figure 7:
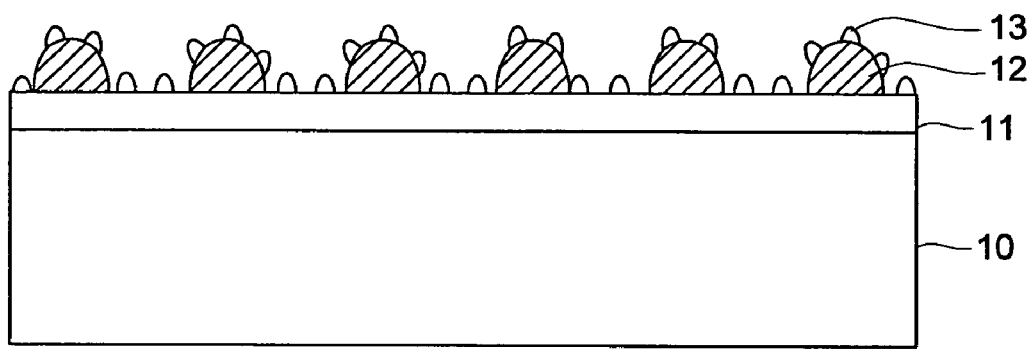
Figure 7:
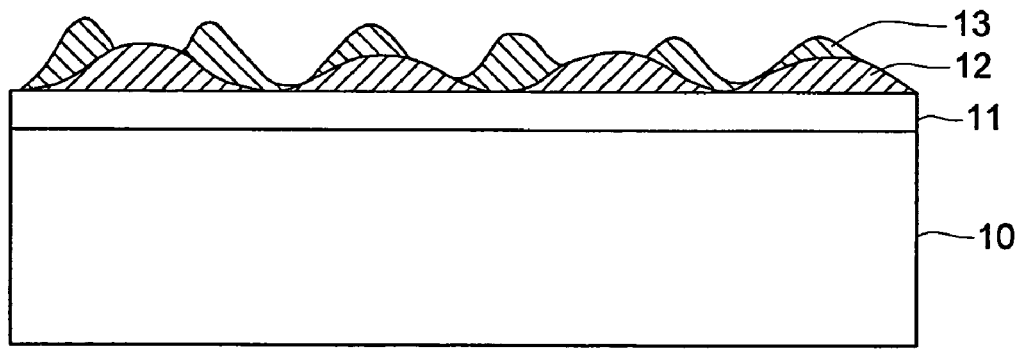

FIG. 7 is a schematic diagram representing an example of the microscopically roughened structure formed by a plurality of flexographic printing operations.

The following advantages are ensured when the microscopically roughened structure is formed by a plurality of flexographic printing operations: If the microscopically roughened structure is formed by one printing operation, the height of the microscopically roughened structure pattern may not be sufficient. This problem can be solved by a plurality of printing operations which provide a desired difference in the height of the microscopically roughened structure [FIG. 7(a)].

Further, the roughened pattern is changed, the resin plate is changed so that the shape of the convex portion, and a plurality of printing operations are conducted. This provides the advantage of preventing the pattern from being identified by visual observation, whereby the display visibility is improved [FIG. 7(b)].

The resin plate is changed with the one having a different resin plate roll diameter, and a plurality of printing operations are conducted. This prevents a predetermined repeated pattern from recurring on one and the same screen, whereby the display visibility is improved [FIG. 7(c)].

When two or more types of ink are to be utilized, the inks having different solid concentrations can be used. For example, the solid concentration of the first liquid ink is set to a lower level. During the leveling of ink, the ink having a higher solid concentration is transfer-printed. This arrangement makes it possible to form the minute convex portion of a desired height having a comparatively large foot. Appropriate adjustment of the solid concentration of each type of ink provides each control of the formation and shape of the microscopically roughened structure.

Figure 8:
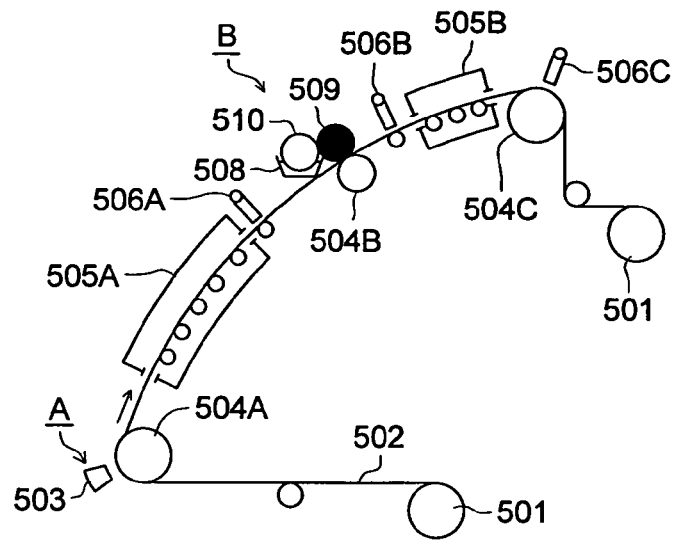
FIG. 8(a) and FIG. 8(b) are diagrams showing examples of the method for forming a microscopically roughened structure on a substrate film by one (FIG. 8(a)) or two or more flexographic printing operations (FIG. 8(b))
Figure 8:
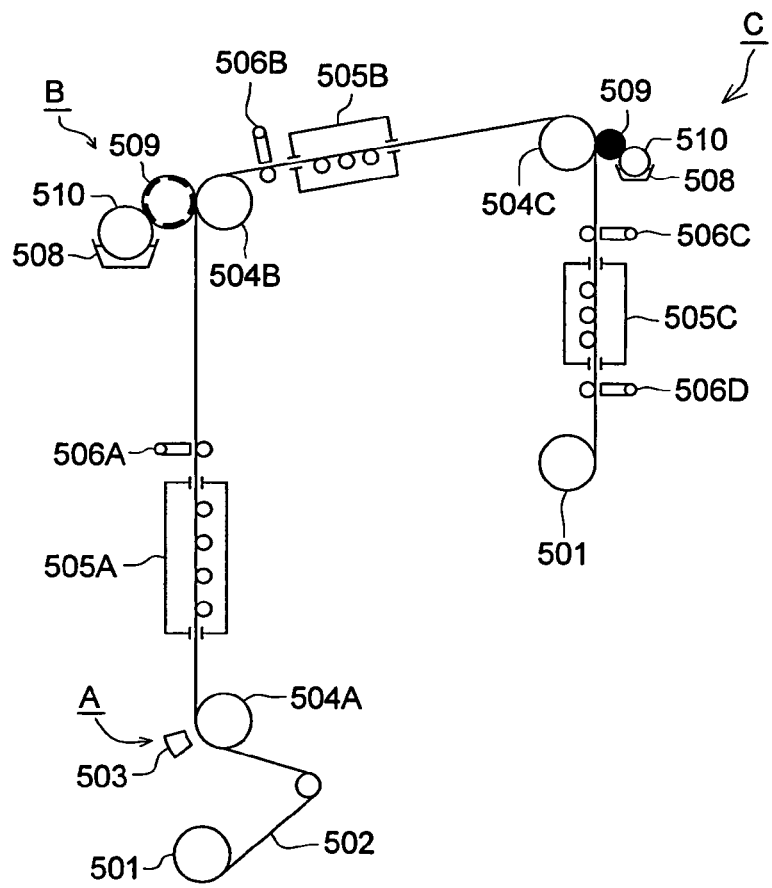

The following describes the method of producing an anti-glare film of the present invention:

FIG. 8 shows an example of producing a microscopically roughened structure on the substrate film by flexographic printing in (a) one flexographic printing operation and (b) a plurality of flexographic printing operations. To put it in greater details, it shows an example of the step of forming the anti-glare layer with microscopically roughened structure by flexographic printing, after a hard coat layer has been coated on a substrate film.

In FIG. 8(a), the substrate film 502 having been fed by a roll 501 is fed. and is coated with a hard coat layer by the first coater 503 based on the extrusion method at the first coater station A. In this case, the hard coat layer can be either a single layer structure or a multi-layer structure. Coating can also be performed by changing the film thickness across the width. The substrate film 502 coated with the hard coat layer is then dried in the drying zone 505A. In this case, both sides of the substrate film 502 are dried by the hot air wherein temperature and humidity are controlled. When an actinic radiation curable resin is used as a binder on the hard coat layer, after drying, it is cured by actinic radiation, e.g. ultraviolet ray emitted by the actinic radiation application section 506A. Alternatively, the dose and irradiation conditions can be controlled to achieve a half cured state. The actinic radiation can be applied to the substrate film 502 wound on the back roll whose temperature is controlled within the range of 20-120° C., using the actinic radiation application section 506A.

The film is then fed to the flexographic printing section B provided with the anti-glare layer using flexographic printing. The hard coat layer is preferably kept at the half cured state. The liquid ink is supplied from the ink supply tank 508 to the anilox roll 510. Ink is then transferred onto the resin plate 509 having the microscopically roughened structure as the flexographic printing section.

It is preferred to conduct transfer-printing in such a way that the convex portion will not be deformed or crashed by the impact of transfer-printing. For example, ink viscosity, the rubber hardness degree of the resin plate and print speed are preferably adjusted.

When the actinic radiation curable resin is used, actinic radiation—e.g. ultraviolet ray—is applied by the actinic radiation application section 506 B arranged on the rear of the resin plate 509 as the flexographic printing section, and the transfer-printed ink is cured. When the ink uses the thermosetting resin, the ink is heated and cured by the drying zone 505 B—e.g. the heat plate. Heating by the back roll 504 B as a heat roll also provides a preferred method.

In the flexographic printing section B, the actinic radiation application section 506 B and the resin plate 509 are arranged at an appropriate space separating them, in order to ensure that the light emitted from the actinic radiation application section 506 B does not directly affect the ink of the resin plate 509. Alternatively, a lightproof wall is preferably arranged between the actinic radiation application section 506 B and resin plate 509. Further, to ensure that the heat of the drying zone 505 B does not directly affect the ink of the resin plate 509, the resin plate 509 is provided with a heat insulating cover. Alternatively, a partition is preferably provided to shut off the drying air of the drying zone 505 B, as illustrated.

The drying zone 505 B removes unwanted organic solvents from the substrate film 502 having been cured so that the microscopically roughened structure formed by the transfer-printed ink can be maintained. After that, actinic radiation is applied thereto by the actinic radiation application section 506 C. The process of curing terminates.

The actinic radiation application section 506 C preferably applies the actinic radiation to the substrate film 502 on the back roll 504 C whose temperature is controlled within the range of 20-120° C.

FIG. 8(*b*) shows an example of the method of forming a microscopically roughened structure by a plurality of flexographic printing operations. The flexographic printing section C with the resin plate having its diameter changed is arranged on the back of the flexographic printing section B of FIG. 8(*a*), wherein two printing operations are performed, as shown in this production flow.

When a microscopically roughened structure is formed by flexographic printing in the present invention, it is preferably formed by feeding the substrate film at 1-500 m/min., preferably at 10-300 m/min.

The substrate film at the time of transfer-printing of ink is preferred to be uniformly charged. Electric charge is preferably eliminated immediately before transfer-printing of ink. Uniform electrostatic charging can be provided.

The microscopically roughened structure formed by transfer-printing of ink is checked to measure the anti-glare properties such as haze and the degree of transparency to make sure that measurements meet the predetermined values. If misalignment or fluctuation has been detected, it is preferred that the result should be fed back, the ink should be adjusted or the resin plate should be replaced. All the measurements are made preferably after all the roughened patterns have been formed and the resin has been cured. The measurement may be made in the middle of forming the roughened pattern. For example, further appropriate feedback control can be provided, if the measurement is made after forming a roughened pattern of greater size, and after forming a roughened pattern of smaller size thereafter.

<<Substrate Film>>

The substrate film used in the present invention is preferred to meet the requirements of easy production, excellent bondability with an actinic radiation curable resin layer, optical isotropy and optical transparency.

Transparency in the present invention means that the transmittance of visible light is 60% or more, preferably 80% or more. The particularly preferred transmittance is 90% or more.

There is no particular limitation if the above properties are provided, but examples include a cellulose ester based film, a polyester based film, a polycarbonate based film, a polyarylate based film, a polysulfone based film (including a polyethersulfone based film), a polyester film composed of polyethylene terephthalate or polyethylenenaphthalate, a polyethylene film, a polypropylen film, cellophane, a cellulosediacetate film, a cellulose triacetate film, a celluloseacetate propionate film, a celluloseacetate butyrate film, a polyvinylidene chloride film, a polyvinyl alcohol film, an ethylene vinyl alcohol film, a syndiotactic polystyrene based film, a polycarbonate film, a norbornene based resin film, a polymethylpentene film, a polyetherketone film, a polyetherketoneimide film, a polyamide film, a fluorine resin film, a nylon film, a polymethylmethacrylate film, an acrylic film, or a glass plate. Of these, a polycarbonate based film, a polyester based film, a norbornene based resin film, or a cellulose ester based film is preferable.

The polycarbonate constituting the polycarbonate resin film preferably used in the present invention can be selected from various types. From the viewpoint of chemical properties and physical properties, aromatic polycarbonate is preferably used. Bisphenol A is particularly preferred. Of the bisphenol A derivative obtained by introducing benzene ring, cyclohexane ring, aliphatic hydrocarbon group or others into the bisphenol A, the polycarbonate obtained by using the derivative introduced asymmetrically with respect to the central carbon is particularly preferred, wherein this polycarbonate is characterized by reduced anisotropy inside the unit molecule. It is exemplified by the polycarbonate obtained by replacing the two methyl groups of the central carbon of bisphenol A by the benzene ring, and one piece of hydrogen of each benzene ring of the bisphenol A by the methyl group, phenyl group and others symmetrically with respect to the central carbon.

To put it more specifically, it is obtained from 4,4'-dihydroxydiphenylalkane or the halogen substitution products thereof by the phosgene method or transesterification method. For example, 4,4'-dihydroxydiphenylmethane, 4,4'-dihydroxydiphenylethane, and 4,4'-dihydroxy diphenylbutane can be mentioned.

There is no particular restriction to the method of manufacturing the polycarbonate resin film used in the present invention. Namely, any one of the extrusion method, solvent cast method and calendered method can be used. In the present invention, a uniaxial oriented film or biaxial orientated film can be used. The film produced by the solvent cast method is preferred in the sense that the surface precision is excellent. The film produced by the extrusion method is preferred in the sense that the optical isotropy and anisotropy are smaller.

The polycarbonate resin used in the present invention is preferred to have a glass transition point (Tg) of 110° C. or more, and the percentage of water absorption (as measured under water at 23° C. for 24 hours) of 0.3% or less. More preferably, Tg is 120° C. or more, and the percentage of water absorption is 0.2% or more The polyester constituting the polyester resin that can be used in the present invention is the polyester, capable of forming a film, containing the dicarboxylic acid component and diol component as the major constituents, although there is no particular restriction thereto.

Examples of a major constituting component as a dicarboxylic acid component include a terephthalic acid, an isophthalic acid, a phthalic acid, a 2,6-naphthalenedicarboxylic acid, a 2,7-naphthalene dicarboxylic acid, a diphenylsulfonedicarboxylic acid, a diphenyletherdicarboxylic acid, a diphenylethanedicarboxylic acid, a cyclohexanedicarboxylic acid, a diphenyldicarboxylic acid, a diphenylthioetherdicarboxylic acid, a diphenylketonedicarboxylic acid, or a phenylindandicarboxylic acid. Examples of a diol component also include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis (4-hydroxyphenyl)sulfone, bisphenolfluorenedihydroxyethyl ether, diethylene glycol, neopentyl glycol, hydroquinone, or cyclohexanediol.

Of the polyesters containing the aforementioned major constituents, terephthalic acid and/or 2,6-naphthalene dicarboxylic acid is preferred as the dicarboxylic acid component from the viewpoint of transparency, mechanical strength, dimensions and stability, and the polyester containing the ethylene glycol and/or 1,4-cyclohexane dimethanol as a major constituent is preferred as the diol component. Above all, the most preferred ones are:

the polyester containing polyethylene terephthalate or polyethylene-2,6-naphthalate as the major constituent;

the copolymerized polyester made of terephthalic acid 2,6-naphthalene dicarboxylic acid, and ethylene glycol; and the polyester composed of a mixture of more than one polyester as major constituent.

The polyester constituting the polyester based film used in the present invention can be copolymerized with other polymerized components or mixed with other polyesters, provided that the advantages of the present invention are not adversely affected. They are exemplified by the aforementioned dicarboxylic acid component, diol component and the polyester made thereof.

Copolymerization of the compound containing bisphenol compound, naphthalene ring or cyclohexane ring is allowed to improve the heat resistance of the film. In this case, the preferred copolymerization ratio is 1-20% by mol with reference to the bifunctional dicarboxylic acid constituting the polyester.

The norbornene resin based film preferably used in the present invention is an amorphous polyolefin film having a norbornene structure, and specifically APO manufactured by Mitsui Petrochemical Industries, Ltd, ZEONEX manufactured by Nippon Zeon Co., Ltd, or ARTON manufactured by JSR Co.

It is preferable in the present invention that a cellulose ester based film is particularly employed. Preferable examples of cellulose ester include cellulose acetate, cellulose acetate butyrate, cellulose acetate propionate, but cellulose acetate butyrate, cellulose acetate phthalate, or cellulose acetate propionate is preferably used. From the viewpoint of production, cost, transparency, and adhesion property, preferably employed are commercially available cellulose ester films (e.g., Konica Tac, a trade name, KC8UX2MW, KC4UX2MW, KC8UY, KC12UR, KC4UY, KC5UY, KC12UR, KC8UCR-3, KC8UCR-4 and KC8UCR-5 manufactured by Konica Minolta Opto, Inc.). These films may be those prepared by either a melt-casting method or a solution-casting method.

Next, cellulose ester films particularly employed in the present invention will be explained in detail.

(Cellulose Ester Film)

It is preferable that cellulose ester used in the present invention is a lower fatty acid ester of cellulose. The lower fatty acid represents a fatty acid having 6 carbon atoms or less. Examples of a specific lower fatty acid ester of cellulose include: cellulose acetate, cellulose propionate, cellulose butyrate and mixed fatty acid esters, for example, cellulose acetate propionate and cellulose acetate butylate, which are disclosed in Japanese Patent O.P.I. Publication Nos. 10-45804 and 08-231761 and U.S. Pat. No. 2,319,052. Particularly, a lower fatty acid ester of cellulose preferably used is cellulose triacetate or cellulose acetate propionate. These cellulose esters may also be used singly or in combination.

When a molecular weight of cellulose ester is too small, tear strength is lowered, but in the case of an excessive amount of the molecular weight, productivity is lowered since viscosity of a cellulose ester solution becomes too high. The molecular weight of cellulose ester is preferably 7000-200000 in number average molecular weight (Mn), and more preferably 100000-200000.

An average acetylation degree (an amount of bonded acetic acid) preferably employed for cellulose triacetate is 54.0-62.5%, and more preferably 58.0-62.5%. In the case of a small average acetylation degree, a dimension variation is large, whereby a polarization degree of the polarizing plate, and in the case of a large average acetylation degree, the dimension variation is large, whereby lowered solubility to a solvent results in lowered productivity.

The preferable cellulose ester other than cellulose is cellulose ester possessing an acyl groups having 2-4 carbon atoms as a substituent, which satisfies following Expressions (I) and (II) at the same time when X is a substitution degree of an acetyl group, and Y is a substitution degree of a propionyl group or a butylyl group.

$$2.6 \leq X+Y \leq 3.0 \qquad \text{Expression (I)}$$

$$0 \leq X \leq 2.5 \qquad \text{Expression (II)}$$

Among them, cellulose acetate propionate is particularly preferable and that satisfying the relations of $1.9 \leq X \leq 2.5$ and $0.1 \leq Y \leq 0.9$ is preferable. The portion which is not substituted by the acyl group is generally occupied by the hydroxyl group. Such the cellulose esters can be synthesized by a commonly known method.

Cellulose ester can be prepared using cotton linter, wood pulp or kenaf as starting materials which may be used alone or in combination. It is specifically preferable to use a cellulose ester prepared from cotton linter (hereafter merely referred to as linter) or from wood pulp singly or in combination.

It is preferable that the cellulose ester film employed in the present invention is oriented at least in the lateral direction, though it is prepared by either a melt-casting method or a solution-casting method. It is particularly preferable that in the solution casting process the aforesaid film is oriented at a factor of 1.01-1.5 in the lateral direction when the residual solvent ratio at peeling is 3-40 percent by weight. It is more preferable that the aforesaid film is biaxially oriented in the lateral direction as well as in the longitudinal direction of the film. In such a case, it is preferable that when the residual solvent ratio at peeling is 3-40 percent by weight, the aforesaid film is oriented in the lateral direction as well as in the longitudinal direction of the film at a factor of 1.01-1.5, respectively. By so doing, it is possible to prepare an anti-glare low reflection film which exhibits excellent visibility. Further, by achieving the aforesaid biaxial orientation and the knurling treatment, it is possible to markedly minimize the degradation of the wound shape when a continuous anti-glare film is stored in the roll shape. Particularly, the orientation factor is preferably 1.03-1.45.

In the present invention, it is possible to use a continuous film having a practical length of 100-5,000 m. The substrate film has preferably a width of not less than 1.4 m, and more preferably a width of 1.4-4 m.

It is preferable in the present invention that the cellulose ester film is a transparent film having a light transmittance of at least 90 percent and more preferably at least 93 percent.

The thickness of the cellulose ester in the present invention is preferably 10-100 μm, and moisture permeability thereof is preferably not more than 200 g/m$^2$·24 hours at 25° C. and 90±2% RH, more preferably 10-180 g/m$^2$·24 hours, and most preferably not more than 160 g/m$^2$·24 hours.

It is particularly preferable that the thickness is 10-60 μm while the moisture permeability is in the foregoing range.

Herein, the moisture permeability of each sample was measured in accordance with the method described in JIS Z 0208.

In the case of a cellulose ester film employed for a substrate film in the present invention, the following plasticizers are preferred to be contained. Examples of plasticizers include a phosphoric acid ester based plasticizer, a phthalic acid ester based plasticizer, a trimellitic acid ester based plasticizer, a pyromellitic acid based plasticizer, a glycolate based plasticizer, a citric acid ester based plasticizer, a polyester based plasticizer, and a polyvalent alcohol ester based plasticizer.

Preferably employed as phosphoric acid ester based plasticizers are, for example, triphenyl phosphate, tricresyl phosphate, cresyl diphenyl phosphate, octyl diphenyl phosphate, diphenyl biphenyl phosphate, trioctyl phosphate, tributyl phosphate, and the like. Preferably employed as phthalic acid ester based plasticizers are diethyl phthalate, dimethoxyethyl phthalate, dimethyl phthalate, dioctyl phthalate, dibutyl phthalate, di-2-ethylhexyl phthalate, butylbenzyl phthalate, diphenyl phthalate, dicyclohexyl phthalate, and the like. Preferably employed as trimellitic acid based plasticizers are tributyl trimellitate, triphenyl trimellitate, trimethyl trimellitate, and the like. Preferably employed as pyromellitic acid ester based plasticizers are tetrabutyl pyromellitate, tetraphenyl pyromellitate, tetraethyl pyromellitate, and the like. Preferably employed as glycolate based plasticizers are triacetin, tributyrin, ethylphthalylethyl glycolate, methylphthalylethyl glycolate, butylphthalylbutyl glycolate, and the like. Preferably employed as citric acid ester based plasticizers are triethyl citrate, tri-n-butyl citrate, acetyltriethyl citrate, acetyltri-n-butylcitrate, acetyltri-n-(2-ethylhexyl)citrate, and the like. Examples of other carboxylic acid esters include butyloleate, methylacetyl recinoleate, dibutyl sebacate, and various trimellitic acid esters.

Employed as polyester based plasticizers may be copolymers of dibasic acids, such as aliphatic dibasic acid, alicyclic dibasic acid, or aromatic dibasic acid with glycol. Aliphatic dibasic acids are not particularly limited. Employed may be adipic acid, sebacic acid, phthalic acid, terephthalic acid, and 1,4-cyclohexyldicarboxylic acid. Employed as glycols may be ethylene glycol, diethylene glycol, 1,3-propylene glycol, 1,2-propylene glycol, 1,4-butylene glycol, 1,3-butylene glycol, and 1,2-butylene glycol. These dibasic acids or glycols may be employed singly or in combination of at least two types.

A polyvalent alcohol ester based plasticizer is composed of at least divalent aliphatic polyvalent alcohol and monocarboxylic acid ester. The following examples are provided as preferable polyvalent alcohol, but the present invention is not limited thereto. Examples of preferable polyvalent alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, 2-n-butyl-2-ethyl-1,3-propanediol, galactitol, mannitol, 3-methylpentane-1,3,5-triol, pinacol, sorbitol, trimethylolpropane, trimethylolethane and xylitol. Particularly, triethylene glycol, tetraethylene glycol, dipropylene glycol, tripropylene glycol, sorbitol, trimethylolpropane and xylitol are preferred. As the monocarboxylic acid to be used in the poly-valent alcohol ester, a known aliphatic monocarboxylic acid, alicyclic monocarboxylic acid and aromatic monocarboxylic acid can be employed though the monocarboxylic acid is not limited. The alicyclic monocarboxylic acid and aromatic monocarboxylic acid are preferable for improving moisture permeability and storage ability. As the preferable aliphatic monocarboxylic acid, a saturated fatty acid such as acetic acid, propionic acid, butylic acid, valeric acid, caproic acid, enantic acid, caprylic acid, pelargonic acid, capric acid, 2-ethyl-hexane carboxylic acid, undecylic acid, lauric acid, dodecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid or lacceric acid, and a unsaturated fatty acid such as undecylenic acid, oleic acid, sorbic acid, linolic acid, linolenic acid and arachidonic acid can be exemplified.

Examples of preferable alicyclic monocarboxylic acid include cyclopentene carboxylic acid, cyclohexane carboxylic acid, cyclooctane carboxylic acid and derivatives thereof. The molecular weight of the polyvalent alcohol is preferably 300-1,500, and more preferably from 350 to 750 though the molecular weight is not specifically limited. Larger molecular weight is preferable for storage ability, and smaller molecular weight is preferable for moisture permeability and compatibility with the cellulose resin.

The carboxylic acid used for polyvalent alcohol ester may be used singly or in combination with al least two types. OH-groups in the polyvalent alcohol may be entirely esterified by a carboxylic acid, or OH groups may be partly left.

These plasticizers may be used singly or in combination.

In view of film performance and workability, the consumption amount of the plasticizer to be used is preferably 1-20% by weight, and more preferably 3-13% by weight.

(UV Absorbent)

It is preferred that a UV absorbent is added into a substrate film used for the present invention.

Preferably employed as UV absorbents which efficiently absorb UV radiation of wavelengths shorter than 370 nm and minimally absorb visible light of wavelengths longer than 400 nm to result in good liquid crystal display properties.

Specific examples of UV absorbers which are preferably employed in the present invention include, but are not limited to, oxybenzophenone based compounds, benzotriazole based compounds, salicylic acid ester based compounds, benzophenone based compounds, cyanoacrylate based compounds, triazine based compounds, nickel complex salt based compounds, and so forth.

Preferably employed as benzotriazole based UV absorbents are compounds represented by Formula (1) described below.

Formula (1):

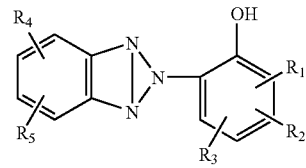

where $R_1$, $R_2$, $R_3$, $R_4$, and $R_5$ may be the same or be different, and each represents a hydrogen atom, a halogen atom, a nitro group, a hydroxyl group, an alkyl group, an alkenyl group, an aryl group, an alkoxy group, an acyloxyl group, an aryloxy group, an alkylthio group, an arylthio group, a monoalkylamino group or a dialkylamino group, an acylamino group, or a heterocyclic group of 5-6 members; and R4 and R5 may be combined to form a 5-6 membered ring.

Each of the above mentioned groups may have an arbitrary substituent.

Next, examples of UV absorbents used for the present invention are specifically provided, but the present invention is not limited thereto.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chlorobenzotriazole
UV-5: 2-(2'-hydroxy-3'-(3",4",5",6"-tetrahydro phthalimidomethyl)-5'-methylphenyl)benzotriazole
UV-6: 2,2-methylenebis(4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl)phenyl]propionate and 2-ethyl-hexyl-3-[3-tert-butyl-4-hydroxy-5-(5-chloro-2H-benzotriazole-2-yl)phenyl]propionate (TINUVIN109, product of Ciba Specialty Chemicals Inc.)

The compound represented by the following Formula (2) is preferably used as a benzotriazole UV absorbent Formula (2):

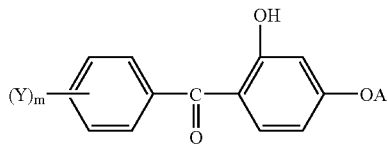

where Y represents a hydrogen atom, a halogen atom, an alkyl group, an alkenyl group, an alkoxyl group, or a phenyl group, and the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or a —CO(NH)$_{n-1}$-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include, for example, a halogen atom such as a chlorine atom, a bromine atom or a fluorine atom, and a hydroxyl group and a phenyl group (the phenyl group may further have an alkyl group or a halogen atom as a substituent).

Specific examples of a benzophenone based compound represented by Formula (2) are shown below, however, the present invention is not limited thereto.

UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

UV absorbents which are preferably employed in the present invention include benzotriazole based UV absorbents and benzophenone based UV absorbents which exhibit high transparency and excellent effects to minimize degradation of polarizing plates as well as liquid crystals. Of these, more preferably employed are benzotriazole based UV absorbents which exhibit less undesired coloration.

Further, UV absorbents at a distribution coefficient of at least 9.2, described in Japanese Patent O.P.I. Publication No. 2001-187835, enhance the surface quality of supports and exhibit excellent coating properties. It is particularly preferable to use UV absorbents of a distribution coefficient of at least 10.1.

Further, preferably employed are polymer type UV absorbers (or UV radiation absorptive polymers) represented by Formula (1) or (2) described in Japanese Patent O.P.I. Publication No. 6-148430 and represented by Formulas (3), (6), and (7) described in Japanese Patent O.P.I. Publication No. 2000-156039. As a polymer type UV absorber, PUVA-30M (manufactured by Otsuka Chemical Co., Ltd.) is commercially available.

(Particles)

In the present invention, particles in a cellulose ester film are preferably contained. Example of the particles include inorganic particles such as particles made of silicon dioxide, titanium dioxide, aluminum oxide, zirconium oxide, calcium carbonate, kaolin, talc, baked calcium silicate, hydrated calcium silicate, aluminum silicate, magnesium silicate or phosphate, and crosslinked polymer particles. Among them, silicon dioxide is preferable since the haze of the film can be lowered. A secondary particle average particle diameter of the particles are in the range of 0.01-1.0 μm, and the content is preferably 0.005-0.3% by weight. It is preferable to be possible to lower the haze of such films, though particles such as silicon oxide and the like are usually surface-treated by an organic substance. The preferable organic compound for the surface treatment includes halosilane, alkoxysilane (particularly having a methyl group), silazane and siloxane. The particles having lager average diameter displays higher matting effect and one having lower average diameter is superior in transparency. The primary particle average particle diameter is preferably in the range of 5-50 nm, and more preferably in the range of 7-16 nm. It is preferred that these particles are usually coagulated in a cellulose ester film as coagulated particles, whereby a roughened surface of 0.01-1.0 μm is formed on the cellulose ester film surface. Examples of silicon dioxide particles include AEROSIL 200, 200V, 300, R972, R972V, R974, R202, R812, OX50, TT600 and so forth, each manufactured by Aerosil Co., Ltd., and Aerosil 200V, R972, R972V, R974, R202 and R812 are preferable. These particles may be employed in combination with two or more kinds thereof. In the case of being used in combination with two or more kinds, they can be mixed at an arbitrary content ratio to be used. In such the case, Particles having a different particle diameter, made of a different material may be employed, for example, AEROGIL 200V and R972V can be used at weight ration in the range of 0.1:99.9-99.9:0.1. In the present invention, particles contained with cellulose ester, other additives, and an organic solvent may be dispersed during adjusting a dope, but it is preferable that a dope is adjusted in the state of another particle dispersion sufficiently dispersed with a cellulose ester solution. In order to disperse particles, it is preferred that a fine dispersing process is conducted by a homogenizer possessing a high shear force (high pressure homogenizer), after immersing in an organic solvent in advance. It is preferable that the resulting solution is dispersed in a larger amount of organic solvent after this, and combined with a cellulose ester solution to make a dope by mixing with an in-line mixer. In this case, a UV absorbent may be added into the particle dispersion to make a UV absorbent liquid.

The above degradation preventing agent, a UV absorbent and/or particles may be added with cellulose ester and a solvent when a cellulose ester solution is prepared, or may be added during or after preparing the solution.

(Organic Solvent)

There is no particular restriction to the organic solvent helpful in forming the dope of the cellulose ester film used in the present invention, if it permits simultaneous dissolution of cellulose ester and other additives. For example, methylene chloride can be mentioned as a chlorine-based organic solvent. The non-chlorine-based organic solvent is exemplified by methyl acetate, ethyl acetate, amyl acetate, acetone, tetrahydrofuran, 1,3-dioxolane, 1,4-dioxane, cyclohexanone, formic acidethyl, 2,2,2-trifluoro ethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Methylene chloride, methyl acetate, ethyl acetate and acetone can be preferably used. Use of methyl acetate is particularly preferred.

The dope of the present invention preferably contains 1-40% by weight of alcohol having 1-4 carbon atoms, in addition to the aforementioned organic solvent. An increase in the percentage of alcohol in the dope causes gelation of the web, resulting in easy separation from the metal supporting member. Insufficient percentage of alcohol promotes dissolution of the cellulose ester in the non-chlorine-based organic solvent. The alcohol having 1-4 carbon atoms is exemplified by methanol, ethanol, n-propanol, iso-propanol, n-butanol, sec-butanol and tert-butanol. Of these substances, use of ethanol is preferred because of superb dope stability, relatively low boiling point, excellent drying property and lack of toxicity.

Concentration of the cellulose ester in the dope is adjusted within the range of 15-40% by weight, and the dope viscosity is adjusted within the range from 100-500 poises (P). This adjustment is preferred in ensuring excellent film surface quality.

<<Hard Coat Layer>>

The following describes the hard coat layer of the present invention:

The hard coat layer of the present invention is preferred to contain the actinic radiation curable resin and particles. This makes it possible to produce an anti-glaring anti-reflection film characterized by sufficient strength and excellent transparency.

The hard coat layer preferably has a thickness of 2-20 μm. Further, the hard coat layer preferably contains the inorganic particles or organic particles having an average particle size of 1-100 nm.

(Particles Contained in the Hard Coat Layer)

In the present invention, the average particle size of the particle was determined as follows: The optical micrograph or scanning electron micrograph of the particle sample was taken. Then the diameters of 100 particles taken in the photograph were measured by the image processing apparatus LUZEX-III (by Nireco), and the average value of the measurements was calculated to get the average particle size.

The inorganic or organic particles are used as the particles contained in the hard coat layer according to the present invention.

The inorganic particles are exemplified by silicon oxide, titanium oxide, zirconium oxide, aluminum oxide, tin oxide, zinc oxide, calcium carbonate, sulfuric acid barium, talc, kaolin, and sulfuric acid calcium.

The organic particles include polymethacrylic acid methylacrylate resin particles, acryl styrene resin particles, polymethylmethacrylate resin particles, silicon resin particles, phenol resin particles, polystyrene resin particles, polycarbonate resin particles, benzoguanamine resin particles, melamine resin particles, polyolefin resin particles, polyester resin particles, polyamide resin particles, polyimide resin particles, and polyethylene fluoride resin particles.

The organic particles particularly preferred in the present invention are exemplified by silicon oxide particles, zirconium oxide particles, polymethylmethacrylate resin particles, polystyrene resin particles, and phenol resin particles.

The aforementioned inorganic or organic particles are preferably used after having been added to the coating composition containing the resins used in producing the hard coat layer. The average particle size of these particles is preferably 1-100 nm, more preferably 5-50 nm.

The amount of inorganic or organic particles contained is preferably 10-70 parts by weight, more preferably 20-60 parts by weight, with respect to 100 parts by weight of the actinic radiation curable resin contained in the hard coat layer. Use of two or more types of particles having different average particle sizes is also preferred.

The hard coat layer of the present invention can contain a static eliminating agent. The static eliminating agent contains at least one element selected from the groups of Sn, Sb, Ti, In, Al, Zn, Si, Mg, Ba, Mo, W and V as a major component, wherein the volume resistivity is $10^7$ ω·cm or less. Use of such a conductive material is preferred.

The aforementioned static eliminating agent is exemplified by the metal oxide and composite oxide containing the aforementioned element.

The preferred examples of the metal oxides are $ZnO$, $TiO_2$, $SnO_2$, $Al_2O_3$, $In_2O_3$, $SiO_2$, $MgO$, $BaO$, $MoO_2$, $V_2O_5$, ATO, ITO, $Sb_2O_5$ and the composite oxides thereof. In particular, $ZnO$, $In_2O_3$, $TiO_2$, ATO, ITO and $SnO_2$ are preferably used. Examples of containing different types of atoms are as follows: It is effective to add Al and In to $ZnO$; Nb and Ta to $TiO_2$; and Sb, Nb and halogen elements to $SnO_2$. The amount of these different types of atoms to be added is preferably within the range from 0.01-25% by mol, more preferably 0.1-15 by mol.

The volume resistivity of the metal oxide powder having the aforementioned conductivity is $10^7$ Ω·cm or less, preferably $10^5$ Ω·cm.

(Refractive Index of Hard Coat Layer)

When a low-refractive index layer is provided on the upper layer, the refractive index of the hard coat layer of the present invention is preferably within the range of 1.5-2.0, more preferably within the range of 1.5-1.7 for the purpose of optical designing to get a low-reflective film. The refractive index of the hard coat layer can be adjusted according to the refractive index and content of the particles or inorganic matrix to be added.

(Hard Coat Layer Film Thickness)

To ensure sufficient durability and resistance to impact, the hard coat layer has a film thickness of 2-20 μm, more preferably 3-16 μm.

(Hard Coat Layer Haze)

To get the advantages of the present invention (improved visibility), the hard coat layer haze is preferably 5-40%, more preferably 6-30%.

In this case, the haze can be measured according to the ASTM-D1003-52.

To adjust the haze value of the hard coat layer of the present invention within the preferred range, the aforementioned organic particles and/or inorganic particles are preferably contained in the hard coat layer. In particular, the silicon dioxide is preferably used since it is easily subjected to uniform dispersion. Such particles as silicon dioxide having been surface treated by the organic substance are also preferably utilized.

(Actinic Radiation Curable Resin and Other Additives)

The actinic radiation curable resin used in the hard coat layer refers to the resin that is cured by application of actinic radiation such as ultraviolet ray and electron beam, through crosslinking reaction. The component with the monomer containing an ethylenic unsaturated double bond is preferably used as such a resin. This will lead to formation of a hard coat layer that is cured when exposed to actinic radiation such as ultraviolet ray and electron beam. The actinic radiation curable resin is represented by the UV curable resin and electron beam curable resin. The resin cured when exposed to ultraviolet ray is preferred.

The UV curable resin is exemplified by the UV curable urethane acrylate resin, UV curable polyester acrylate resin, UV curable epoxyacrylate resin, UV curable polyol acrylate resin and UV curable epoxy resin. These resins are preferably used.

Generally, the UV curable acryl urethane resin can be easily obtained from the step wherein the product obtained by the reaction of the isocyanate monomer or prepolymer with the polyester polyol is further made to react with acrylate based monomer containing such a hydroxyl group as 2-hydroxyethylacrylate, 2-hydroxyethylmethacrylate (hereinafter referred to merely as "acrylate" on the understanding that methacrylate is contained in the acrylate) and 2-hydroxypropylacrylate. For example, the products disclosed in Japanese Patent O.P.I Publication No. 59-151110 can be employed.

For example, the mixture between 100 parts of Unidic 17-806 (by Dainippon Ink and Chemicals Incorporated) and 100 parts of 1 part of Coronate L (by Nippon Polyurethane K.K.) is preferably used.

Generally, the UV curable polyester acrylate resin can be easily obtained by the 2-hydroxyethylacrylate, 2-hydroxyacrylate based monomer reacting with polyester polyol. The product disclosed in Japanese Patent O.P.I Publication No. 59-151112 can be utilized.

The specific example of the UV curable epoxyacrylate resin includes the product generated by the reaction of reactive diluent and photoreaction initiator added to the epoxyacrylate as an oligomer. The product disclosed in Japanese Patent O.P.I Publication No. 1-105738 can be utilized.

Examples of the UV curable polyolacrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV curable resins include benzoine or derivative thereof, or acetophenones, benzophenones, hydroxy benzophenones, Michler's ketone, α-amyloxime esters, thioxanthones or derivatives thereof. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photoreaction of epoxyacrylates. The content of the photoinitiators or sensitizers in the UV curable resin layer is 0.1 to 15 parts by weight, and preferably 1 to 10 parts by weight, based on the 100 parts by weight of the UV curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koe-ihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Addition of silicon compound in particular to the coating solution of the hard coat layer is preferred. For example, polyether modified silicone oil is preferably added. The appropriate number average-molecular weight of the polyether modified silicone oil is within the range of 1000-100000, preferably 2000-50000. If the number average molecular weight is 1000 or less, the drying property of the coating film will be reduced. Conversely, if the number average molecular weight exceeds 100000, bleeding out to the coating film surface tends to be difficult.

Further, approximately 0.01-5.0% by weight of such a surfactant as a fluorine based surfactant, silicon based surfactant or nonionic surfactant can be added to the hard coat layer. When the surfactant is added, bondage of the ink used for flexographic printing in the present invention may deteriorate. This may impose quantitative restrictions. In this case, the hard coat layer is preferably provided with surface treatment such as alkali treatment and corona treatment (to be described later), before flexographic printing is performed.

(Method of Forming the Hard Coat Layer)

The solvent used for coating the hard coat layer of the present invention is selected as appropriate, for example, from carbohydrates, alcohols, ketones, esters, glycol ethers and solvents, and can be mixed for use. The solvent preferably used contains not less than 5% by weight, preferably 5-80% by weight, of propylene glycol monomer (C1-C4), alkyl ether or propylene glycol monomer (C1-C4), and alkyl ether ester.

The hard coat layer composition coating solution can be coated using a known method such as a gravure coater, spinner coater, wire bar coater, roll coater, reverse coater, extrusion coater, air doctor coater methods. The preferred coating speed is 10-60 m/min.

(Type of Actinic Radiation and Application Method)

After having been coated and dried, the hard coat layer composition is preferably exposed to actinic radiation such as ultraviolet ray and electron beam and is provided with curing treatment. The preferred time duration for exposure to actinic radiation is 0.5 seconds through 5 minutes. From the viewpoint of curing efficiency of the actinic radiation curable resin and work efficiency, the more preferred time duration is 1 second through 1 minute.

When the hard coat layer of the present invention contains actinic radiation curable resin, actinic radiation can be applied after the hard coat layer and anti-reflection layer (low- or high-refractive index layer) has been coated on the substrate film. However, actinic radiation is preferably applied when the hard coat layer is coated.

There is no restriction to the type of the energy source for applying the actinic radiation used in the present invention, if it activates the compound by the ultraviolet ray, electron beam or gamma ray. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 20 mJ/cm² or more. The more preferred amount is 50-10000 mJ/cm², and still more preferred amount is 50-2000 mJ/cm².

An electron beam can also be used. It includes the electron beam having an energy of 50-1000 keV, preferably, 100-300 keV discharged from various types of the electron beam accelerators such as the Cockroft-Walton type, van de Graaff type, resonance transformer type, insulation core transformer type, linear type, dynamitron type, and high frequency type.

The polymerization or photo-crosslinking reaction of the aforementioned actinic radiation curable resin used in the present invention can be started by the aforementioned actinic radiation curable resin alone. However, this may involve a prolonged polymerization induction period or delayed start of polymerization. This being the case, use of the aforementioned photosensitizer and photo-initiator is preferable, since it accelerates polymerization.

<<Anti-Glaring Anti-Reflection Film>>

The anti-glaring anti-reflection film of the present invention is preferably structured in such a way that a low-refractive index layer is arranged on the hard coat layer provided with the microscopically roughened structure by the aforementioned flexographic printing. More preferably, a high refractive index layer is arranged as a lower layer of the low-refractive index layer.

Particularly the present invention, the low-refractive index layer is preferably coated with the low-refractive index layer coating solution containing the hollow silica based particles that have an outer shell layer and a porous or hollow interior.

<Low-Refractive Index Layer>

The refractive index of the low-refractive index layer in the present invention is lower than that the refractive index of the substrate film as a supporting member. It is preferably within the range of 1.30-1.45 when measured at 23° C. with a wavelength of 550 nm.

The film thickness of the low-refractive index layer is preferably 5-0.5 μm, more preferably 10-nm through 0.3 μm, still more preferably 30 nm through 0.2 μm.

The composition for formation of the low-refractive index layer used in the present invention is preferably made of (a) the organic silicon compound expressed by following Formula (3), the hydrolysate thereof or the polycondensation product thereof; and (b) the hollow silica based particles that have an outer shell layer and a porous or hollow interior.

  Formula (3)

(where R denotes an alkyl group, preferably, alkyl group having 1-4 carbon atoms)

Further, a solution, or silane coupling agent and curing agent may be added, if required.

[Hollow Silica Based Particles]

The following describes the aforementioned (b) the hollow silica based particles that have an outer shell layer and a porous or hollow interior:

The hollow silica based particles can be classified into (I) the composite particles made of porous particle and the coated layer arranged on this porous particle surface; and (II) the cavity particles that have a hollow interior filled with solvent, gas or porous substances. The requirements are met if the low-refractive index layer contains (I) composite particles and/or (II) cavity particles.

The cavity particles have a hollow interior which is surrounded with particle walls. The cavity is filled with the solvent, gas or porous substances used at the time of preparation. The average particle diameter of such hollow particles is preferably 5-300 nm, more preferably 10-200 nm. The hollow particles to be used is properly selected in conformance to the thickness transparent film to be formed. Its thickness is preferably ⅔-1/10 that of the transparent film such as low-refractive index layer to be formed. For formation of the low-refractive index layer, these hollow particles are preferably used as they are dispersed in a proper medium. The preferred dispersion medium includes water, alcohol (e.g. methanol, ethanol, isopropyl alcohol) and ketone (e.g. methyl ethyl ketone and methyl isobutyl ketone) and ketone alcohol (e.g. diacetone alcohol).

The thickness of the coated layer of the composite particle or cavity particle wall is preferably 1-20 nm, preferably, 2-15 nm. In the case of the composite particle, if the thickness of the coated layer less than 1 nm, the particles may not completely be covered. Further, the silica monomer and oligomer having a lower degree of polymerization as coating solution components (to be described later) will easily enter the composite particle, and will reduce the internal porosity, with the result that a sufficient effect of low-refractive index may not be obtained. If the thickness of the coated layer exceeds 20 nm, the aforementioned silica monomer and oligomer do not come inside. However, the porosity (porous volume) of the composite particle will be reduced, a sufficient effect of low-refractive index may not be obtained. In the case of cavity particles, if the thickness of the particle wall is less than 1 nm, the shape of the particle may not be maintained. If the thickness exceeds 20 nm, a sufficient effect of low-refractive index may not be obtained.

The coated layer of the composite particle or cavity particle wall is preferably made of silica as a main component. A component other than silica may be contained. To put it more specifically, $Al_2O_3$, $B_2O_3$, $TiO_2$, $ZrO_2$, $SnO_2$, $CeO_2$, $P_2O_3$, $Sb_2O_3$, $MoO_3$, $ZnO_2$, $WO_3$ can be mentioned. The porous particles constituting a composite particle include those composed of silica, those made of silica and inorganic compound other than silica, and those made of $CaF_2$, NaF, $NaAlF_6$, and MgF. Of these, the porous particles made of composite oxide of silica and inorganic compound other than silica are preferably used. The inorganic compound other than silica can be exemplified by the compound made of one or two of $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such porous particles, silica is expressed by $SiO_2$ and the inorganic compound other than silica is represented by the equivalent oxide (MOx). In this case, the mole ratio $MOx/SiO_2$ is preferably within the range of 0.0001-1.0, more preferably 0.001-0.3. Particles cannot be easily obtained if the mole ratio $MOx/SiO_2$ of the porous particle is less than 0.0001. Even if it can be obtained, the pore volume will be small, and the particle of small refractive index cannot be obtained. If the mole ratio $MOx/SiO_2$ of the porous particle exceeds 1.0, the proportion of the silica will be reduced, hence the pore volume will be increased. This may make it all the more difficult to get the particles of low refractive index.

The pore volume of such porous particles is preferably 0.1-1.5 ml/g, more preferably 0.2-1.5 ml/g. If the pore volume is less than 0.1 ml/g, the particles of sufficiently reduced refractive index cannot be ensured. If it exceeds 1.5 ml/g, the strength of the particles will be reduced, hence the strength of the produced film may be reduced.

The pore volume of such porous particle can be obtained by the method of mercury penetration. The contents inside the cavity particle can be exemplified by the solvent, gas and porous substance used at the time of preparing the particles. The solvent may contain the unreacted substances of the particle precursor and the catalysts used at the time of preparing the cavity particle. The porous substances includes the compounds listed with reference to the aforementioned porous particle. These contents may be made of a single compound or a mixture of a plurality of compounds.

To produce such hollow particles, the composite oxide colloid particle preparation methods disclosed in the paragraph numbers [0010] through [0033] of Japanese Patent O.P.I Publication No. 7-133105 are preferably employed. To put it more specifically, when the composite particle is made of silica and inorganic compound other than silica, the hollow particles are manufactured according to the first through third Steps given below:

1st Step: Preparation of Porous Particle Precursor

In the first Step, aqueous alkaline solutions of silica material and inorganic compound material other than silica are prepared separately in advance or, the aqueous solution of a mixture of silica material and inorganic compound material other than silica is prepared. In response to the percentage of the composite of the intended composite oxide, this aqueous solution is added, with stirring, gradually into the alkaline solution having a pH greater than 10, whereby the porous particle precursor is prepared.

The silicate of alkali metal, ammonium or organic base is used as a silica material. Sodium silicate (water glass) or potassium silicate is utilized as the silicate of alkali metal. The organic base can be exemplified by quaternary ammonium salts such as tetraethyl ammonium salts, and amines such as monoethanol amine, diethanol amine and triethanol amine. The silicates of the ammonium or silicates of the organic salts also includes alkaline solution obtained by adding ammonia, quaternary ammonium hydroxide and amine compound to the silica solution.

The alkali soluble inorganic compound is used as the inorganic compound material other than silica. To put it more specifically, the oxo acid as an element selected from among Al, B, Ti, Zr, Sn, Ce, P, Sb, Mo, Zn and W, the alkali metal salt of this oxo acid, alkali earth metal salt, ammonium salt or quaternary ammonium salt are used. To put it more specifically, sodium aluminate, sodium tetraborat, zirconyl carbonate ammonium, potassium antimonate, potassium stannate, sodium aluminosilicate, sodium molybdate, cerium nitrate ammonium, and sodium phosphate are preferably used.

The pH value of the aqueous mixture solution undergoes changes with addition of these aqueous solution. However, it is not necessary to control this pH value within the predetermined range. In the final phase, the aqueous solution has the pH value determined by the type of the inorganic oxide and its bending ratio. There is no restriction to the speed of adding the aqueous solution in this case. Further, when the composite oxide particle is manufactured, the aqueous dispersion of the seed particle can be used as the starting material. There is no particular restriction on this seed particle. The particles made of inorganic oxide such as $SiO_2$, $Al_2O_3$, $TiO_2$ or $ZrO_2$ or the composite oxide thereof are utilized. Normally, the sol thereof can be used. Further, the porous particle precursor aqueous dispersion obtained according to the aforementioned production method can be used as seed particle aqueous dispersion. When the seed particle aqueous dispersion is used, the pH value of seed particle aqueous dispersion is adjusted to 10 or more. After that, the aqueous solution of the aforementioned compound is added to this seed particle aqueous dispersion, being stirred in aqueous alkaline solution. In this case, the pH value of the aqueous dispersion need not necessarily be controlled. Use of the seed particles are used in this manner, ensures easy control of the diameter of the porous particle to be prepared, and provides uniform particle sizes.

The aforementioned silica material and inorganic compound material exhibit a high degree of solubility on the alkali side. However, if they are mixed in the pH region where the solubility is high, the solubility of the oxo acid such as silica ion and aluminic acid ion will be reduced. Their composites will be deposited to grow into particles. Alternatively, they will be deposited on the seed particle to cause particle growth. This being the case, pH control is not always necessary at the time of deposition and growth of the particles, as in the conventional method.

The ratio of composition of silica and inorganic compound other than silica in the first Step is determined as follows: The inorganic compound with respect to silica is converted into the equivalent oxide ($MO_x$), and the mole ratio of the $MO_x$/$SiO_2$ is kept preferably within the range of 0.05-2.0, more preferably 0.2-2.0. The small the ratio of silica within this range, the greater the pore volume of the porous particle. However, even if the mole ratio is over 2.0, the pore volume of the porous particle hardly increases. If the mole ratio is less than 0.05, the pore volume reduces. When the cavity particle is prepared, the mole ratio of the $MOx/SiO_2$ is preferably 0.25-2.0.

2nd Step: Removal of the Inorganic Compound Other than Silica from the Porous Particle In the second Step, at least part of the inorganic compound other than silica (elements other than silicon and oxygen) is removed on a selective basis from the porous particle precursor having been obtained in the aforementioned first Step. To put it more specifically, the inorganic compound in the porous particle precursor is dissolved and removed by mineral acid and organic acid. Alternatively, it is brought in contact with a positive ion exchange resin and is removed by ion exchange.

The porous particle precursors obtained in the first Step are the particle of a network structure composed of a silicon and inorganic compound constituent element bonded together through oxygen. As described above, the porous particles characterized by one layer of porous structure and greater pore volume are provided by removing the inorganic compound (elements other than silicon and oxygen) from the porous particle precursor. Cavity particles can be prepared by increasing the amount of the inorganic compound (elements other than silicon and oxygen) removed from the porous particle precursor.

Before removing the inorganic compound (elements other than silicon and oxygen) from the porous particle precursor, silica solution or hydrolytic organic silicon compound, containing the silane compound made of fluorine-substituted alkyl group, obtained by dealkalization of the alkali metal salt of silica, is preferably added to the porous particle precursor aqueous dispersion obtained in the first Step, whereby a silica protective film is formed. It is sufficient only if silica protective film has a thickness of 0.5-15 nm. Even if a silica protective film is formed, the protective film in this Step is porous and is less thick. Such being the case, the aforementioned inorganic compound other than silica can be removed from the porous particle precursor.

By forming such a silica protective film, the aforementioned inorganic compound other than silica can be removed from the porous particle precursor, with the shape of the particle kept unchanged. When forming the silica coated layer to be described later, porous particle pores are not blocked by the coated layer. This makes it possible to form the silica coated layer (to be described later) without the pore volume being reduced. When a small amount of inorganic compound is removed, the particles are not damaged. Accordingly, formation of a protective film is not imperative.

When cavity particles are prepared, this silica protective film is preferably formed. If the inorganic compound is removed in preparing cavity particles, a cavity particle precursor is obtained, wherein this cavity particle precursor is made of silica protective film, solvent inside this silica protective film and undissolved porous solid. If the coated layer to be described later is formed on this cavity particle precursor, the coated layer having been formed becomes a particle wall and cavity particles are formed.

The amount of the silica source added to form the aforementioned silica protective film is preferably as small as possible without damaging the particle shape. If the amount of silica source is excessive, the silica protective film will be too thick. This may make it difficult to remove the inorganic compound other than silica from the porous particle precursor. The alkoxy silane expressed by the formula $R_nSi(OR')_{4-n}$ [R,R': hydrocarbon group such as alkyl group, aryl group, vinyl group and acryl group; n=0, 1, 2 or 3] can be used as a hydrolytic organic silicon compound used to form the silica protective film. Especially, tetraalkoxy silane such as the fluorine-substituted tetramethoxysilane, tetraethoxysilane and tetraisoprophoxysilane is preferably utilized.

The following procedure is used for addition: The solution prepared by adding a small quantity of alkali or acid as the catalyst to the mixture solution of the alkoxy silane, demineralized water and alcohol is added to the aqueous dispersion of the aforementioned porous particle. The silica polymer generated by hydrolysis of the alkoxy silane is deposited on the surface of the inorganic oxide particle. In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle precursor is water alone or contains a high proportion of water with respect to the organic solvent, silica solution can be used to form a silica protective film. When the silica solution is used, a predetermined amount of silica solution is added to the aqueous dispersion. At the same time, alkali is added so that silica solution is deposited on the porous particle surface. A silica protective film can be produced by a combined use of the silica solution and the aforementioned alkoxy silane.

3rd Step: Formation of Silica Coated Layer

In the third step, the hydrolytic organic silicon compound or silica solution containing the fluorine-substituted alkyl group-containing silane compound is added to the porous particle aqueous dispersion (cavity particle precursor aqueous dispersion in the case of the cavity particle) prepared in the second Step. This procedure ensures that the particle surface is covered with the polymer such as the hydrolytic organic silicon compound or silica solution, whereby a silica coated layer is formed.

The alkoxy silane expressed by the aforementioned formula $R_nSi(OR')_{4-n}$ [R, R': hydrocarbon group such as alkyl group, aryl group, vinyl group and acryl group; n=0, 1, 2 or 3] can be used as the hydrolytic organic silicon compound used for forming the silica coated layer. Especially, the tetraalkoxy silane such as tetramethoxysilane, tetraethoxysilane and tetraisoprophoxysilane is preferably used.

The following procedure is taken for addition: The solution prepared by adding a small quantity of alkali or acid as the catalyst to the mixture solution of the alkoxy silane, demineralized water and alcohol is added to the aqueous dispersion of the aforementioned porous particle (cavity particle precursor in this case of the cavity particle). The silica polymer generated by hydrolysis of the alkoxy silane is deposited on the surface of the porous particle (cavity particle precursor in this case of the cavity particle). In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle (cavity particle precursor in this case of the cavity particle) is water alone or the solution of mixture with the organic solvent wherein the proportion of water is high with respect to the organic solvent, then silica solution can be used to form a silica protective film. The silica solution refers to the aqueous solution of the low polymer of silica obtained by dealkalization of aqueous solution of alkali metal silicate such as water glass through ion exchange treatment.

The silica solution is added to the porous particle (cavity particle precursor in this case of the cavity particle) aqueous dispersion. At the same time, alkali is added so that the silica low-polymer is deposited on the surfaced of the porous particle (cavity particle precursor in this case of the cavity particle). The silica solution can be used in combination with the aforementioned alkoxy silane so that a coated layer is formed. The amount of organic silicon compound or silica solution added to form the coated layer should be such that the surface of the colloid particle is sufficiently covered. The organic silicon compound or silica solution is added in the dispersion of the porous particle (cavity particle precursor in this case of the cavity particle), in such an amount that the silica coated layer obtained in the final phase has a thickness of 1-20 nm. When the aforementioned silica protective film has been formed, the organic silicon compound or silica solution is added in such an amount that the total of the thicknesses of the silica protective film and silica coated layer is within the range of 1-20 nm.

Then the aqueous dispersion of the particles of which the coated layer is formed is subjected to heating. In the case of porous particles, the silica coated layer covering the porous particle surface is made compact by heating, thereby producing the dispersion of composite particles wherein porous particles are covered with the silica coated layer. In the case of cavity particle precursor, the coated layer having been formed is made compact and becomes a cavity particle wall, thereby producing the dispersion of cavity particles having a cavity filled with solvent, gas or porous solid.

There is no particular restriction to the heating temperature in this case, if the microscopic pore of the silica coated layer can be blocked. The heating temperature is preferably within the range of 80-300° C. If the heating temperature is less than 80° C., the microscopic pore of the silica coated layer may be completely blocked and may not be made compact. Alternatively, a longer time will be required in some cases. If the heating temperature is over 300° C., compact particles may be produced and the advantages of low-refractive index cannot be ensured in some cases.

The refractive index of the inorganic particles obtained in this manner is as low as less than 1.42. In such inorganic particles, the porosity inside the porous particle or the interior is void. This is estimated to cause low refractive index.

The amount of the hollow silica based particles, having an outer shell layer with porous or void interior, contained in the low-refractive index layer, is preferably within the range of 10-50% by weight. It is preferably 15% by weight or more if the advantages of low-refractive index are to be gained. If it exceeds 50% by weight, the amount of the binder component will reduce and a sufficient film strength cannot be ensured.

(Silicon-Containing Compound)

The organic silicon compound is expressed by aforementioned Formula (3) wherein R denotes the alkyl group having 1-4 carbon atoms.

To put it more specifically, tetramethoxysilane, tetraethoxysilane and tetraisoprophoxysilane are preferably used.

The following procedure is taken for addition to the low-refractive index layer: The solution prepared by adding a small quantity of alkali or acid as the catalyst to the mixture solution of the tetraalkoxy silane, demineralized water and alcohol is added to the aqueous dispersion of the aforementioned porous particle. The silica polymer generated by hydrolysis of the tetraalkoxy silane is deposited on the surface of the hollow silica based particles. In this case, the tetraalkoxy silane, alcohol catalyst can be added simultaneously in the aqueous dispersion. Ammonia, hydroxide of alkali metal and amines can be used as the alkali catalyst. Varieties of inorganic and organic acids can be used as acid catalyst.

In the present invention, the low-refractive index layer can include the fluorine-substituted alkyl group-containing silane compound expressed by following Formula (4).

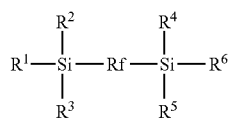

Formula (4)

The following describes the fluorine-substituted alkyl group-containing silane compound expressed by aforementioned Formula (4):

In Formula (4), $R^1$-$R^6$ denotes the alkyl group having 1-16 carbon atoms, preferably 1-4; the halogenated alkyl group having 1-6 carbon atoms, preferably 1-4; the aryl group having 6-12 carbon atoms, preferably 6-10; the alkylaryl group and aryl alkyl group having 7-14 carbon atoms, preferably 7-12; the alkenyl group having 2-8 carbon atoms, preferably 2-6; or alkoxy group, hydrogen atom or halogen atom having 1-6 carbon atoms, preferably 1-3.

Rf denotes —$(C_aH_bF_c)$—, "a" shows an integer of 1-12, "b+c" indicates 2a, "b" shows an integer of 0-24, and "c" represents an integer of 0-24. A group containing the fluoroalkylene group and alkylene group is preferably used as Rf. To put it more specifically, the fluorine-containing silicone compound is exemplified by methoxydisilane compound expressed by $(MeO)_3SiC_2H_4C_2F_4C_2H_4Si(MeO)_3$, $(MeO)_3SiC_2H_4C_4F_8C_2H_4Si(MeO)_3$, $(MeO)_3SiC_2H_4C_6F_{12}C_2H_4Si(MeO)_3$, $(H_5C_2O)_3SiC_2H_4C_4F_8C_2H_4Si(OC_2H_5)_3$ and $(H_5C_2O)_3SiC_2H_4C_6F_{12}C_2H_4Si(OC_2H_5)_3$.

If a fluorine-substituted alkyl group-containing silane compound is included as a binder, the transparent film per se to be formed is hydrophobic. Such being the case, intrusion of water contents or acidic or alkaline chemicals into the transparent film is placed under control, even when the transparent film is porous without sufficiently made compact and contains cracks or voids. Further, the metals and other particles on the substrate surface or contained in the conductive layer as a lower layer do not react with water contents or acidic or alkaline chemicals. This arrangement provides a transparent film characterized by an excellent resistance to chemicals.

If the fluorine-substituted alkyl group-containing silane compound is contained as a binder, the aforementioned hydrophobicity as well as excellent sliding property (low contact resistance) are ensured. Thus, a transparent film characterized by superb scratch strength is provided. Further, if the binder contains the fluorine-substituted alkyl group-containing silane compound having such a constituent unit, the shrinkage rate of the binder is equal to or close to that of the conductive layer when a conductive layer is formed on the lower layer. This makes it possible to form a transparent film characterized by very close adhesion with the conductive layer. Further, this arrangement prevents the conductive layer being separated due to the difference in the shrinkage rate, and a portion without electrical contact from occurring to the transparent conductive layer, when the transparent film is subjected to heat treatment. Such being the case, this arrangement ensures a sufficient conductivity as the entire film.

The transparent film containing the fluorine-substituted alkyl group-containing silane compound, and the hollow silica based particles having the aforementioned outer shell layer with porous or void interior is characterized by excellent strength; it has a high degree of scratch strength, film strength that is evaluated in terms of eraser strength or nail strength and pencil hardness.

A silane coupling agent of the present invention may be contained in a low refractive index layer. Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltriethoxysilane, N-β-(aminoethyl)-γ-aminopropyltrimethoxysilane, and β-cyanoethyltriethoxysilane.

Further, examples of silane coupling agents having an alkyl group of 2-substitution for silicon include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropyldiethoxysilane, methylvinyldimethoxysilane, and methylvinyldiethoxysilnae.

Of these, preferred are vinyltrimethoxysilane, vinyltriethoxysilane, vinylacetoxysilane, vinyltrimethoxethoxyysilane, γ-acryloyloxypropylmethoxysilane, and γ-methacryloyloxypropylmethoxysilane which have a double bond in the molecule, as well as γ-acryloyloxypropylmethyldimethoxysilane, γ-acryloyloxypropyldiethoxysilane, γ-methacryloyloxypropylmethyldimethoxysilane, γ-methacryloyloxypropylmethyldiethjoxysilane, methylvinyldimethoxysilane, and methylvinyldiethaoxysilane which have an alkyl group having 2-substitution to silicon. Of these, particularly preferred are γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane, and γ-methacryloyloxypropylmethyldiethoxysilane.

At least two types of coupling agents may simultaneously be employed. In addition to the above silane coupling agents, other silane coupling agents may be employed. Listed as other silane coupling agents are alkyl esters of ortho-silicic acid (for example, methyl orthosilicate, ethyl orthosilicate, n-propyl orthosilicate, i-propyl orthosilicate, n-butyl orthosilicate, sec-butyl orthosilicate, and t-butyl orthosilicate) and hydrolyzed products thereof.

Examples of a polymer employed for the other binder of a low refractive index layer include polyvinyl alcohol, polyoxyethylene, polymethyl methacrylate, polymethyl acrylate, diacetyl cellulose, triacetyl cellulose, nitrocellulose, polyester, or an alkyd resin.

It is preferable that a low refractive index layer contains 5-80% by weight of binder altogether. The binder exhibits a function of adhering of hollow silica particles accompanied with maintaining of a low refractive index layer having voids. The consumption amount of binder to be used is capable of adjusting strength of a low refractive index layer without filling the voids.

It is preferred that a low refractive index layer of the present invention contains an organic solvent. Specific examples of organic solvents include alcohol (for example, methanol, ethanol, isopropanol, butanol, and benzyl alcohol), ketone (for example, acetone, methyl ethyl ketone, methyl isobutyl ketone, and cyclohexanone), ester (for example, methyl acetate, ethyl acetate, propyl acetate, butyl acetate, methyl formate, ethyl formate, propyl formate and butyl formate), aliphatic hydrocarbon (for example, hexane and cyclohexanone), halogenated hydrocarbon (for example, methylene chloride, chloroform, and carbon tetrachloride), aromatic hydrocarbon (for example, benzene, toluene, and xylene), amide (for example, dimethylformamide, diethylacetamide, and n-methylpyrrolidone), ether (for example, diethyl ether, dioxane, and tetrahydrofuran), and ether alcohol (for example, 1-methoxy-2-propanol). Of these, particularly preferred are toluene, xylene, methyl ethyl ketone, methyl isobutyl ketone, cyclohexane and butanol.

The content of an organic solvent is preferably 1-4% by weight of a solid concentration in the low refractive index layer coating composition, and it is preferred that the content is at least 1% by weight since an organic solvent inhibits coating unevenness to have a uniform thickness, but when the content exceeds 4% by weight, it is not preferable since a drying load increases, and a large scale dryer and a long period of drying time needs to be satisfied.

<High Refractive Index Layer>

It is preferable in the present invention that the following high refractive index layer is provided as a lower layer of the foregoing low refractive index layer.

It is preferable that a high refractive index layer contains metal oxide particles (c), a metal compound (d), and an ionizing radiation curable resin (e).

(Metal Oxide Particle)

Metal oxide particles are preferably contained in a high refractive index layer of the present invention. Examples of metal oxide particles are those incorporating at least one element selected from the group including Ti, Zr, Sn, Sb, Cu, Fe, Mn, Pb, Cd, As, Cr, Hg, Zn, Al, Mg, Si, P, and S, though kinds of metal oxide particles are not particularly limited. These metal oxide particles may be those having doped a small amount of atoms such as Al, In, Sn, Sb, Nb, a halogen element, and Ta, or may be their admixture. Of these, preferably employed as major components of the metal oxide particles in the present invention is at least one kind selected from the group including zirconium oxide, antimony oxide, tin oxide, zinc oxide, Indium oxide-tin (ITO), antimony doped tin oxide (ATO), and antimony acid zinc, and more preferably indium oxide-tin (ITO).

The primary particle average particle diameter of these metal oxide particles is in the range of 10-200 nm, and preferably 10-150 nm. The average particle diameter of metal oxide particles may be determined via micrographs observed by a scanning electron microscope (SEM), or may be determined by a dynamic light scanning method or static light scanning method employing a particle size analyzer. In the case of very small particles in size, coagulation is easily generated, whereby dispersibility is deteriorated, and in the case of very large particles in size, it is not desired that haze is largely increased. It is preferred that the shape of the particle may be rice-shaped, spherical, cube, rod-like, fusiform-shaped, needle-shaped, and irregular shape.

It is preferable that the refractive index of a high refractive index layer is higher than a refractive index of a substrate film as a support, and is in the range of 1.50-1.70 at 23° C. and 550 nm in wavelength. Though kinds of metal oxide particles or the addition amount are major variables as a means to adjust the refractive index of a high refractive index layer, a refractive index of metal oxide particles is preferably 1.80-2.60, and more preferably 1.85-2.50.

Metal oxide particles may be surface-treated by an organic compound. Dispersion stability is improved by modifying the metal oxide particle surface with an organic compound, and aging coagulation and a precipitation can also be inhibited since a particle diameter via dispersion is easily controlled. For this reason, an amount of surface modification in a desired organic compound is 0.1-5% by weight, based on that of metal oxide particles, and more preferably 0.5-3% by weight. Provided as examples of organic compounds used for the surface treatment are polyol, alkanolamine, stearic acid, a silane coupling agent, and a titanate coupling agent. Of these, a silane coupling agent is preferred. Two or more kinds of the surface treatment may be combined.

Thickness of a high refractive index layer containing the foregoing metal oxide particles is preferably 5-1000 nm, more preferably 10-200 nm, and most preferably 30-100 nm.

A ratio of the foregoing metal oxide particles and binder of the following ionizing radiation curable resin or such depends on kinds of metal oxide particles, particle size, and so forth, but approximately desired is, in a volume ratio, 1 of the former: 2 of the latter to 2 of the former: 1 of the latter.

A consumption amount of metal oxide particles contained in a high refractive index layer, to be used in the present invention, is preferably 5-85% by weight, more preferably 10-80% by weight, and most preferably 20-75% by weight. In the case of a small consumption amount to be used, a desired refractive index as well as effects of the present invention can not be obtained, and in the case of the excessive amount to be used, degradation of the film strength and so forth are generated.

The above metal oxide particles are dispersed into a medium and fed to liquid compositions to form a high refractive index layer. Preferably employed as dispersion medium of metal oxide particles is a liquid at a boiling point of 60-170° C. Specific examples of dispersing solvents include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexanone), halogenated hydrocarbons (for example, methylene chloride, chloroform, and carbon tetrachloride), aromatic hydrocarbons (for example, benzene, toluene, and xylene), amides (for example, dimethylformamide, diethylacetamide, and n-methylpyrrolidone), ethers (for example, diethyl ether, dioxane, and tetrahydrofuran), and ether alcohols (for example, 1-methoxy-2-propanol). Of these, particularly preferred are toluene, xylene, methyl ethyl ketone, methyl isobutyl ketone, cyclohexane and butanol.

Further, it is possible to disperse metal oxide particles into a medium employing a homogenizer. Listed as examples of homogenizers are a sand grinder mill (for example, a bead mill with pins), a high speed impeller mill, a pebble mill, a roller mill, an attritor, and a colloid mill. Of these, particularly preferred are the sand grinder and the high speed impeller mill. Preliminary dispersion may be performed. Listed as examples which are used for the preliminary dispersion are a ball mill, a three-roller mill, a kneader, and an extruder.

Metal oxide particles having a core/shell structure may further be contained in the present invention. A shell layer may be formed around a core, and the plural layers may also be formed to improve a light resistance property. It is preferable that a core is entirely covered by the shell.

Examples of the core to be used include titanium oxide, (a rutile type, zirconium oxide, zinc oxide, cerium oxide, zinc doped indium oxide, antimony doped tin oxide, but the rutile type titanium oxide may be the major component.

It is preferable that a shell is an inorganic compound other than titanium oxide as a major component, and is made of a metal oxide or a metal sulfide. Examples of the inorganic compound as a major component include silicon dioxide (silica), aluminium oxide (alumina), zirconium oxide, zinc oxide, tin oxide, antimony oxide, indium oxide, ferrous oxide, zinc sulfide, and so forth. Of these, alumina, silica, zirconia (zirconium oxide) are preferable. These admixture may also be allowed to be used.

A coating amount of a shell to a core is 2-50% by weight in average coating amount, preferably 3-40% by weight, and more preferably 4-25% by weight. In the case of an excessive amount of coating, a refractive index of particles are lowered, and in the case of a small amount of coating, a light resistance property is deteriorated. Metal oxide particles may also be used in combination of two or more kinds.

As titanium oxide to form a core, one prepared by a liquid phase method or a vapor phase method can be utilized. Further, as a method to form a shell around a core, utilized can be a method described in such as U.S. Pat. No. 3,410,708, Japanese Patent Examined Publication No. 58-47061, U.S. Pat. Nos. 2,885,366 and 3,437,502, British Patent No. 1,134,249, U.S. Pat. No. 3,383,231, British Patent Nos. 2,629,953 and 1,365,999.

(Metal Compound)

As metal compounds utilized in the present invention, compounds represented by following formula (5) or a chelate compound thereof can be utilized.

  Formula (5):

$$A_nMB_{x-n}$$

wherein, M represents a metal atom, A represents a functional group which can be hydrolyzed, or a hydrocarbon group provided with a functional group which can be hydrolyzed, and B represents an atomic group which has made a covalent or ionic bond with metal atom M. x represents a valence of metal atom M and n represents an integer of not less than 2 and not more than x.

Examples of a functional group A capable of being hydrolyzed include an alkoxy group, halogen atoms such as chlorine atom and the like, an ester group and an amido group. Metal compounds belonging to above formula (5) include alkoxide provided with at least two alkoxy groups, which directly bond to the metal atom, or chelate compounds thereof. Preferable metal compounds include titanium alkoxide, zirconium alkoxide or chelate compounds thereof. Titanium alkoxide gives a rapid reaction rate and a high refractive index as well as easy handling, however, it may deteriorate light resistance due to the photocatalytic function when a large amount thereof is added. Zirconium alkoxide has a high refractive index; however, since it is liable to be milky-whitened, care should be taken of such as dew point control at the time of coating. Further, since titanium alkoxide has an effect to accelerate the reaction of UV curable resin and metal alkoxide, it is possible to improve physical properties of coated film even with a small amount of addition.

Examples of titanium alkoxide includes tetramethoxy titanium, tetraethoxy titanium, tetra-iso-propoxy titanium, tetra-n-propoxy titanium, tetra-n-butoxy titanium, tetra-sec-butoxy titanium and tetra-tert-butoxy titanium.

Examples of zirconium alkoxide include tetramethoxy zirconium, tetraethoxy zirconium, tetra-iso-propoxy zirconium, tetra-n-propoxy zirconium, tetra-n-butoxy zirconium, tetra-sec-butoxy zirconium and tetra-tert-butoxy zirconium.

A preferable chelating agent, which forms a chelate compound via coordination to a metal compound, includes alkanol amines such as diethanol amine and triethanol amine; glycols such as ethylene glycol, diethylene glycol and propylene glycol; acetylacetone and ethyl acetoacetate; having a molecular weight of not more than 10,000. By utilizing these chelating agents, a chelate compound, which is stable against such as mixing of water content and excellent in a bolstering effect of coated layer, can be formed.

The addition amount of a metal compound is preferably adjusted to 0.3-5% by weight, based on the content of metal oxide arising from said metal compound contained in a high refractive index layer. A scratch resistance property is not sufficient when the content is less than 0.3% by weight, while a light resistance property tends to be deteriorated when the content exceeds 5% by weight.

(Ionizing Radiation Curable Resin)

An ionizing radiation curable resin is added as binder for metal oxide particles to improve the film forming capability and physical properties of a coated film. As ionizing radiation curable resin, utilized can be monomer or oligomer provided with at least two functional groups which generate a polymerization reaction directly with irradiation of ionizing radiation such as UV rays and electron rays or indirectly with a function of a photo-polymerization initiator. The functional group includes a group having an unsaturated double bond such as a (meth)acryloyloxy group, an epoxy group and silanol group.

Among them, radical polymerizing monomer or oligomer which has at least two unsaturated double bonds is preferably utilized. A photopolymerization initiator may be appropriately employed in combination. Such ionizing radiation curable resin includes a polyfunctional acrylate compound, and preferably is a compound selected from a group comprising pentaerythritol polyfunctional acrylate, dipentaerythritol polyfunctional acrylate, pentaerythritol polyfunctional methacrylate and dipentaerythritol polyfunctional methacrylate. Herein, a polyfunctional acrylate compound is a compound provided with at least two acryloyloxy groups and/or methacryloyloxy groups.

Preferable examples of polyfunctional acrylate compound monomers include polyfunctional acrylate compound, ethylene glycol diacrylate, diethyleneglycoldiacrylate, 1,6-hexanedioldiacrylate, neopentylglycoldiacrylate, trimethylolpropanetriacrylate, trimethylolethanetriacrylate, tetramethylolmethanetriacrylate, tetramethylolmethanetetraacrylate, pentaglyceroltriacrylate, pentaerythritoldiacrylate, pentaerythritoltriacrylate, pentaerythritoltetraacrylate, glycerintriacrylate, dipentaerythritoltriacrylate, dipentaerythritoltetraacrylate, dipentaerythritolpentaacrylate, dipentaerythritolhexaacrylate, tris(acryloyloxyethyl)isocyanurate, ethyleneglycoldimethacrylate, diethyleneglycoldimethacrylate, 1,6-hexanedioldimethacrylate, neopentylglycoldimethacrylate, trimethylolpropanetrimethacrylate, trimethylolethanetrimethacrylate, tetramethylolmethanetrimethacrylate, tetramethylolmethanetetramethacrylate, pentaglyceroltrimethacrylate, pentaerythritoldimethacrylate, pentaerythritoltrimethacrylate, pentaerythritoltetramethacrylate, glycerintrimethacrylate, dipentaerythritoltrimethacrylate, dipentaerythritoltetramethacrylate, dipentaerythritolpentamethacrylate, and dipentaerythritolhexa methacrylate. These compounds are mixed to be used singly or in combination of 2 kinds or more. They may also be an oligomer of a dimmer or a trimer of the above-mentioned monomer.

The addition amount of ionizing radiation curable resin is preferably less than 50% by weight, based on a solid content in the high refractive index composition.

To accelerate curing of ionizing radiation curable resin according to the present invention, it is preferable to incorporate a photo-polymerization initiator and an acrylic compound provided with at least two unsaturated bonds, which is capable of polymerization, in a molecule, at a weight ratio of 3/7-1/9.

Specific examples of a photo-polymerization initiator include acetophenone, benzophenone, hydroxybenzophenone, Michler's ketone, α-amyloxime ester, thioxanthone and derivatives thereof.

(Solvent)

Examples of usable organic solvents, when coating the high refractive index layer of the present invention, include alcohols (for example, methanol, ethanol, propanol, isopropanol, butanol, isobutanol, secondary butanol, tertiary butanol, pentanol, hexanol, cyclohexanol, benzyl alcohol, and the like); polyvalent alcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexanetriol, thiodiglycol, and the like); polyvalent alcohol ethers (for example, ethylene glycol monomethylether, ethylene glycol monoethylether, ethylene glycol monobutylether, diethylene glycol monoethylether, diethylene glycol monomethylether, diethylene glycol monobutylether, propylene glycol monomethylether, propylene glycol monobutylether, ethylene glycol monomethylether acetate, triethylene glycol monomethylether, triethylene glycol monoethylether, ethylene glycol monophenylether, propylene glycol monophenylether, and the like); amines (for example, ethanolamine, diethanolamine, triethanolamine, N-methyldiethanolamine, N-ethyl diethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like); amides (for example, formamide, N,N-dimethylformamide, and the like); heterocycles (for example, 2-pyrrolidone, N-methyl-2-pyrrolidone, cyclohexyl pyrolidone, 2-oxazolidone, 1,3-dimethyl-2-imidazolidinone, and the like); sulfoxides (for example, dimethyl sulfoxide and the like); sulfones (for example, sulfolane and the like); urea, acetonitrile, and acetone, but alcohols, polyvalent alcohols and polyvalent alcohol ethers are preferable.

(Anti-Stain Layer)

It is preferable in the present invention that an anti-stain layer is provided on the outermost layer of an anti-glare film or an anti-reflection film.

A preferable anti-stain layer in the present invention, in which a fluorine-containing silane compound is desired to be contained in a composition for forming an anti-stain layer, is prepared by coating a silane compound solution containing a fluoroalkyl group or a fluoroalkylether group. It is particularly preferred that a fluorine-containing silane compound is silazane or alkoxysilane.

Among silane compounds containing the foregoing fluoroalkyl group or fluoroalkylether group, also preferred is a silane compound in which a fluoroalkyl group is bonded to a Si atom by a ratio of not more than one Si atom with respect to one Si atom, and the rest is a hydrolysis group or a siloxane-bonding group.

A hydrolysis group described here means an alkoxy group or such, for example, and a hydroxyl group is generated via hydrolysis, whereby the foregoing silane compound results in formation of a polymerization-condensation product.

For example, water is added to the above silane compound, and reacted (in the presence of an acid catalyst, if desired) at room temperature to 100° C. while removing alcohol produced as the reaction proceeds. The alkoxysilane is partly hydrolyzed due to this reaction, followed by condensation reaction, and a hydroxyl group can be obtained as a hydrolyzate. A degree of hydrolysis as well as condensation is appropriately controlled by an amount of water to be reacted, but it is preferable in the present invention that a diluted solid content in a solution hydrolyzed by moisture in the air is mainly used while drying after preparation without adding water proactively into a silane compound employed for anti-stain treatment.

It is preferred that a silane compound containing the foregoing fluoroalkyl group is represented by following Formula (6), and as the component to form an anti-stain layer, a content of the silane compound is diluted to be 0.01-5% by weight to conduct a anti-stain treatment process.

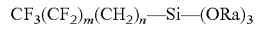   Formula (6):

where m is an integer of 1-10, n is an integer of 0-10, and Ra represents the same alkyl group or a different alkyl group.

Ra in the compound expressed by foregoing Formula (6) is one having not more than 3 carbon atoms, and an alkyl group consisting only of carbon and hydrogen, such as a methyl group, an ethyl group, or an isopropyl group.

In the present invention, examples of preferably usable silane compounds having a fluoroalkyl group and a fluoroalkylether group include $CF_3(CH_2)Si(OCH_3)_3$, $CF_3(CH_2)_2Si(OC_2H_5)_3$, $CF_3(CH_2)_2Si(OC_3H_7)_3$, $CF_3(CH_2)_2Si(OC_4H_9)_3$, $CF_3(CF_2)_5(CH_2)Si(OCH_3)_3$, $CF_3(CF_2)_5(CH_2)Si(OC_2H_5)_3$, $CF_3(CF_2)_5(CH_2)Si(OC_3H_7)_3$, $CF_3(CF_2)_7(CH_2)Si(OCH_3)_3$, $CF_3(CF_2)_7(CH_2)_2Si(OCH_3)_3$, $CF_3(CF_2)_7(CH_2)_2Si(OC_2H_5)_3$, $CF_3(CF_2)_7(CH_2)_2Si(OC_3H_7)_3$, $CF_3(CF_2)_7(CH_2)_2Si(OCH_3)(OC_3H_7)_2$, $CF_3(CF_2)_7(CH_2)_2Si(OCH_3)_2OC_3H_7$, $CF_3(CF_2)_7(CH_2)_2SiCH_3(OCH_3)_2$, $CF_3(CF_2)_7(CH_2)_2SiCH_3(OC_2H_5)_2$, $CF_3(CF_2)_7(CH_2)_2SiCH_3(OC_3H_7)_2$, $(CF_3)_2CF(CF_2)_8(CH_2)_2Si(OCH_3)_3$, $C_7F_{15}CONH(CH_2)_3Si(OC_2H_5)_3$, $C_8F_{17}SO_2NH(CH_2)_3Si(OC_2H_5)_3$, $C_8F_{17}(CH_2)_2OCONH(CH_2)_3Si(OCH_3)_3$, $CF_3(CF_2)_7(CH_2)_2Si(CH_3)(OCH_3)_2$, $CF_3(CF_2)_7(CH_2)_2Si(CH_3)(OC_2H_5)_2$, $CF_3(CF_2)_7(CH_2)_2Si(CH_3)(OC_3H_7)_2$, $CF_3(CF_2)_7(CH_2)_2Si(C_2H_5)(OCH_3)_2$, $CF_3(CF_2)_7(CH_2)_2Si(C_2H_5)(OC_3H_7)_2$, $CF_3(CH_2)_2Si(CH_3)(OCH_3)_2$, $CF_3(CH_2)_2Si(CH_3)(OC_2H_5)_2$, $CF_3(CH_2)_2Si(CH_3)(OC_3H_7)_2$, $CF_3(CF_2)_5(CH_2)_2Si(CH_3)(OCH_3)_2$, $CF_3(CF_2)_5(CH_2)_2Si(CH_3)(OC_3H_7)_2$, $CF_3(CF_2)_5O(CF_2)_3(CH_2)_2Si(OC_3H_7)$, $C_7F_{15}CH_2O(CH_2)_3Si(OC_2H_5)_3$, $C_8F_{17}SO_2O(CH_2)_3Si(OC_2H_5)_3$, and $C_8F_{17}(CH_2)_2OCHO(CH_2)_3Si(OCH_3)_3$.

Examples of the above-mentioned silane compound include KP801M and X-24-9146 produced by Shinetsu Chemicals Co., Ltd.; XC98-A5382 and XC98-B2472 produced by GE Toshiba Silicone Co., Ltd.; OPTOOL DSX produced by Daikin Industrial Co., Ltd; and FG5010 produced by Fluoro Technology Kabushiki Kaisha. Examples of the compound for surface treatment include perfluoroalkyl silazane, perfluoroalkyl silane, and a perfluoropolyether group-containing silane compound such as specifically perfluoroalkyltrialkoxy silane, perfluoropolyethertrialkoxy silane, or perfluoropolyetherditrialkoxy silane.

These silane compounds to be used are diluted by an organic solvent containing no fluorine to be 0.01-10% by weight, preferably 0.03-5% by weight, and more preferably 0.05-2% by weight.

In the present invention, an organic solvent containing no fluorine is employed to prepare the foregoing silane compound solution, and the following solvents are provided.

As the coating composition solvent used for an anti-stain layer in the present invention, propylene glycol mono(C1-C4)alkylether and/or propylene glycol mono(C1-C4)alkyletherester is/are provided. Specific examples of propylene glycol mono(C1-C4)alkylether include propylene glycol monomethylether (PGME), propylene glycol monoethylether, propylene glycol mono-n-propylether, propylene glycol monoisopropylether, propylene glycol monobutylether, and such.

Specific examples of propylene glycol mono(C1-C4)alkyletherester also include propylene glycol monoalkylether acetate in particular, a propylene glycol monomethylether acetate, and propylene glycol monoethylether acetate. Also provided as the solvent are propylene glycol mono(C1-C4)alkylether and/or propylene glycol mono(C1-C4)alkyletherester; alcohols such as methanol, ethanol, propanol, n-butanol, 2-buthanol, t-butanol, cyclohexanol and the like; ketones such as methylethylketone, methylisobutylketone, acetone and the like; esters such as ethyl acetate, methyl acetate, ethyl lactate, isopropyl acetate, amyl acetate and ethyl butylate; hydrocarbons such as benzene, toluene, xylene and the like; dioxane, N,N-dimethylformamide, other solvents, and so forth. These solvents may be appropriately mixed to be used, but they are not particularly limited thereto.

Particularly, a preferable solvent is at least one organic solvent selected from the group of ethanol, isopropyl alcohol, propylene glycol, and propylene glycol monomethyl ether.

It is preferred to make a combined use of the solvents such as methanol, ethanol and isopropyl alcohol having a boiling point of less than 100° C. under normal pressure (low boiling point solvent), and the solvent such as propylene glycol monomethyl ether and n-butyl alcohol having a boiling point of 100° C. or more (high boiling point solvent). In particular, it is preferred to make a combined use of the solvent having a boiling point of 60-98° C. and the solvent having a boiling point of 100-160° C. is particularly preferred. The ratio between the low and high boiling points of the solvents in the case of combined use is 98.0% by weight or more in the composition for low boiling point solvent and 0.5-2% by weight or more for high boiling point solvent.

In the anti-stain layer forming composition used in the present invention, acid is preferably added so that the pH value will be 5.0 or less. The acid promotes the hydrolysis of the aforementioned silane compound and acts as a catalyst for polycondensation reaction. It thus facilitates formation of silane compound polycondensation film on the substrate surface and improves the anti-stain performance. The pH value is preferably 1.5-5.0. If it is below 1.5, acidity of the solution is too high and the container and piping may be damaged. If it is 5 or more, reaction will be discouraged. The preferred pH value is within the range of 2.0-4.0.

In the present invention, water is not actively added to the silane compound solution used in anti-stain treatment. It is preferred that hydrolysis reaction should be carried out by moisture contained in the atmosphere mainly in the process of drying after preparation. Such being the case, the solution should be used after its solid concentration has been reduced. If too much water is added to the liquid used for treatment, the pot life will be reduced correspondingly In the present invention, the organic acid containing sulfo group (also called sulfonic acid group) or carboxyl group, for example, acetic acid, polyacrylic acid, benzene sulfonic acid, para-toluene sulfonic acid and methylsulfonic acid can be used, in addition to the inorganic acid such as sulfuric acid, hydrochloric acid, nitric acid, hypochlous acid, boric acid, hydrofluoric acid, preferably, hydrochloric acid and nitric acid. More preferably, a compound having a hydroxyl group and carboxyl group in one molecule is used as the organic acid. For example, hydroxydicarboxylic acid such as citric acid or tartaric acid is used. Still more preferably, the organic acid is a water-soluble acid. For example, in addition to the aforementioned citric acid tartaric acid, levulinic acid, formic acid, propionic acid, malic acid, succinic acid, methylsuccinic acid, fumaric acid, oxalacetic acid, pyruvic acid, 2-oxoglutaric acid, glycol acid, D-glycerine acid, D-gluconic acid, malonic acid, maleic acid, oxalic acid, isocitric acid, and lactic acid are preferably used. Further, benzoic acid, hydroxybenzoic acid and atropic acid can be used as appropriate.

The amount to be added is preferably 0.1-10 parts by weight with respect to 100 parts by weight of partial hydrolysate of the aforementioned silane compound, more preferably 0.2-5 parts by weight. Water is added in the amount more than the level capable of ensuring that the partial hydrolysate can be subjected to theoretical 100% hydrolysis. Namely, the amount of water to be added is equivalent to 100-300%, preferably, 100-200%.

Use of the fluorine-containing silane compound is preferred in reducing the refractive index of the anti-stain layer. In addition, use of the fluorine-containing silane compound improves water- and water-repellency and resistance to scratches, and provides excellent blocking properties between films.

In the present invention, it is also preferred to use the composition formed by adding the alkoxy silane and alkylalkoxy silane to the organic solvent solution that does not contain fluorine including the silane compound provided with the aforementioned fluoroalkyl group.

Any of the known silane compounds can be used the aforementioned alkoxy silane and alkylalkoxy silane.

They are exemplified by tetraalkoxy silane (e.g. tetramethoxysilane and tetraethoxysilane)alkyltrialkoxy silane (e.g. methyltrimethoxysilane and ethyltrimethoxysilane), and dialkyldialkoxy silane.

When the aforementioned anti-stain layer coating composition is prepared, these alkoxy silane, alkylalkoxy silanes are added to the aforementioned fluorine-containing silane compound, and are mixed within the range of 0.01-15% by weight. Similarly, the process of hydrolysis and condensation produces a film formed in an integrated shape having been polymerized together with the aforementioned fluorine-containing silane compound.

A combined use of these alkoxy silane, alkylalkoxy silanes with the aforementioned fluorine-containing silane compound improves the film strength and resistance to scratches, and provides excellent blocking properties when films are placed one on top of the other.

Use of the composition produced by adding 0.01-5% by weight of silicon isocyanate compound to the silane compound solution containing the fluoroalkyl group or fluoroalkyl ether group further improves the strength of the anti-stain layer film to be formed, and protects the surface against scratches. It also reduces the blocking when films are placed one on top of the other, with the result that further advantages are provided.

The silicon isocyanate compound used in the present invention are exemplified by $Si(NCO)_4$, $CH_3Si(NCO)_3$, $(CH_3)_2Si(NCO)_2$, $(CH_3)_3SiNCO$, $CH_2=CHSi(NCO)_3$, and $C_2H_5Si(NCO)_3$. $Si(NCO)_4$ and $CH_3Si(NCO)_3$ is preferably used. From the viewpoint of environment safety as the object of the present invention, $Si(NCO)_4$ is more preferred.

The aforementioned amount of these silicon isocyanate compounds is mixed in the anti-stain layer forming composition. Then more complete crosslinking reaction by the aforementioned silane compound can be achieved, and substantial improvement of the aforementioned film physical properties is provided. These compounds do not take part in hydrolysis, but react with the hydroxyl group (silanol group) formed by hydrolysis to complement the condensation among the aforementioned silanol groups to strengthen the film.

The organic solvent without containing the aforementioned fluorine can be used directly as the organic solvent when using these silicon isocyanate compounds. Of the organic solvents mentioned above, such solvents as ethanol, isopropyl alcohol, propylene glycol, toluene, propylene glycol monomethyl ether, methyl ethyl ketone, methylisobutyl ketone, ethyl acetate and butyl acetate are preferred in particular, when the silicon isocyanate compound is mixed for use.

When the silicon isocyanate compound is mixed for use, the pH value of 7.0 or less is sufficient. The pH value of 2.0-7.0 is more preferred. If the pH value is over 7.0, reaction with the aforementioned silanol group will be discouraged. The particularly preferred range is 3.0-6.0.

The refractive index of the anti-stain layer is preferably 1.30-1.50, more preferably, 1.35-1.49. If the index does not exceed 1.30, the film hardness will be reduced. If it is 1.50 or more, the surface reflection factor will increase. The anti-stain layer made up of the resin formed from the product of hydrolysis polycondensation of the fluoroalkyl group-containing silane compound. The coefficient of kinetic friction is preferably within the range of 0.03-0.25.

The aforementioned anti-stain layer coating composition obtained in the aforementioned manner is applied on the aforementioned low-refractive index layer to form an anti-stain layer. Coating can be performed by any of the methods using a conventional dip coater, gravure coater, reverse roll coater or extruding coater.

(Formation of Anti-Reflection Layer)

In the present invention, there is no particular restriction to the method of providing an anti-reflection layer. The anti-reflection layer is preferably provided by coating.

In the present invention, a microscopically roughened structure is formed on the cellulose ester film provided with a hard coat layer, by flexographic printing. The aforementioned high-refractive index layer composition and low-refractive index layer composition are used to perform sequential coating. This process is preferably utilized to manufacture the anti-reflection layer. It is also preferred to coat the anti-stain layer.

The following shows a preferred anti-glaring anti-reflection film, without the present invention being restricted thereto.

The hard coat layer is defined as the aforementioned actinic radiation curable resin layer.

Substrate film/hard coat layer/microscopically roughened structure/low-refractive index layer Substrate film/hard coat layer/microscopically roughened structure/high refractive index layer/low-refractive index layer Substrate film/antistatic layer/hard coat layer/microscopically roughened structure/low-refractive index layer Substrate film/antistatic layer/hard coat layer/microscopically roughened structure/high refractive index layer/low-refractive index layer Substrate film/hard coat layer/microscopically roughened structure/low-refractive index layer/anti-stain layer Substrate film/hard coat layer/microscopically roughened structure/high refractive index layer/low-refractive index layer/anti-stain layer Substrate film/antistatic layer/hard coat layer/microscopically roughened structure/low-refractive index layer/anti-stain layer Substrate film/antistatic layer/hard coat layer/microscopically roughened structure/high refractive index layer/low-refractive index layer/anti-stain layer It is preferred in the present invention that, after the aforementioned hard coat layer/microscopically roughened structure has been formed, the hard coat layer surface is provided with surface treatment, and the high refractive index layer and low-refractive index layer of the present invention is formed on the hard coat layer surface provided with the surface treatment. The low-refractive index layer is also preferably provided with surface treatment before the anti-stain layer is provided.

The method for surface treatment can be exemplified by the washing method, alkaline treatment method, frame plasma treatment method, high frequency electrical discharge plasma method, electron beam method, ion beam method, sputtering method, acid treatment, corona treatment method, and atmospheric glow electrical discharge plasma method. The alkaline treatment method and corona treatment method are preferably used. Use of the alkaline treatment method is preferred in particular.

The corona treatment refers to electrical discharge by application of a high voltage of 1 kV or more is applied between the electrodes in the atmosphere. The commercially available apparatus made by Kasuga Denki Co., Ltd. and Toyo Denki Co., Ltd. can be used for corona treatment. The intensity in corona electrical discharge treatment depends on the distance between electrodes, output per unit area and generator frequency. A commercially available apparatus can be used as one of the electrodes (electrode A) in the corona treatment apparatuses. The material can be selected from aluminum, stainless steel and others. A plastic film is wound on another electrode (electrode B). It is a roll electrode arranged at a certain distanced from the aforementioned electrode A in order to ensure stable and uniform corona treatment. A commercially available product can also be used as this electrode. The preferably used roll is the one made of aluminum, stainless steel and the metals thereof lined with ceramics, silicon, EPT rubber and hyperon rubber. The frequency for corona treatment in the present invention is the frequency of 20 kHz or more without exceeding 100 kHz. The frequency of 30%-60 kHz is preferred. If the frequency is reduced, uniformity in corona treatment will be adversely affected, and irregularity occurs in corona treatment. Further, when the frequency is increased, treatment stability cannot easily be ensured in the low output corona treatment, although there is no problem with high output corona treatment. This will cause irregularity in treatment. The output in corona treatment is 1-5 w·min./m$^2$, preferably 2 through 4 w·min./m$^2$. The distance between the electrode and film is 5 mm or more without exceeding 50 mm, preferably, 10 mm or more without exceeding 35 mm. If this distance is too big, a higher voltage will be required in order to maintain a predetermined output. This tends to cause irregularity. If this distance is too small, the voltage to be applied will be too low. This also tends to cause irregularity. Further, the electrode will contact the film to cause a damage, when the film is conveyed for continuous treatment.

There is no particular restriction to the method of alkali treatment, provided that the film coated with the hard coat layer is immersed in the alkaline solution.

The aqueous solution of sodium hydroxide, aqueous solution of potassium hydroxide, and aqueous solution of ammonium can be used as an alkaline solution. In particular, the aqueous solution of sodium hydroxide is preferably used.

The alkali concentration of the alkaline solution—for example, sodium hydroxide concentration—is preferably 0.1-25% by weight, more preferably 0.5-15 percent by weight.

The alkali treatment temperature is normally 10-80° C., preferably 20-60° C.

The alkali treatment time is 5 sec. through 5 min., preferably, 30 sec. through 3 min. It is preferred that the film subsequent to alkali treatment should be neutralized by acid water and should be sufficiently washed by water.

Each layer of the anti-reflection layer can be coated and formed on the substrate film according to the dip coating method, air knife coating method, curtain coating method, roller coating method, wire bar coating method, gravure coating method, microgravure coating method or extrusion coating method. At the time of coating, it is preferred that the substrate film, wound in the shape of a roll with a width of 1.4-4 m, should be unwound and, after the aforementioned coating process and drying and curing treatment process, the film should be again wound in the shape of a roll.

The anti-glaring anti-reflection film of the present invention is preferably manufactured as follows: After the aforementioned anti-reflection layer has been laminated on the substrate film, the film unwound in the shape of a roll is subjected to heat treatment at a temperature of 50-150° C. for 1-30 days, whereby the anti-glaring anti-reflection film is produced. The time period for heating treatment can be determined as appropriate depending on the temperature to be set. For example, it is preferably 3 days or more to 30 days (exclusive) at 50° C., and 1-3 days at 150° C. Normally, the temperature is preferably set at a lower level so that the effects of heating treatment on the outer winding, intermediate winding and core will be kept uniform. Heat treatment is preferably conducted for approximately 3-7 days at about 50-80° C.

To ensure stability of heating treatment, heat treatment should be carried out where the temperature and humidity can be adjusted, preferably in a heating treatment laboratory such as a dust-free clean room.

A core of any material can be used as a core to be used when the optical film coated with a functional thin film is wound in the shape of a roll, provided that it is arranged on a cylinder. A hollow plastic core is preferably employed. Any plastic material can be used, provided that it is a heat resistant plastic capable of withstanding the heating treatment temperature. For example, the phenol resin, xylene resin, melamine resin, polyester resin, epoxy resin can be mentioned as such a material. Further, a thermosetting resin reinforced by the filler such as a glass fiber is preferably used.

The number of turns on the winding core is preferably 100 or more, more preferably 500 turns or more. The winding thickness is preferably 5 cm or more.

The functional thin film is coated on the bulk plastic film substrate and is wound on the plastic core. When this film roll is subjected to the aforementioned heat treatment as it is wound, this roll is preferably rotated at a speed of one rotation per minute. It can be rotated either continuously or intermittently. It is preferred that, during heat treatment, the roll should be rewound once or more frequency.

Since the bulk optical film roll wound on the core is rotated during heat treatment, a special-purpose rotation table is preferably provided in a heat treatment chamber.

In the intermittent rotation mode, the non-rotating time is preferably 10 hours or less, and the stopped portion is preferably uniform in the circumferential direction. The non-rotating time is more preferably 10 minutes or less. Continuous rotation is most preferred.

In the continuous rotation mode, the time for one rotation is 10 hours or less. If the rotation is faster, the apparatus will be overloaded. The time for one rotation is preferably within the range from 15 minutes through 2 hours virtually.

In case of a special-purpose cart provided with a rotation function, the optical film roll is preferably rotated during movement or storage. In this case, effective functioning of rotation is provided to protect against the black band that is caused for long-term storage.

(Polarizing Plate)

The polarizing plate can be produced by the general method. The back sides of the anti-glare film and anti-glaring anti-reflection film of the present invention are subjected to alkaline saponification, and are preferably bonded onto at least one of the surfaces of the polarizing film produced by immersion in iodine solution, using a fully saponifiable aqueous solution of polyvinyl alcohol. The aforementioned film or another polarizing plate protective film may be used on the other surface. The commercially available cellulose ester film (e.g. Konica Minoltatac KC8UX, KC4UX, KC5UX, KC8UCR3, KC8UCR4, KC8UY, KC4UY, KC12UR, KC8UCR-3, KC8UCR-4, KC8UCR-5 by Konica Minolta Opt Co., Ltd.) is preferably used. For the anti-glare film and anti-glaring anti-reflection film of the present invention, the polarizing plate protective film used on the other surface preferably has the in-plane retardation Ro of 30-300 nm at 590 nm and Rt of phase difference of 70-400 nm. For example, the methods disclosed in Japanese Patent O.P.I Publication Nos. 2002-71957 and 2002-155395 can be used for production. It is also preferred to use the polarizing plate protective film also serving as an optical compensating film having an optically anisotropic layer formed by orienting a liquid crystal compound such as a discotheque liquid crystal. For example, the optically anisotropic layer can be formed by the method disclosed in Japanese Patent O.P.I Publication No. 2003-98348. A polarizing plate characterized by excellent flatness and stable effect of widening the angle of visibility can be manufactured by combined use with the anti-glare film and anti-glaring anti-reflection film of the present invention.

The polarizing film as a major constituent of the polarizing plate is a device that permits passage of only the light of the polarizing surface in a predetermined direction. The currently known typical polarizing film is a polyvinyl alcohol based polarizing film. The polyvinyl alcohol based film dyed by iodine and that dyed by dichromatic dyes are available. The polarizing film to be used is produced as follows: The aqueous solution of polyvinyl alcohol is used to form a film, which is dyed and is uniaxially oriented. Alternatively, the film is uniaxially orientated subsequent to dyeing and is preferably subjected to durability treatment using a boric acid compound. The resulting polarizing film is used. One surface of the optical film of the present invention is bonded on the surface of this polarizing film to form a polarizing plate. The water-based adhesive mainly composed of fully saponifiable polyvinyl alcohol or the like is preferably used for this bonding.

(Display Apparatus)

When the polarizing plate of the present invention is built in the display apparatus, a wide variety of display apparatuses characterized by excellent visibility can be produced. The anti-glare film and anti-glaring anti-reflection film of the present invention are preferably used in the reflection, transparent and translucent LCDs or in the LCDs based on a wide variety of drive methods such as TN, STN, OCB, HAN, VA (PVA and MVA) and IPS methods. The anti-glare film and anti-glaring anti-reflection film of the present invention are characterized by distinguished flatness and are preferably used in a wide variety of display apparatuses including plasma display, field emission display, organic EL display, inorganic EL display and electronic paper. Particularly, the display apparatus having a large screen size such as 30 inch model or greater, especially in the range of 30-54 inch model is free of any white patch on the peripheral area. The effect can be maintained for a long time. A remarkable effect is observed in the model MVA liquid crystal display. Especially, elimination of uneven color arrangement, glitter or irregular litter as an object of the present invention is achieved. Thus, the user's eyes are not adversely affected after long-time viewing.

In the display apparatus of the present invention, the microscopically roughened structure formed on the surface of the aforementioned anti-glare film or anti-glaring anti-reflection film has an elliptically convex portion. The long side of the elliptically convex portion is preferably arranged in the longitudinal or lateral direction.

The elliptic form in the sense in which it is used here can be defined by the following formula: The ratio of the ellipse within the range of 0.50-0.85, and that within the range of 0.60-0.80 accounts for at least 60% in number based distribution.

Ratio of ellipse=(short axis of ellipse)/(long axis of ellipse)

The present inventors have found out the following in the display apparatus using the anti-glare film or anti-glaring anti-reflection film: In contrast to the display apparatus wherein convex portion close to a true roundness using the conventional particles and convex portion of indefinite shape are present, and the long side is not arranged in a predetermined direction on the display, the anti-glare effect is ensured and the glitter on the surface is reduced by the display apparatus wherein the convex portion of the microscopically roughened structure formed by flexographic printing has an elliptical form and the long side of this elliptical form is arranged in the longitudinal or lateral direction. This can be explained as follows: When the long side of the convex portion of the microscopically roughened structure is arranged in the longitudinal or lateral direction of the display, scattered light is oriented in a predetermined direction. This arrangement reduces the glitter. Further, the elliptically-formed convex portion increases the directionality of the scatter light so that reduction of the glitter is accelerated. Flexographic printing allows free production of a roughened pattern meeting such a requirement, and therefore, easily controls the formation of the microscopically roughened structure.

EXAMPLE

Next, the present invention will be explained employing examples, but the present invention is not limited thereto.

Example 1

Manufacturing the Cellulose Ester Film 1

A cellulose ester solution (dope) was prepared using the following cellulose ester, plasticizer, UV absorbent, particles and solvent, and a cellulose ester film 1 was manufactured according to the solution casting film making method.

| | |
|---|---|
| Cellulose ester (cellulose triacetate; acetyl group substitution: 2.9, Mn = 160000; Mw/Mn = 1.8) | 100 kg |
| Plasticizer (trimethylol propane tribenzoate) | 5 kg |
| Plasticizer (ethylphthalyl etylglycolate) | 5 kg |
| UV absorbent (Tinuvin 109, by Ciba Specialty Chemicals K.K.) | 1.0 kg |
| UV absorbent (Tinuvin 171, by Ciba Specialty Chemicals K.K.) | 1.0 kg |
| Particles (Aerosil R972V, by Nippon Aerosil Co., Ltd.) | 0.3 kg |
| Solvent (methyl acetate) | 440 kg |
| Solvent (ethanol) | 110 kg |

The aforementioned cellulose ester, plasticizer, UV absorbent, particles and solvent were used to prepare a cellulose ester solution (dope).

The solvent was placed in an enclosed container, and the remaining materials were then added one after another while stirring. The mixture was heated and stirred until it was completely dissolved and mixed. Particles were dispersed in part of the solvent and were added. The solution temperature was reduced until casting started. The solution was left to stand overnight. After defoaming, the solution was filtered by the Azumi filter paper No. 244 manufactured by Azumi Roshi Co., Ltd., whereby a cellulose ester solution was obtained.

Then the cellulose ester solution with its temperature adjusted to 33° C. was fed to a die and was cast uniformly onto the stainless steel belt from the die slit. The casting section of the stainless steel belt was heated from the rear surface by the water heated to a temperature of 37° C. After casting operation, air heated to 44° C. was applied to the doped film on the metal supporting member (called the web after having cast on the stainless steel belt) until it was dried. When the amount of the residual solution was 120% by weight, separation occurred. The tension at the time of separation was applied, and the process of drawing was carried out at a draw ratio of 1.1 in the longitudinal direction. Then the ends of the web were held by a tenter when the amount of residual solvent changed from 35 through 10% by weight, and drawing was performed until the draw rate reached 1.1 across the width. After drawing, the web was held in position with the width kept unchanged for several seconds, and the tension was then loosened across the width. Further, the web was fed and dried along the third drying zone set at a temperature of 125° C. for 20 minutes, whereby a cellulose ester film 1 having a width of 1.5 m a film thickness of 80 μm and a length of 3000 m was produced.

[Manufacturing the Anti-Glare Hard Coat Film 1 by Addition of Particles]

The following hard coat layer coating solution 1 was filtered by a polypropylene-made filter with an aperture having a diameter 20 μm on the surface (on the side B; the surface in contact with mirror surface of the supporting member such as the stainless steel band and others used in the casting film making method; side of the supporting member) of the aforementioned cellulose ester film 1. Then a hard coat layer coating solution was prepared. This solution was applied using a micro gravure coater. After having been dried at 90° C., the coated layer was cured using a UV lamp, wherein the intensity of illumination of the application section was 0.1 W/cm² with a dose of 0.1 J/cm². An anti-glare hard coat layer having a thickness of 5 μm was formed; thus an anti-glare hard coat film 1 was produced. To evaluate the roughened pattern having been formed, 100 convex portions were measured using an optical interference type surface roughness measuring instruments. The average height of the convex portion was 1 μm, and the average size (on the long side) was 10 μm. The average distance between convex portions was 50 μm, and the variations thereof were kept within ±13%.

(Hard Coat Layer Coating Solution 1)

A hard coat layer coating solution 1 was produced by stirring and mixing the following materials:

Acryl monomer: KAYARAD DPHA (dipentaerithritol hexaacrylate, by Nippon Kayaku Co., Ltd.)
200 parts by weight
Photo-polymerization initiator (Irgacure 184 (by Ciba Specialty Chemicals K.K.)) 25 parts by weight
Propylene glycol monomethyl ether 110 parts by weight
Ethyl acetate 110 parts by weight
Synthetic silica particles average particle diameter 1.8 μm 40 parts by weight
Surfactant [silicone based surfactant by FZ2207 (by Nippon Unicar Co., Ltd.) 10% by weight propylene glycol monomethyl ether solution] 0.6 parts by weight in terms of solid content.

[Manufacturing the Anti-Glare Hard Coat Film 2 by Embossing Process]

In the production of the aforementioned cellulose ester film 1, after orientation by the tenter, the film containing the solvent was sandwiched by the roughened pattern formation section which was made up of a roll provided with a mold (subsequent to formation of a roughened pattern, a microscopically roughened structure was formed in such a way that the convex portion had a height of 1 μm with a convex portion size (on the long side) of 10 μm and a distance between convex portions of 50 μm) and a back roll. A hot roll provided with a mold on the side B of the film (the side in contact with the stainless steel band supporting member being assumed as side B, with the opposite side thereof as side A) was pressed against the film. A back roll is placed on the side A. The film was passed through both rolls, thereby forming a roughened pattern on the side B. In the similar manner, except for this procedure, the cellulose ester film 2 having been embossed was produced. An electric charge eliminating wire was arranged close to the roughened pattern forming section, thereby reducing the electrostatic charge of the film. To evaluate the roughened pattern having been formed, 100 convex portions were measured using an optical interference type surface roughness measuring instrument. The average height of the convex portion was 1 μm, and the average size (on the long side) was 10 μm. The average distance between convex portions was 50 μm, and the variations thereof were kept within ±15%.

The aforementioned hard coat layer coating solution 2 was filtered by a polypropylene-made filter with an aperture having a diameter 20 μm on the surface (on the side B; the surface in contact with mirror surface of the supporting member such as the stainless steel band and others used in the casting film making method; side of the supporting member) of the aforementioned cellulose ester film 2 having been embossed. Then a hard coat layer coating solution was prepared. This solution was applied using a micro gravure coater. After having been dried at 90° C., the coated layer was cured using a UV lamp, wherein the intensity of illumination of the application section was 0.1 W/cm² with a dose of 0.1 J/cm². An anti-glare hard coat layer having a thickness of 5 μm was formed; thus an anti-glare hard coat film 2 was produced.

(Hard Coat Layer Coating Solution 2)

| | |
|---|---|
| Acryl monomer; KAYARAD DPHA (dipentaerithritol hexaacrylate, by Nippon Kayaku Co., Ltd.) | 70 parts by weight |
| Trimethylol propane triacrylate | 30 parts by weight |
| Photo-polymerization initiator (Irgacure 184 (by Ciba Specialty Chemicals K.K.)) | 4 parts by weight |
| Ethyl acetate | 150 parts by weight |
| Propylene glycol monomethyl ether | 150 parts by weight |
| Silicon compound (BYK-307 (by BYK-Chemie Japan K.K)) | 0.4 parts by weight |

[Manufacturing the Anti-Glare Hard Coat Films 3-15 by Flexographic Printing]

Using the apparatus given in FIG. 8 (a), the aforementioned hard coat layer coating solution 3 having been produced was filtered by a polypropylene-made filter with an aperture having a diameter 20 μm on the surface (on the side B; the surface in contact with mirror surface of the supporting member such as the stainless steel band and others used in the casting film making method; side of the supporting member) of the aforementioned cellulose ester film 1. Then a hard coat layer coating solution was prepared. This solution was applied using a micro gravure coater. After having been dried at 90° C., the coated layer was cured using a UV lamp, wherein the intensity of illumination of the application section was 0.1 W/cm² with a dose of 0.1 J/cm². An anti-glare hard coat layer having a thickness of 5 μm was formed; thus an anti-glare hard coat film 1 was produced.

(Hard Coat Layer Coating Solution 3)

| | |
|---|---|
| Acryl monomer; KAYARAD DPHA (dipentaerithritol hexaacrylate, by Nippon Kayaku Co., Ltd.) | 200 parts by weight |
| Trimethylol propane triacrylate | 30 parts by weight |
| Photo-polymerization initiator (Irgacure 184 (by Ciba Specialty Chemicals K.K.)) | 10 parts by weight |
| Propylene glycol monomethyl ether | 110 parts by weight |
| Ethyl acetate | 110 parts by weight |
| Surfactant (silicone based surfactant by FZ2207 (by Nippon Unicar Co., Ltd.) 10% by weight propylene glycol monomethyl ether solution) | 0.1 parts by weight in terms of solids. |

Zirconium oxide particles (average particle size: 10 nm) were added to the aforementioned composition so that the refractive index of the film would be 1.55. Part of the solvent to be added to the coating solution was used as the zirconium oxide wherein the solvent had been dispersed in advance.

<Flexographic Printing>

Using the manufacturing apparatus given in FIG. 8 (a), a roughened structure was formed by flexographic printing on the cellulose ester film coated with the aforementioned hard coat layer, through the use of the seamless resin plate of the following specifications having the resin plate diameter and rubber hardness described in Table 1. After printing, the roughened structure was dried along the third drying zone set at a temperature of 90° C. Then it was cured using a UV lamp 506 C, wherein the intensity of illumination of the ultraviolet ray was 0.1 W/cm$^2$ with a dose of 0.1 J/cm$^2$. Using an optical interference type surface roughness measuring instrument, 100 convex portions were measured. The average height of the ink adhesion portion (convex portion) was 1 μm, and the average size (on the long side) was 10 μm. The average distance between convex portions was 50 μm, and the variations thereof were kept within ±3%.

(Specification of Seamless Resin Plate)

Photosensitive Resin Plate:

After coating a photosensitive resin composition prepared by mixing 25 g of trimethylol propaneethoxy triacrylate, 4 g of 2,2-dimethoxy-2-phenylacetophenone, and 71 g of a core/shell type microgel (core/shell=2/1) acquired via reaction of 20 parts of methacrylic acid, 80 parts of N-butylacrylate, and a core obtained by reacting 98 parts of 2-hydroxyethylacrylate and 1 part of butandioldiacrylate, provided on a polyester film having a thickness of 2 mm, the ultraviolet ray having a wavelength of 360 nm was used for 1000 mJ/cm exposure, whereby a printing original plate for laser engraving was produced. Then the roughened structure was engraved under the following laser engraving conditions. As shown in FIG. 1, it was placed on the resin plate roll and was heated at 120° C. for 20 minutes while being evacuated. Thus, a seamless resin plate was produced, without any seam being observed thereon.

The diameter of the resin plate roll 2 shown in FIG. 1 was modified to get the resin plate diameter.

The rubber hardness of the resin plate was changed by adjusting the thickness of the aforementioned polyester film within the range of 0.5-10 mm. The rubber hardness was measured by a durometer according to the method described in JIS K 6253: 1997.

(Laser Engraving Conditions)

Carbon dioxide gas laser output: 300 W, 50% output

Engraved image: After printing, a roughened structure was engraved on the resin plate so that the convex portion has a height of 0.5 μm with a convex portion size (on the long side) of 30 μm and a distance between convex portion of 80 μm.

Anilox roll: 800 lines, 2.54 cm, cell volume: 4 ml/m$^2$ (honeycomb pattern by New Long Co., Ltd.)

Ink supply: steel-made doctor blade method (see FIG. 1)

Ink: Ink of the following composition was used:

(Composition of Anti-Glare Layer Liquid Ink 1)

| | |
|---|---|
| Dipentaerithritol hexaacrylate | 70 parts by weight |
| Trimethylol propane triacrylate | 30 parts by weight |
| Photoreaction initiator (Irgacure 184 (by Ciba Specialty Chemicals K.K.)) | 4 parts by weight |

Surfactant (silicone based surfactant by FZ2207 (by Nippon Unicar Co., Ltd.) 10 parts by weight, propylene glycol monomethyl ether solution) 0.5 parts by weight in terms of solid content.

| | |
|---|---|
| Propylene glycol monomethyl ether | 50 parts by weight |
| Methyl ethyl ketone | 500 parts by weight |

The ink viscosity was 3 Pa·s at a temperature of 40° C. when measured by the B type viscometer BL produced by Tokyo Keiki Co., Ltd.

The anti-glare hard coat films 1-15 produced according to the aforementioned procedure were evaluated according to the following criteria. Table 1 shows the result.

<<Evaluation>>

(Anti-Glare Effect)

The undesired image capturing of lighting and external light on the film was evaluated according to the following criteria:

B: The contour of the fluorescent lamp and external light are blurred, and undesired image capturing does not catch any attention.

C: Undesired image capturing of the contour of the fluorescent lamp and external light was slightly observed.

D: The contour of the fluorescent lamp and external light can be identified, and undesired image capturing catches any attention.

(Glitter)

The produced film was visually checked to evaluate the degree of glitter.

A: No glitter is observed at all.
B: A very slight glitter is observed.
C: A slight glitter is observed.
D: Glitter catches attention.

TABLE 1

| Anti-glare hard coat film No. | Microscopically roughened structure formation method | Resin plate diameter (mm) | Rubber hardness (deg.) | Anti-glare effect | Glitter | Remarks |
|---|---|---|---|---|---|---|
| 1 | Addition of particles | — | — | C | C | Comp. |

TABLE 1-continued

| Anti-glare hard coat film No. | Microscopically roughened structure formation method | Resin plate diameter (mm) | Rubber hardness (deg.) | Anti-glare effect | Glitter | Remarks |
|---|---|---|---|---|---|---|
| 2 | Embossing process | — | — | C | D | Comp. |
| 3 | *1 | 40 | 50 | D | C | Comp. |
| 4 | *1 | 50 | 50 | B | B | Inv. |
| 5 | *1 | 200 | 50 | B | B | Inv. |
| 6 | *1 | 500 | 50 | B | A | Inv. |
| 7 | *1 | 800 | 50 | B | A | Inv. |
| 8 | *1 | 1000 | 50 | B | B | Inv. |
| 9 | *1 | 1100 | 50 | C | C | Comp. |
| 10 | *1 | 800 | 25 | D | C | Comp. |
| 11 | *1 | 800 | 30 | B | B | Inv. |
| 12 | *1 | 800 | 40 | B | A | Inv. |
| 13 | *1 | 800 | 65 | B | A | Inv. |
| 14 | *1 | 800 | 80 | B | B | Inv. |
| 15 | *1 | 800 | 85 | C | C | Comp. |
| 16 | *1 | 500 | 50 | C | C | Comp. |

Comp.: Comparative example,
Inv.: Present invention,
*1: Flexographic printing

Table 1 shows that the anti-glare hard coat film 1 provided with a roughened structure by addition of particles did not exhibit a satisfactory anti-glare effect or glitter reducing effect, possibly due to the variation in the particle dispersion. The anti-glare hard coat film 2 provided with a roughened structure by embossing process had a problem with formation of a uniform roughened structure, and the anti-glare effect and glitter reducing effect were not sufficient. Further, the height and size of the roughened structure were different on the leading and trailing ends of the anti-glare hard coat film. Inspection of the mold revealed that part of the mold was clogged with the molten film fragments.

By contrast, the anti-glare hard coat films 4-8, and 11-14 were equipped with the roughened structure made up of the ink adhesion portion and unfinished ink adhesion portion by flexographic printing, wherein the resin plate diameter and the rubber hardness of resin plate were kept within the range of the present invention. These anti-glare hard coat films 4-8, and 11-14 were clearly characterized by excellent anti-glare hard effect and glitter reducing effect. The height and size of the roughened structure were uniform on the leading and trailing ends of the anti-glare hard coat film. It was shown that these films were marked by a high degree of uniformity and production stability.

Then the following surface treatment was applied to the hard coated surface of the anti-glare hard coat films 1-15 produced according to the aforementioned procedure.

<Surface Treatment>

Alkali Treatment:

An anti-glare hard coat film was immersed in a 1.5 mol/l-NaOH aqueous solution heated to a temperature of 50° C. for two minutes and was subjected to alkali treatment. After having been washed with water, the film was immersed in a 0.5% by weight-$H_2SO_4$ aqueous solution at room temperature for 30 seconds, and was neutralized. It was then washed with water and was dried.

[Manufacturing the Anti-Glaring Anti-Reflection Film]

The following high refractive index layer and low-refractive index layer were coated on the hard coat layer of the anti-glare hard coat films 1-15 having been surface-treated.

(Manufacturing the Anti-Reflection Layer: High Refractive Index Layer)

The following high refractive index layer coating composition was coated on a hard coat film using an extruding coater. It was dried at 80° C. for one minute. Then it was exposed to the ultraviolet ray with a dose of 0.1 $J/cm^2$, and was dried. It was further thermally cured at 100° C. for one minute. A high refractive index layer 1 was provided in such a way that the thickness was 78 nm.

This high refractive index layer had a refractive index of 1.65.

<High Refractive Index Layer Coating Composition 1>

| | |
|---|---|
| Isopropyl alcohol solution of metal oxide particles (solid 20%, ITO particle, particle diameter 5 nm) | 55 parts by weight |
| Metal compound: Ti(Obu)$_4$(tetra-n-butoxytitanium) | 1.3 parts by weight |
| Ionizing radiation curable resin: dipentaerithritol hexaacrylate | 3.2 parts by weight |
| Photo-polymerization initiator (Irgacure 184 (by Ciba Specialty Chemicals K.K.)) | 0.8 parts by weight |
| Straight-chain dimethyl silicone-EO block copolymer (FZ-2207, 10% propylene glycol monomethyl ether solution by Nippon Unicar Co., Ltd.) | 1.5 parts by weight |
| Propylene glycol monomethyl ether | 120 parts by weight |
| Isopropyl alcohol | 240 parts by weight |
| Methyl ethyl ketone | 40 parts by weight |

(Manufacturing the Anti-Reflection Layer: Low-Refractive Index Layer)

Then the following low-refractive index layer coating composition 1 is coated by an extruding coater and was dried at 100° C. for one minute. It was exposed to an ultraviolet ray with a dose of 0.1 $J/cm^2$, and was cured. It was thermally cured at 120° C. for five minutes. A low-refractive index layer was provided in such a way that the thickness was 95 nm, whereby an anti-glaring anti-reflection films 1-15 were produced. This low-refractive index layer had an refractive index of 1.37.

The anti-glaring anti-reflection film having been produced was tested to measure the spectral reflection factor at a incident angle of 5 degrees in the region with a wavelength of 380-780 nm, using a spectrophotometer (by Nihon Bunko Co., Ltd.). The anti-reflection performance was better over a wide wavelength region as the reflection factor smaller. Accordingly, the minimum reflection factor was obtained from the result of measurement within the range of 450-650 nm. After the rear surface on the side to be measured was subjected to the process of roughening, a black spray was used to provide treatment of light absorption, whereby preventing light from being reflected on the rear of the film. Then the reflection factor was measured. The measurement revealed that, in all the aforementioned anti-glaring anti-reflection films, the reflection factor was found within the range of 0.5-1.0 in terms of reflection factor. Satisfactory results were recorded.

(Preparing the Refractive Index Layer Coating Composition 1)

<Manufacturing the Tetraethoxysilane Hydrolysate A>

289 g of tetraethoxysilane and 553 g of ethanol were mixed, and 157 g of 0.15% aqueous solution of acetic acid was added to this mixture. It was stirred in a water bath having a temperature of 25° C. for 30 hours, whereby hydrolysate A was prepared.

| | |
|---|---|
| Tetraethoxysilane hydrolysate A | 110 parts by weight |
| Hollow silica based particles (the following P-2) | 30 parts by weight |
| KBM503 (silane coupling agent, by Shinetsu Chemical Co. Ltd.) | 4 parts by weight |
| 10% propylene glycol monomethyl ether solution of straight-chain dimethyl silicon-EO block copolymer (FZ-2207, by Nippon Unicar Co., Ltd.) | 3 parts by weight |
| Propylene glycol monomethyl ether | 400 parts by weight |
| Isopropyl alcohol | 400 parts by weight |

<Manufacturing the Hollow Silica Based Particles P-2>

A mixture of 100 g of silica sol having an average particle size of 5 nm with $SiO_2$ concentration of 20% by weight and 1900 g of demineralized water was heated to 80° C. This mother liquid for reaction had a pH value of 10.5. 9000 g of 0.98% by weight of aqueous solution of sodium silicate as $SiO_2$ and 9000 g of 1.02% by weight aqueous solution of sodium aluminate as $Al_2O_3$ were added to the mother liquid at the same time. In the meantime, the temperature of the reaction solution was held at 80° C. Immediately after addition, the PH value of the reaction solution raised to 12.5, without almost no change thereafter. After termination of the addition, the reaction solution was cooled down to the room temperature. It was washed by an ultrafiltration membrane, whereby $SiO_2/Al_2O_3$ nuclear particle dispersion with 20% by weight of solid concentration was prepared [Step (a)].

1700 g of demineralized water was added to 500 g of this nuclear particle dispersion, and was heated to 98° C. With this temperature kept unchanged, the aqueous solution of sodium silicate was dealkalized by a positive ion exchange resin to yield a silica solution ($SiO_2$ concentration: 3.5% by weight). 3000 g of this silica solution was added to get the dispersion of nuclear particles forming the first silica coated layer [Step (b)].

Then 1125 g of demineralized water was added to 500 g of nuclear particle dispersion, forming the first silica coated layer washed by ultrafiltration membrane, with a solid concentration reduced to 13% by weight. Further, concentrated hydrochloric acid (35.5%) was dropped to get a pH value of 1.0, whereby dealuminization was applied. Then while 10 L of aqueous solution of hydrochloric acid with a pH value of 3 and 5 L of demineralized water were added, aluminum salt dissolved by an ultrafiltration membrane was separated and the dispersion of $SiO_2/Al_2O_3$ porous particles was prepared [Step (c)], wherein part of the constituent of the nuclear particle forming the first silica coated layer was removed. A mixture solution of 1500 g of the aforementioned porous particle dispersion, 500 g of demineralized water, 1,750 g of ethanol and 626 g of 28% ammonia water was heated to 35° C. Then 104 g of ethyl silicate ($SiO_2$: 28% by weight) was added to this mixture. The surface of the porous particles forming the first silica coated layer was covered with the hydrolysis polycondensation product of ethyl silicate, thereby forming a second silica coated layer. Thus, a dispersion of hollow silica based particles (P-2) with a solid concentration of 20% by weight was prepared, wherein the solvent was replaced by ethanol using the ultrafiltration membrane.

The first silica coated layer of this hollow silica based particles had a thickness of 3 nm, an average particle size of 47 nm, $MOx/SiO_2$ (mole ratio) of 0.0017 and a refractive index of 1.28. The average particle size was measured according to the dynamic light scattering method.

[Manufacturing the Polarizing Plate]

Then a polarizing plate was manufactured using each of the anti-glaring anti-reflection films 1-15.

The polyvinyl alcohol film having a thickness of 120 μm was subjected to uniaxial orientation (temperature 110° C., draw ratio: 5 times). This film was immersed in an aqueous solution made up of 0.075 g of iodine, 5 g of potassium iodide, and 100 g of water for 60 seconds. Then it was immersed in an aqueous solution, having a temperature of 68° C., made up of 6 g of potassium iodide, 7.5 g of boric acid and 100 g of water. This film was washed with water and was dried to produce a polarizing film.

According to the following Steps 1-5, the polarizing film, the aforementioned anti-glaring anti-reflection films 1-5, and cellulose ester film KC8UCR-5 (by Konica Minolta Opt Co., Ltd.) are bonded together to produce a polarizing plate. The polarizing plate protective film on the rear side was a cellulose ester film having different phases, with the retardation values of Ro=43 nm and Rt"=132 nm.

Step 1: The plate was immersed in 1 mol/L of sodium hydroxide solution having a temperature of 50° C. for 60 seconds. It was then washed with water and was dried. This produced a cellulose ester film wherein the side to be bonded with the polarizer was saponified.

Step 2: The aforementioned polarizing film was immersed in the tank containing the polyvinyl alcohol adhesive a solid content of 2 percent by weight for 1-2 seconds.

Step 3: The excess adhesive having adhered to the polarizing film in Step 2 was gently wiped off. This was put on the cellulose ester film treated in Step 1. They were laminated so that the anti-reflection layer was placed to the outside and were arranged in position.

Step 4: The anti-glaring anti-reflection film, polarizing film and cellulose ester film sample having been laminated in Step 3 were bonded under a pressure of 20-30 $N/cm^2$ at a conveyance speed of approximately 2 m/min.

Step 5: A sample formed by bonding the polarizing film produced in Step 4, cellulose ester film and anti-glaring anti-reflection films 1-15 was put in a dryer having a temperature of 80° C. and was dried for 2 minutes to yield polarizing plates 1-15.

<<Manufacturing the Liquid Crystal Display>>

A liquid crystal panel was manufactured according to the following procedure, and the characteristics as a liquid crystal display were evaluated.

The polarizing plate pre-bonded on the surface of a commercially available Model 32 liquid crystal television set (MVA type cell) was separated. Each of the polarizing plates 1-15 having been produced in the aforementioned procedure was bonded onto the glass surface of the liquid crystal cell.

In this case, the direction of bonding the polarizing plate was determined in such a way that the surface of the cellulose ester film having a difference in phase was located on the side of the liquid crystal cell and the absorption axis was oriented in the same direction as that of the pre-bonded polarizing plate, whereby liquid crystal displays 1-15 were produced.

<<Evaluation>>

Figure 9:
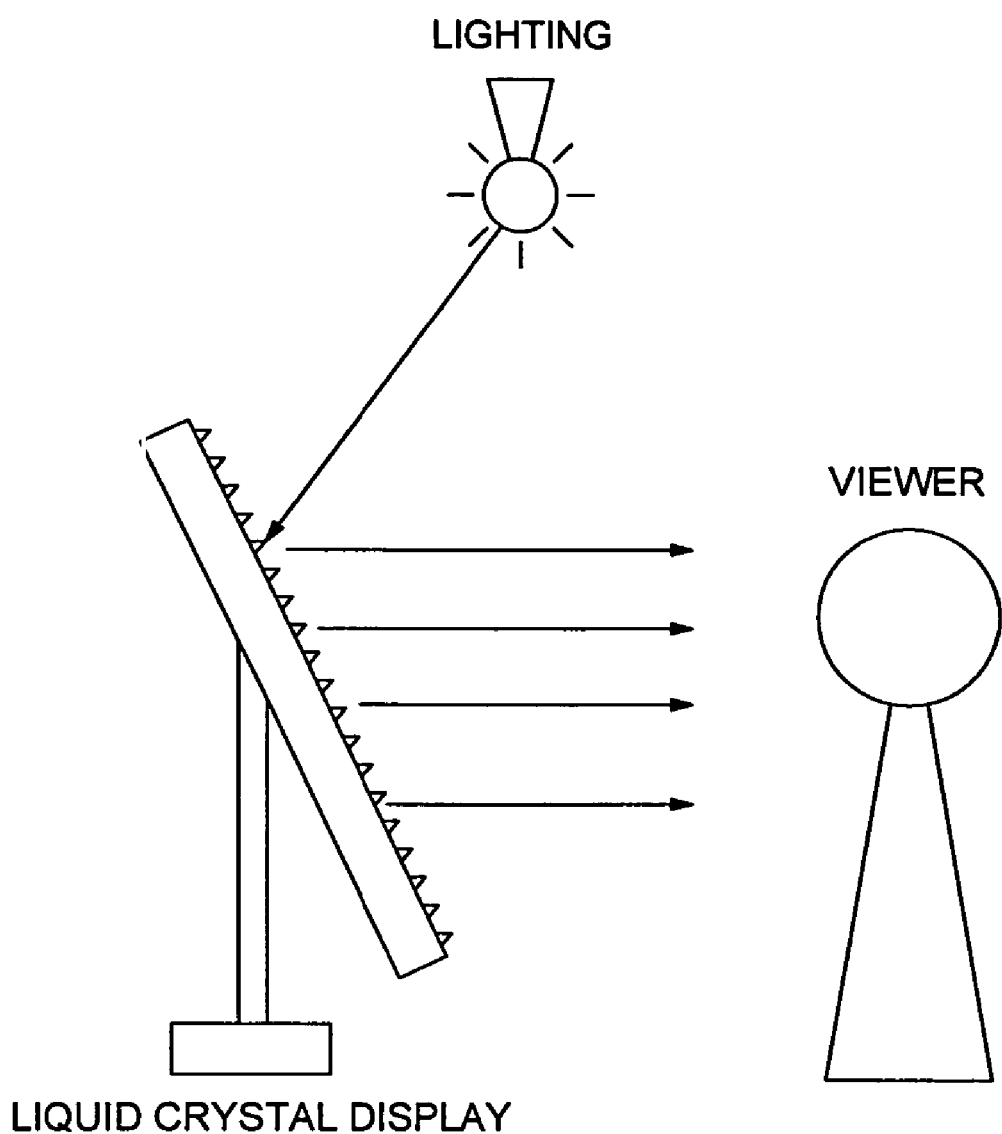
FIG. 9 is a schematic diagram representing an environment for observation when an anti-glaring anti-reflection film is applied to the liquid crystal display.

Inspection was made in an environment given in FIG. 9 using the liquid crystal displays 1-15 having been produced. The aforementioned anti-glare effect, glitter reducing effect, the following visibility and blackness when an moving image was displayed were evaluated by visual observation according to the following criteria. Ten 40 W fluorescent lamps (FLR40S-EX-D/M, Matsushita Electric Industrial, Co., Ltd.) were installed on the ceiling as lighting sources. Evaluation was made when external light was coming from the window.

(Visibility and Blackness During Displaying Moving Images)

Moving images of the TV program was shown in the same display in an environment with artificial lighting provided by the aforementioned fluorescent lamps of the ceiling and the external light coming from the window, and comparative tests were made. The moving images were observed one meter away from the display front, and functional evaluation was conducted.

B: Undesired image capturing of fluorescent lamps on the upper portion of the screen does not attract attention. Despite the presence of external light, black is crisp and sharp on the screen center. No fatigue is felt during or immediately after observation. There is no sense of incompatibility.

C: Undesired image capturing of fluorescent lamps on the upper portion of the screen is slightly observed. In the presence of external light, black is nor crisp and sharp slightly on the screen center. After observation, a slight fatigue is felt.

D: Undesired image capturing of fluorescent lamps on the upper portion of the screen is observed. Due to the presence of external light, black is not crisp and sharp on the screen center. During observation, fatigue is felt. The following Table 2 shows the configuration of the anti-glaring anti-reflection film/liquid crystal display and the result of the aforementioned evaluation.

TABLE 2

| Liquid crystal display number | Anti-glaring anti-reflection film number | Microscopically roughened structure formation method | Resin plate diameter (mm) | Rubber hardness (deg.) | Anti-glare effect | Glitter | Visibility and blackness | Remarks |
|---|---|---|---|---|---|---|---|---|
| 1 | 1 | Addition of particles | — | — | C | C | D | Comp. |
| 2 | 2 | Embossing process | — | — | C | D | D | Comp. |
| 3 | 3 | *1 | 40 | 50 | D | C | C | Comp. |
| 4 | 4 | *1 | 50 | 50 | B | B | B | Inv. |
| 5 | 5 | *1 | 200 | 50 | B | B | B | Inv. |
| 6 | 6 | *1 | 500 | 50 | B | A | B | Inv. |
| 7 | 7 | *1 | 800 | 50 | B | A | B | Inv. |
| 8 | 8 | *1 | 1000 | 50 | B | B | B | Inv. |
| 9 | 9 | *1 | 1100 | 50 | C | C | C | Comp. |
| 10 | 10 | *1 | 800 | 25 | D | C | C | Comp. |
| 11 | 11 | *1 | 800 | 30 | B | B | B | Inv. |
| 12 | 12 | *1 | 800 | 40 | B | A | B | Inv. |
| 13 | 13 | *1 | 800 | 65 | B | A | B | Inv. |
| 14 | 14 | *1 | 800 | 80 | B | B | B | Inv. |
| 15 | 15 | *1 | 800 | 85 | C | C | C | Comp. |
| 16 | 16 | *1 | 500 | 50 | C | C | D | Comp. |

Comp.: Comparative example,
Inv.: Present invention,
*1: Flexographic printing

Table 2 shows that the liquid crystal display 1 provided with microscopically roughened structure by addition of the particles did not exhibit a satisfactory anti-glare effect or glitter reducing effect, possibly due to the variation in the particle dispersion. Visibility was also insufficient. The anti-glare hard coat film 2 provided with a microscopically roughened structure by embossing process had a problem with formation of a uniform roughened structure, and the glitter reducing effect and visibility were not sufficient.

By contrast, excellent anti-glare effect, glitter reducing effect, visibility and blackness are clearly provided by the liquid crystal displays 4-8, and 11-14 using the anti-glare hard coat films equipped with the roughened structure made up of the ink adhesion portion and unfinished ink adhesion portion by flexographic printing, wherein the resin plate diameter and the rubber hardness of resin plate were kept within the range of the present invention.

[Manufacturing the Anti-Glare Hard Coat Film 16 by Addition of Particles]

In the same procedure as that of Example 1, the hard coat layer coating solution 1 is filtered by a polypropylene-made filter with an aperture diameter of 20 μm on the surface of the cellulose ester film 1, and a hard coat layer coating solution was prepared. Then the hard coat layer was formed through flexographic printing by the manufacturing apparatus of FIG. 8 (a), using the seamless resin plate, of the following specifications, having the resin plate diameter and rubber hardness of the film No. 6 in Table 1. After printing, it was dried in a drying zone 505 B at 90° C. After that, using a UV lamp 506 C, it was cured by the ultraviolet ray having an intensity of illumination of 0.1 W/cm$^2$ with a dose of 0.1 J/cm$^2$. This was assigned to the film No. 16. Using the optical interference type surface roughness measuring instrument, 100 convex portions was measured. It was revealed that the average height of the convex portion was 1.3 μm, and the average distance between convex portions was 65 μm, with the variation kept within the range of ±20%.

(Specifications of Seamless Resin Plate)
Photosensitive Resin Plate:
A 2-mm thick polyester film was coated with:
a core produced by reaction between 98 parts of 2-hydroxyethylacrylate and one part of butandiol diacrylate; and
a photosensitive resin composition obtained through the mixture of: 71 g of core shell type micro gel (core/shell=2/1) produced by reaction between 20 parts of methacrylic acid and 80 parts of N-butylacrylate;
25 g of trimethylol propaneethoxy triacrylate; and 4 g of 2,2-dimethoxy-2-phenylacetophenone. After that, the ultraviolet ray having a wavelength of 360 nm was used for 1000 mJ/cm exposure, whereby a printing original plate for laser engraving was produced. As shown in FIG. 1, it was placed on the resin plate roll and was heated at 120° C. for 20 minutes while being evacuated. Thus, a seamless resin plate was produced, without any seam being observed thereon.

(Hard Coat Layer Coating Solution 1)
The following material was stirred and mixed to yield a hard coat layer coating solution 1.
Acryl monomer; KAYARAD DPHA (dipentaerithritol hexaacrylate, by Nippon Kayaku Co., Ltd.)
200 parts by weight
Photo-polymerization initiator (Irgacure 184 (by Ciba Specialty Chemicals K.K.)) 25 parts by weight
Propylene glycol monomethyl ether 110 parts by weight
Ethyl acetate 110 parts by weight
Synthetic silica particles; average particle diameter 1.8 μm 40 parts by weight
Surfactant [silicone surfactant; FZ2207 (by Nippon Unicar Co., Ltd.) 10% by weight of propylene glycol monomethyl ether solution] 0.6 parts by weight in terms of solid content.

Example 2

In the seamless resin plate produced in Example 1, after the laser engraved image was printed, the roughened structure was changed in such a way that the ink adhesion portion (convex portion) was 0.3 μm high, convex portion size (long side) was 15 μm, and the distance between convex portions was 30 μm. Except that, according to the same procedure as that in Example 1, a resin plate was manufactured.

The manufacturing apparatus of FIG. 8 (b) was employed. The resin plate used in Example 1 (resin plate diameter: 800 mm; rubber hardness: 50 deg.) was used as the flexographic printing section B, and the resin plate having been produced in the aforementioned step was utilized as the flexographic printing section C. Two flexographic printing operations were carried out. Except that, according to the same procedure as that used in Example 1, an anti-glare hard coat film was produced. In this case, the resin plate diameter of the flexographic printing section C was adjusted to 500 mm, and the rubber hardness was set to 65 degrees.

Using the anti-glare hard coat film having been produced, an anti-glaring anti-reflection film, polarizing plate and liquid crystal display were produced according to the same procedure as that in Example 1. They were evaluated according to the same criteria as those of Example 1.

This has produced an anti-glare hard coat film provided with a roughened structure of dual structure having a convex portion of 0.5-1.5 μm and similar to FIG. 7 (c). Better anti-glare effect, glitter reducing effect and visibility were recorded, as compared with the results of the single flexographic printing in the Example 1.

Example 3

The amount of the methyl ethyl ketone in the composition of the anti-glare layer liquid ink 1 in Example 1 was adjusted, and ink viscosity was changed to 0.05, 0.1, 1, 5, 8, 10, and 11 Pa·s. A roughened structure was formed by flexographic printing under the same conditions as those of the anti-glaring anti-reflection film 7. A desired roughened structure was confirmed to have been formed when the liquid ink viscosity was within the range of 0.1-10 Pa·s. By contrast, when the liquid ink having a viscosity of 0.05 Pa·s was used, the height of the convex portion was reduced 30% and the size was increased 40%. It was difficult to produce a desired roughened structure. When the liquid ink having a viscosity of 11 Pa·s was used, a small nick was observed in the convex portion, and ink transferability was inferior.

Example 4

An anti-glare hard coat film, anti-glaring anti-reflection film, polarizing plate and liquid crystal display were manufactured according to the procedure similar to that of Example 1, using the ARTON of JSR Co., Ltd. as a norbornane resin film, instead of the cellulose ester film 1 used in Example 1. The sample of the present invention, based on the flexographic printing, representing Example 1 was found to be characterized by superb anti-glare effect, glitter reducing effect, visibility and blackness.

Example 5

In the seamless resin plate produced in Example 1, an anti-glare hard coat film, anti-glaring anti-reflection film, polarizing plate and liquid crystal display were manufactured by flexographic printing in the same procedure as that of Example 1, using the resin plates (a) and (b); wherein the resin plate (a) was further characterized in that in the case of the laser engraved image after printing, the convex portion was 1.2 μm high, the long side of the convex portion size was 15 μm, the distance between convex portion was 60 μm, and the convex portion having the size of 0.50 in terms of the following ellipse ratio accounted for 70 percent in number based distribution; and the resin plate (b) was characterized in that the convex portion having the size of 0.70 in terms of the ellipse ratio accounted for 80 percent in number based distribution, and the long side was oriented constant in the direction of printing. When then resin plate (b) was used, two types of liquid crystal displays were manufactured so that the long side of the convex portion was arranged in the longitudinal or lateral direction.

The display apparatus having been produced was subjected to the same visibility test as that in Example 1. The result of evaluation revealed that use of the resin plate (b) resulted in excellent anti-glare, a further reduction of glitter and a substantial reduction of eye fatigue when the moving image was displayed. By contrast, when the resin plate (a) was used, the same level of anti-glare effect was observed, but a slight degree of glitter remained, and some eye fatigue was felt when a moving image was displayed. Ellipse ratio (short side of ellipse)/(long side of ellipse).

EFFECT OF THE INVENTION

In the present invention, provided can be an anti-glare film and a manufacturing method thereof, in which undesired image capturing caused by outside light and lowered contrast are effectively inhibited without lowering sharpness of a high quality image via miniaturization of a pixel size, and a desired micro-roughened structure is stably formed effectively with good productivity, and further to provide an anti-glaring anti-reflection film, a polarizing plate, and a display thereof.

What is claimed is:

1. A manufacturing method of an anti-glare film comprising the step of;
    forming a roughened structure with ink adhesion portions and unfinished ink adhesion portions, provided on a substrate film surface via flexographic printing, employing a seamless resin plate having a diameter of 50-1000 mm and a rubber hardness degree of 30-80.

2. The manufacturing method of an anti-glare film of claim 1,
    wherein the ink adhesion portion of the roughened structure
has a height of 0.1-1.5 μm based on that of the unfinished ink adhesion portion, a long side of 3-50 μm, and an average distance between the adjacent convex portions of 10-150 μm.

3. The manufacturing method of an anti-glare film of claim 1,
    wherein the substrate film is at least one kind selected from the group including a cellulose ester based film, a polyester based film, a norbornene based resin film, and a polycarbonate based film.

4. The manufacturing method of an anti-glare film of claim 1,
    wherein the substrate film has a hard coat layer having a thickness of 2-20 μm, provided on the side where the roughened structure is formed.

5. The manufacturing method of an anti-glare film of claim 1,
    wherein the step of forming the roughened structure is conducted more than once.

6. The manufacturing method of an anti-glare film of claim 5,
    wherein a different shape of the ink adhesion portion is formed in at least one step of forming the roughened structure in the step of forming the roughened structure conducted more than once.

7. The manufacturing method of an anti-glare film of claim 5,
    wherein a seamless resin plate is used at least once in the step of forming the roughened structure conducted more than once.

8. The manufacturing method of an anti-glare film of claim 1,
    wherein an ink viscosity employed for the flexographic printing is 0.1-10 Pa·s.

9. The manufacturing method of an anti-glare film of claim 1,
comprising the steps of:
    (a) forming the foregoing roughened structure; and
    (b) curing/fixing the roughened structure via actinic irradiation or heating,
    wherein ink employed for the flexographic printing contains an actinic radiation curable resin or a thermosetting resin.

* * * * *